US012694197B2

(12) United States Patent　　　(10) Patent No.:　US 12,694,197 B2
Fesbinder et al.　　　　　　　　(45) Date of Patent:　　Jul. 28, 2026

(54) SYSTEM AND METHOD FOR DISPLAYING TWO SETS OF CHARACTERS IN AN INTERFERENCE REDUCING MANNER

(71) Applicant: READ TWOGETHER LTD., Jerusalem (IL)

(72) Inventors: David Allen Fesbinder, Jerusalem (IL); Aryeh Rosenzweig, Bnei Brak (IL); Charles Abraham Wiesel, Jerusalem (IL)

( * ) Notice: Subject to any disclaimer, the term of this patent is extended or adjusted under 35 U.S.C. 154(b) by 0 days.

(21) Appl. No.: 18/607,467

(22) Filed: Mar. 16, 2024

(65) Prior Publication Data

US 2024/0220705 A1　Jul. 4, 2024

Related U.S. Application Data

(63) Continuation-in-part of application No. 18/062,508, filed on Dec. 6, 2022, now abandoned, which is a continuation of application No. 17/188,718, filed on Mar. 1, 2021, now Pat. No. 11,520,999, which is a continuation-in-part of application No. PCT/IL2019/050960, filed on Aug. 28, 2019, which is a continuation-in-part of application No. 16/506,135, filed on Jul. 9, 2019, now Pat. No. 10,817,677, which is a continuation-in-part of application No. 16/114,385, filed on Aug. 28, 2018, now Pat. No. 10,346,549.

(51) Int. Cl.
*G06F 40/109*　　(2020.01)
*G06T 11/23*　　(2026.01)

(52) U.S. Cl.
CPC ............ *G06F 40/109* (2020.01); *G06T 11/23* (2026.01)

(58) Field of Classification Search
None
See application file for complete search history.

(56) References Cited

U.S. PATENT DOCUMENTS 7,089,504 B1 *　8/2006　Froloff .................. G06F 40/169
　　　　　　　　　　　　　　　　　715/764
2001/0000965 A1 *　5/2001　Yano ........................ G09G 5/24
　　　　　　　　　　　　　　　　　345/469

(Continued)

OTHER PUBLICATIONS

Screen captures from Youtube video clip entitled "How to Fill Letter Shapes with Link Threaded Text in Adobe Illustrator", uploaded on Oct. 3, 2017 by user hikeart, retrieved from URL:< https://www.youtube.com/watch?v=kzLdqzMzMT8> (Year: 2017).*

(Continued)

*Primary Examiner* — Mustafa A Amin
(74) *Attorney, Agent, or Firm* — Alexander Postnikov

(57)　　　　ABSTRACT

The present disclosure relates to a method of displaying two sets of characters, the method being implemented by a computing device, said method comprising: receiving, by the computing device, a first set of characters; receiving, by the computing device, a second set of characters; modifying, by the computing device, an appearance of one or more of the second set of characters to receive, without overlap, one or more of the first set of characters; and displaying, on a device screen, the one or more of the first set of characters and the modified second set of characters, wherein the one or more of the first set of characters are embedded in the modified second set of characters.

29 Claims, 39 Drawing Sheets

(56) References Cited

U.S. PATENT DOCUMENTS

| 2021/0019365 A1* | 1/2021 | Mangla | ................ | G06V 30/414 |
| 2021/0224465 A1* | 7/2021 | Dhanuka | ............... | G06T 11/203 |
| 2024/0419887 A1* | 12/2024 | Fesbinder | .............. | G09B 19/06 |

OTHER PUBLICATIONS

"Adobe® Illustrator® Help and tutorials", dated Feb. 2013, total p. 504, retrieved from URL:<https://help.adobe.com/archive/en/illustrator/cs6/illustrator_reference.pdf> (Year: 2013).*

* cited by examiner

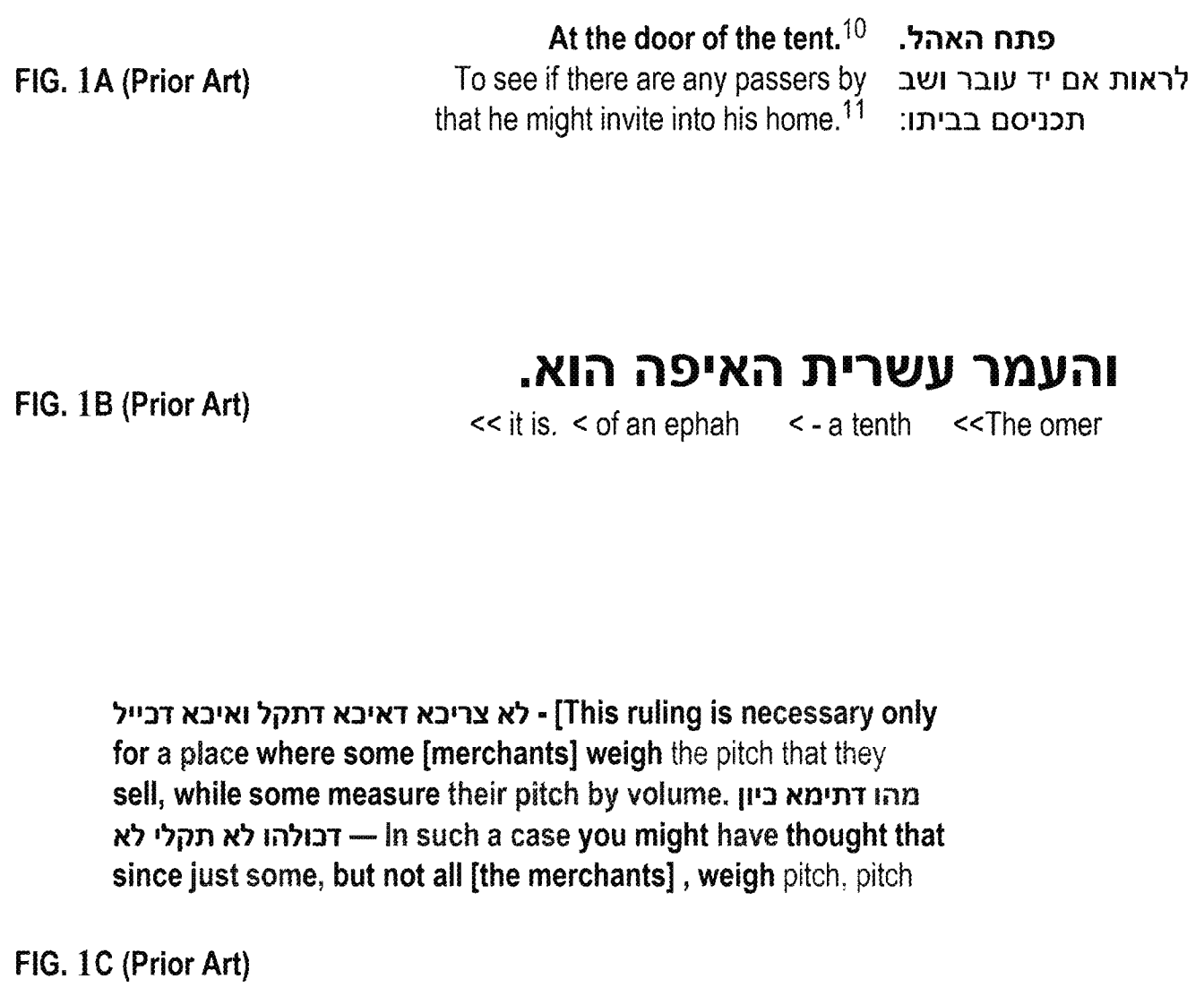

At the door of the tent.[10]

To see if there are any passers by that he might invite into his home.[11]

<<The omer    < - a tenth    < of an ephah    << it is.

FIG. 1B (Prior Art)

והכי דקאמר דאיכא דוכתא דאיכא דזייני
לא צריכא אלא במקום דאיכא דמתקלי — [This ruling is necessary only for a place where some [merchants] weigh the pitch that they sell, while some measure their pitch by volume. במתני ודזבני בהו כי האי במתני ודזבני
וזבונה לא חקלי לא — In such a case you might have thought that since just some, but not all [the merchants], weigh pitch. pitch

FIG. 1C (Prior Art)

Framing Character Configurations

41 Composite text string in four-cell grid

42 Displayed composite text string of centered translation text within a framing FLT 44
Composite text string with italicized centered translation 45
Composite text string with colored centered translation 46
Composite text string with colored and italicized centered translation As if the sun had burst and spread its flame in the air, and the fields lay still without breath, and the whole silt of the road was

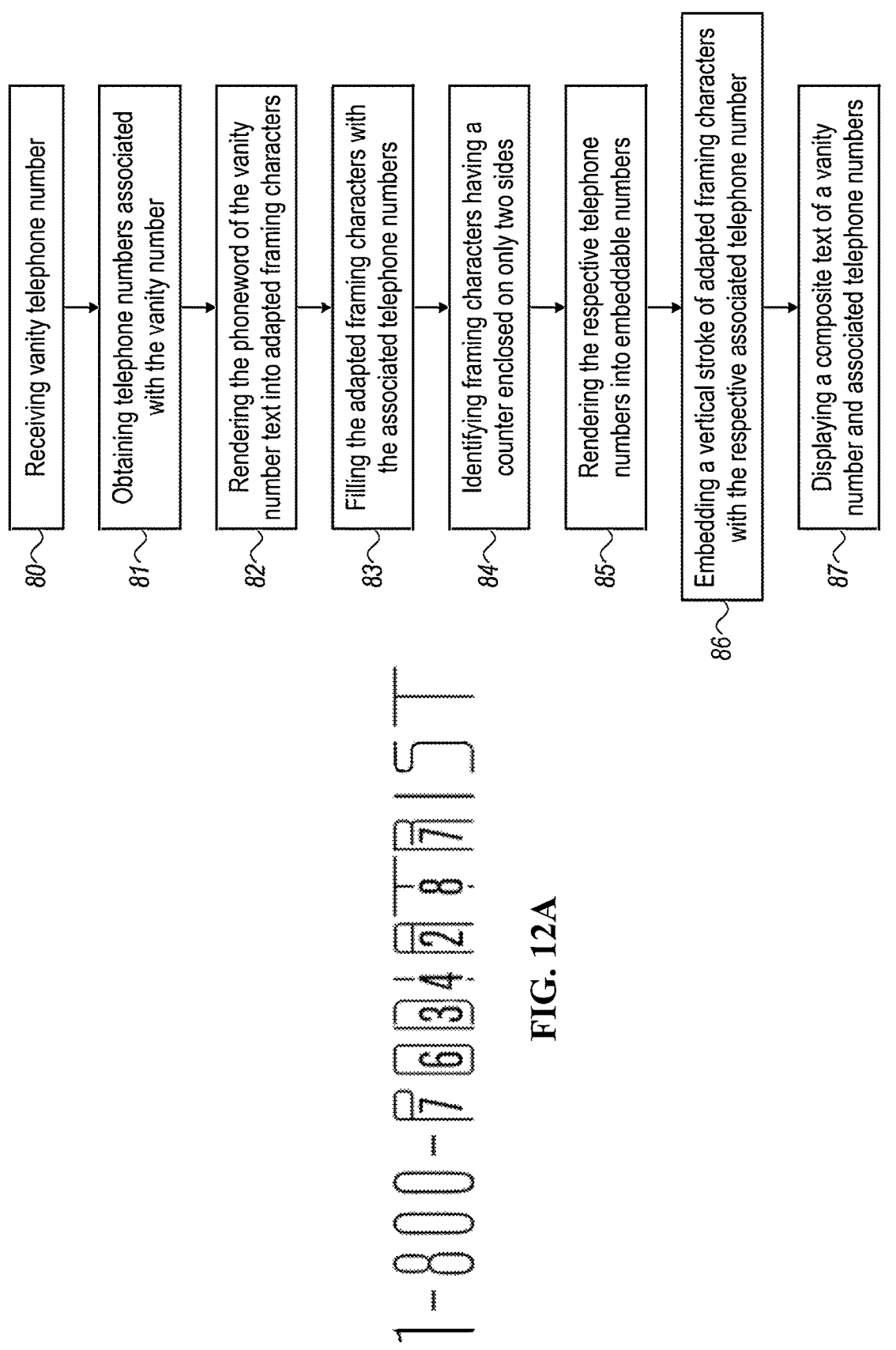

Receiving vanity telephone number — 80

Obtaining telephone numbers associated with the vanity number — 81

Rendering the phoneword of the vanity number text into adapted framing characters — 82

Filling the adapted framing characters with the associated telephone numbers — 83

Identifying framing characters having a counter enclosed on only two sides — 84

Rendering the respective telephone numbers into embeddable numbers — 85

Embedding a vertical stroke of adapted framing characters with the respective associated telephone number — 86

Displaying a composite text of a vanity number and associated telephone numbers — 87

Stage 1

Stage 2

Stage 3

91 — Receiving an input text
92 — Obtaining a cluster segment of the input text
93 — Rendering the cluster segment into embeddable content
94 — Rendering the remaining text into adapted framing characters
95 — Embedding the embeddable cluster segment into the adapted framing characters
96 — Displaying a composite text of the Input text and the cluster segment
FIG. 16C
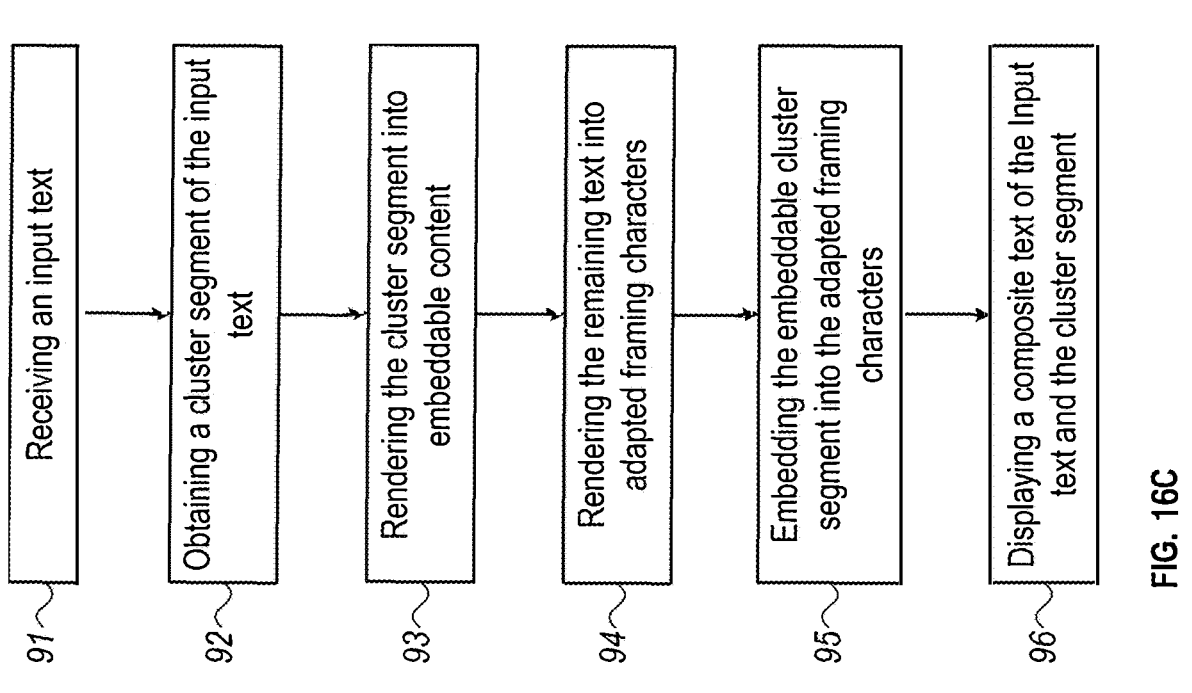
FIG. 16A
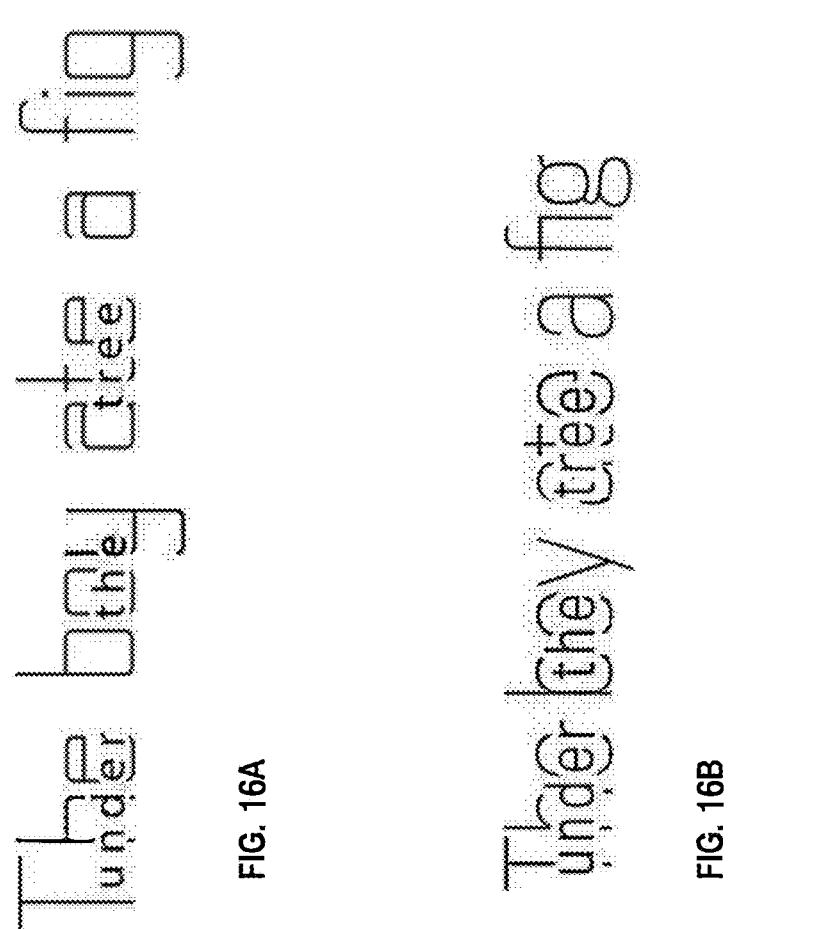
FIG. 16B 100 — Receiving a foreign language text 101 — Obtaining a translation of the foreign language text 102 — Identifying the core translation from the translation 103 — Rendering the core translation into adapted translation framing characters 104 — Generating an embeddable foreign language text 105 — Embedding the embeddable foreign language text into vertical counter strokes of the adapted translation characters 106 — Displaying a composite text of the foreign language text and the translation 107 — Displaying non-core translation outside of composite text

FIG. 17B

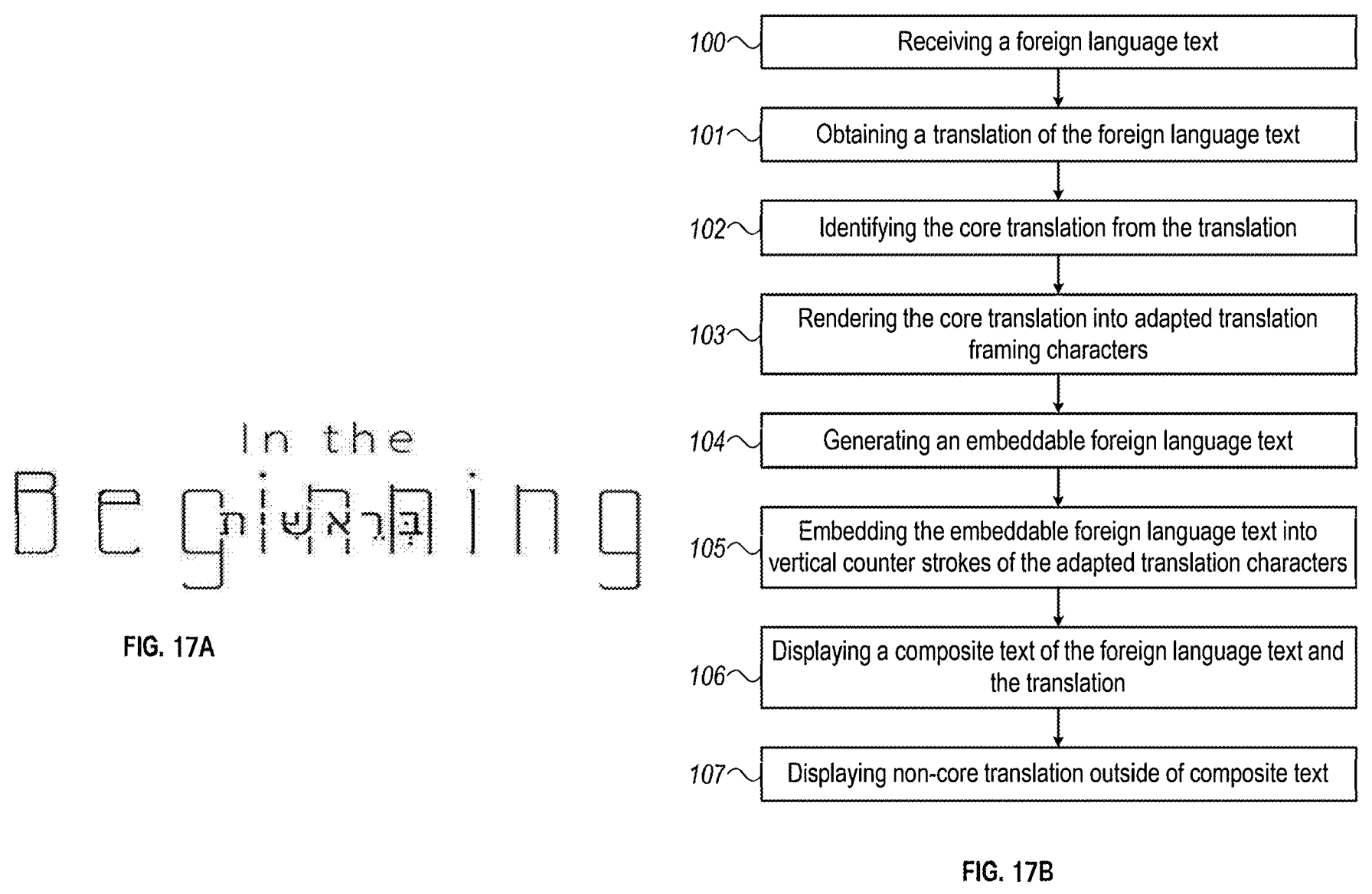

In the Beginning

FIG. 17A

Receiving a string of foreign text characters ～120

Obtaining a string of translation text characters; ～122

Rendering translation characters with truncated translation characters ～124

Embedding foreign text characters in the associated truncation space ～126

Displaying a composite text ～128

600

602 Receiving at least two first characters

604 Receiving at least two second characters

606 Receiving x,y coordinates for each of the first and second characters

608 Automatically placing the first and second characters according to their x,y coordinates 610 Displaying the first characters embedded in the second characters

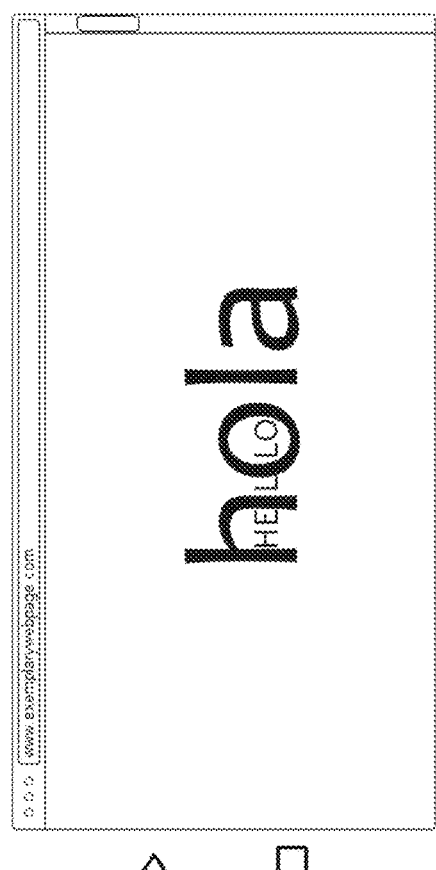
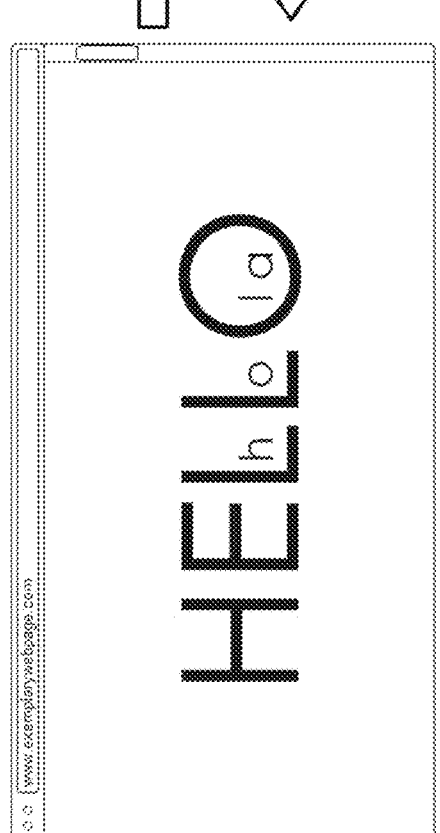
FIG. 38

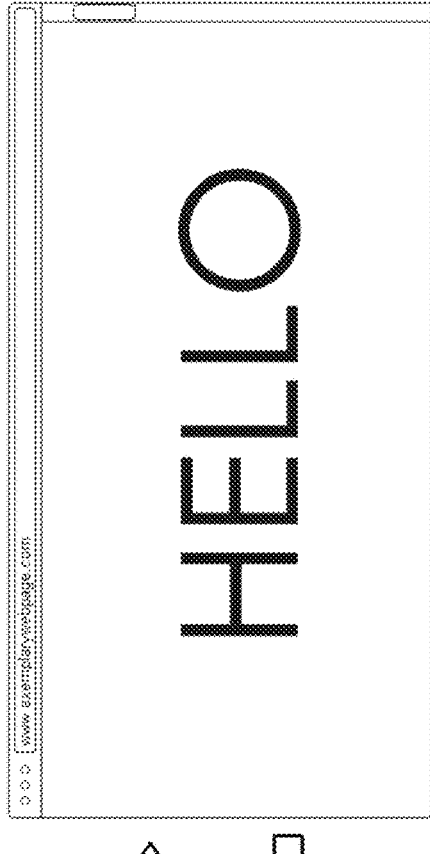
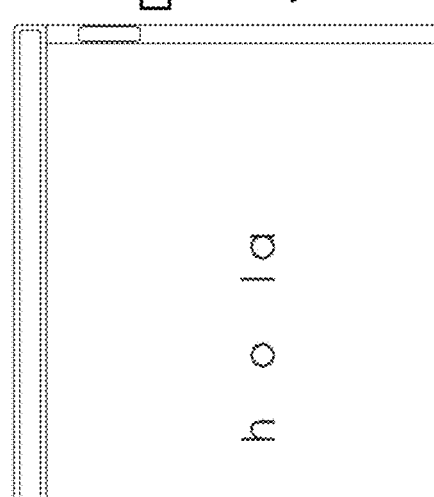
FIG. 39

1

SYSTEM AND METHOD FOR DISPLAYING TWO SETS OF CHARACTERS IN AN INTERFERENCE REDUCING MANNER

CROSS-REFERENCE TO RELATED APPLICATIONS

This application is a Continuation-in-part of, and claims the benefit of, U.S. non-provisional patent application Ser. No. 18/062,508, filed on Dec. 6, 2022, which is a Continuation of U.S. Non-provisional patent application Ser. No. 17/188,718, filed on Mar. 3, 2021, which is a Continuation-in-part of International patent application PCT/IL2019/050960, filed on Aug. 28, 2019, which is a Continuation-in-part of U.S. non-provisional patent application Ser. No. 16/506,135, filed on Jul. 9, 2019, which is a Continuation-in-part of U.S. non-provisional patent application Ser. No. 16/114,385, filed on Aug. 28, 2018, the contents of which are incorporated by reference in their entirety.

BACKGROUND

The present disclosure relates to rendering engines displaying two or more texts of associated content. Typically, display schemes display different texts in separate areas of a display space to ensure readability. However, such display schemes require readers to shift eyes between different texts thereby causing eye fatigue from prolonged eye shift between the texts and also increases the likelihood of reading mistakes.

Therefore, there is need for a rendering engine operative to display two sets of characters while preserving readability.

SUMMARY

The present disclosure is directed at a method of displaying two sets of characters. The method may comprise: receiving, by a computing device, a first set of characters; receiving, by the computing device, a second set of characters; modifying, by the computing device, an appearance of one or more of the second set of characters to receive, without overlap, one or more of the first set of characters; and displaying, on a device screen, the one or more of the first set of characters and the modified second set of characters, wherein the one or more of the first set of characters are embedded in the modified second set of characters.

In another aspect, the appearance of each of the modified second set of characters may include a vacated area to receive at least one of the first set of characters. The vacated area may be in a character body and/or an extension of an originally vacant area.

In another aspect, a number of character strokes of each of the modified second set of characters may be preserved. At least one character in the first set of characters may be a picture, symbol, or graphic. Alternatively, at least one character in the first set of characters may be a number, an alphanumeric character, or a letter.

In another aspect, there can be a plurality of modified characters in the modified second set of characters and each of the plurality of modified characters can have a geometry defining a common counter width, wherein a display space on the electronic screen can be configured to have a horizontal series of points defining placement of a series of receiving regions, the receiving regions having a width substantially equal to a counter width or a fractional multiple thereof; and one character of the first set of characters is displayed in each of two, adjoining receiving regions of the receiving regions, wherein an advance width of each of the character is substantially equal to a width of its respective receiving region of the adjoining receiving regions, wherein each of the adjoining receiving regions is disposed within two adjacent modified characters of the modified second set of characters, wherein each of the two adjacent modified characters encloses its respective character on at least two sides.

In another aspect, the one or more of the modified second set of characters may include at least one discriminatory character stroke, wherein the at least one discriminatory character stroke spans a width of a modified character of the modified set of characters. Furthermore, a first stroke of the at least one discriminatory character stroke may be bound by a character x-height, and a second stroke of the at least one discriminatory character stroke is bound by a character baseline.

In another aspect, the appearance of each of the modified second set of characters can include a removal of at least a portion of a character stroke, wherein the appearance of each of the modified second set of characters may include a removal of at least a portion of a middle character stroke.

In another aspect, the one or more of the first set of characters are embedded in originally vacant areas around or in between the modified set of characters.

In another aspect, the first set of characters is a foreign language text, and the second set of characters is translated text of the foreign language text. The appearance of each of the modified second set of characters may include at least one of a modified color, font, size, orientation, dimension, and transparency. Furthermore, the at least one of the modified color, font, size, orientation, dimension, and transparency may be based on attributes of the first set of characters so as enable embedding of the one or more of the first set of characters in the modified set of characters, the attributes being at least one of color, font, size, orientation, dimension, and transparency, of the first set of characters.

In another aspect, the method of the present disclosure may further include the step of identifying, by the computing device, vacated areas in the modified second set of characters to receive the one or more of the first set of characters, and identifying, by the computing device, originally vacant areas in the second set of characters and/or the modified second set of characters to receive the one or more of the first set of characters.

In another aspect, the appearance of one or more of the first set of characters is modified to be embedded in the modified second set of characters. The embedding of the one or more of the first set of characters in the modified second set of characters may be a partial embedding.

The present disclosure is further directed at a system to display two sets of characters, the system configured to: receive a first set of characters; receive a second set of characters; modify an appearance of one or more of the second set of characters to receive, without overlap, one or more of the first set of characters; and display, on a device screen, the one or more of the first set of characters and the modified second set of characters, wherein the one or more of the first set of characters are embedded in the modified second set of characters.

The present disclosure is further directed at non-transitory computer storage media storing executable instructions which when executed by a computing device cause the computing device to: receive a first set of characters; receive a second set of characters; modify an appearance of one or more of the second set of characters to receive, without overlap, one or more of the first set of characters; and display, on a device screen, the one or more of the first set of characters and the modified second set of characters, wherein the one or more of the first set of characters are embedded in the modified second set of characters.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIGS. 1A-1C are various sample of prior art requiring constant eye shift between a foreign-language text and a translation disposed either to the side, underneath, or both;

FIG. 12A depicts a composite-text, display scheme of a vanity telephone number in, according to a variant embodiment;

FIG. 12B depicts a flow chart of processing steps implementing the display scheme of the vanity telephone number of FIG. 12A, according to an embodiment;

FIG. 13A depicts a composite-text, display scheme for cursive and printing styles, according to an embodiment;

FIG. 13B depicts a composite-text, display scheme for currency exchange rates, according to an embodiment;

FIG. 14 depicts a variable composite-text display scheme in which an counter-filling scheme automatically changes to a stroke-embedding scheme responsively to excessive overlap between the two texts, according to an embodiment;

FIG. 16A depicts a composite-text, display scheme for a cluster sentence employing adapted framing characters, according to an embodiment;

FIG. 16B depicts the composite-text, display scheme of FIG. 16A with non-adapted framing characters;

FIG. 16C depicts a flowchart of processing steps implementing the display scheme of the cluster sentence of FIG. 16A;

FIG. 17A depicts a composite-text, display scheme in which a foreign text is implemented as an embedded text and its core translation is displayed as a same-line, framing text while non-core translation is displayed as above-line display, according to an embodiment;

FIG. 17B depicts a flow chart of processing steps implementing the display scheme of FIG. 17A, according to an embodiment;

Figures 19, 20, 21:
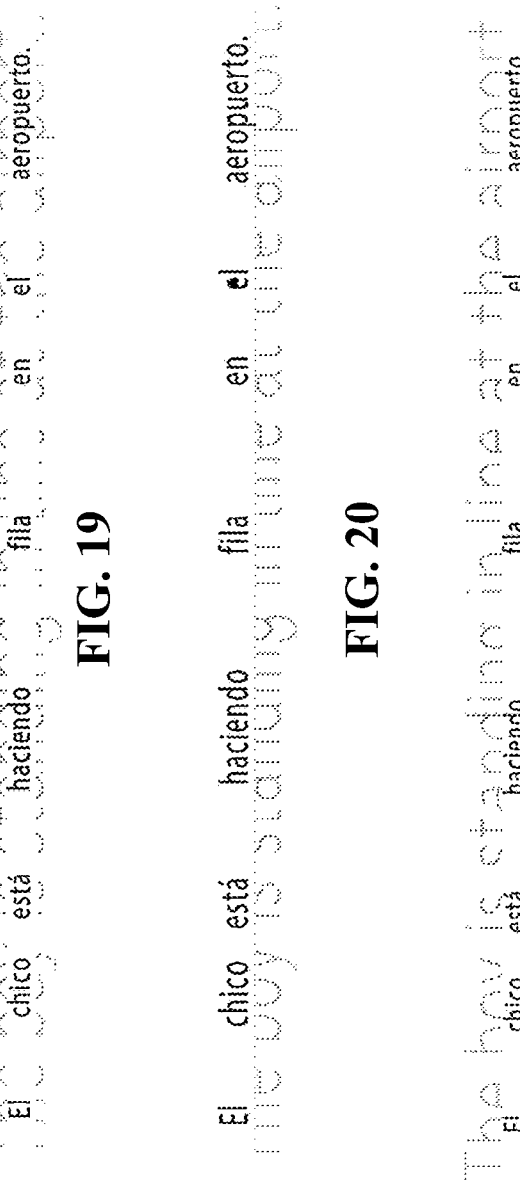
Figures 22, 23, 24:
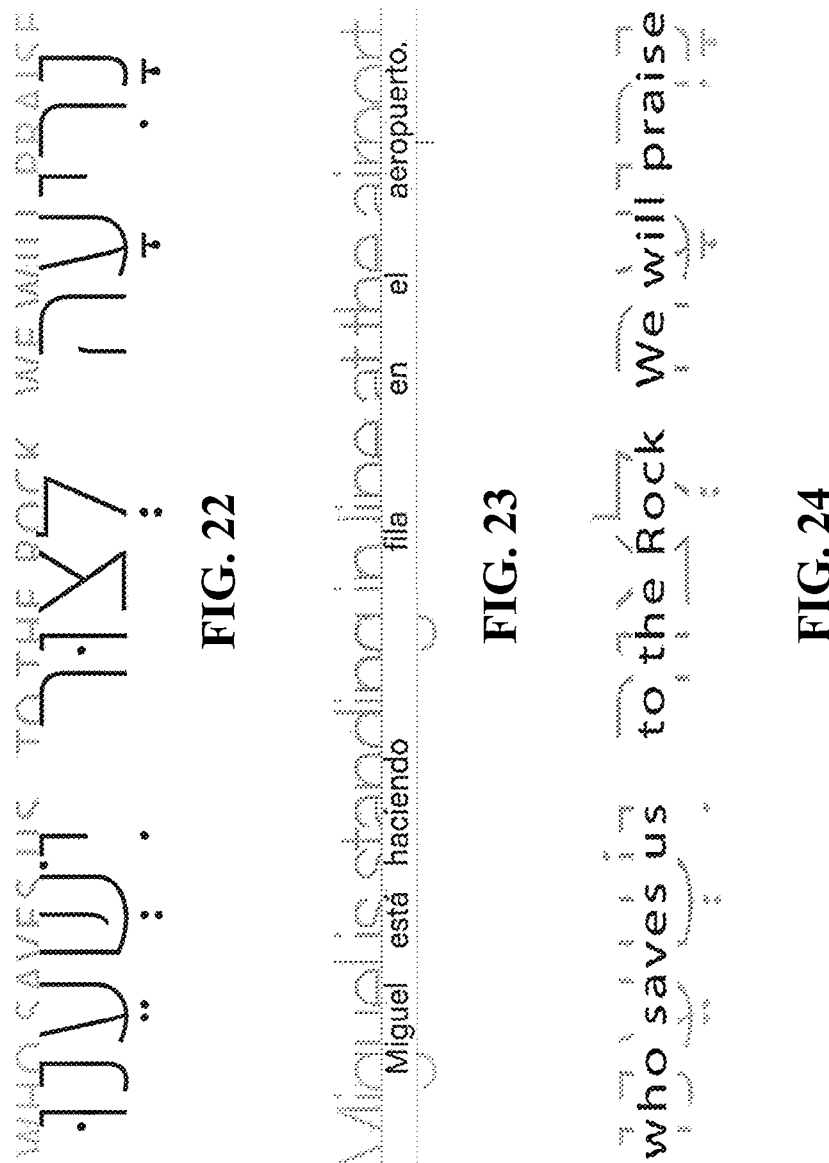

FIG. 19 depicts a composite text of a foreign language text and a truncated translation text in which the foreign language text is embedded within a truncation area sandwiched between upper and lower discriminatory character strokes of the associated truncated translation text, according to an embodiment;

FIG. 20 depicts a composite text of a foreign language text and a truncated translation text in which the foreign language text is embedded within a truncation area above the discriminatory character strokes of the associated truncated translation text, according to an embodiment;

FIG. 21 depicts a composite text of a foreign language text and a truncated translation text in which the foreign language text is embedded within a truncation area below discriminatory character strokes of the truncated translation text, according to an embodiment;

FIG. 22 depicts a composite text of a foreign language text and a truncated translation text in which the foreign language text is embedded within a truncation area below discriminatory character strokes of the associated truncated translation text in a font size smaller than that of the foreign text, according to an embodiment;

FIG. 23 depicts a composite text of a foreign language text and a truncated translation text in which the foreign language text is embedded within a bordered truncation area below discriminatory character strokes of the truncated translation text, according to an embodiment;

FIG. 24 depicts a composite text analogous to FIG. 19 in which English is treated as a foreign language text and Hebrew is treated as a truncated translation text, according to an embodiment.

Figure 25:
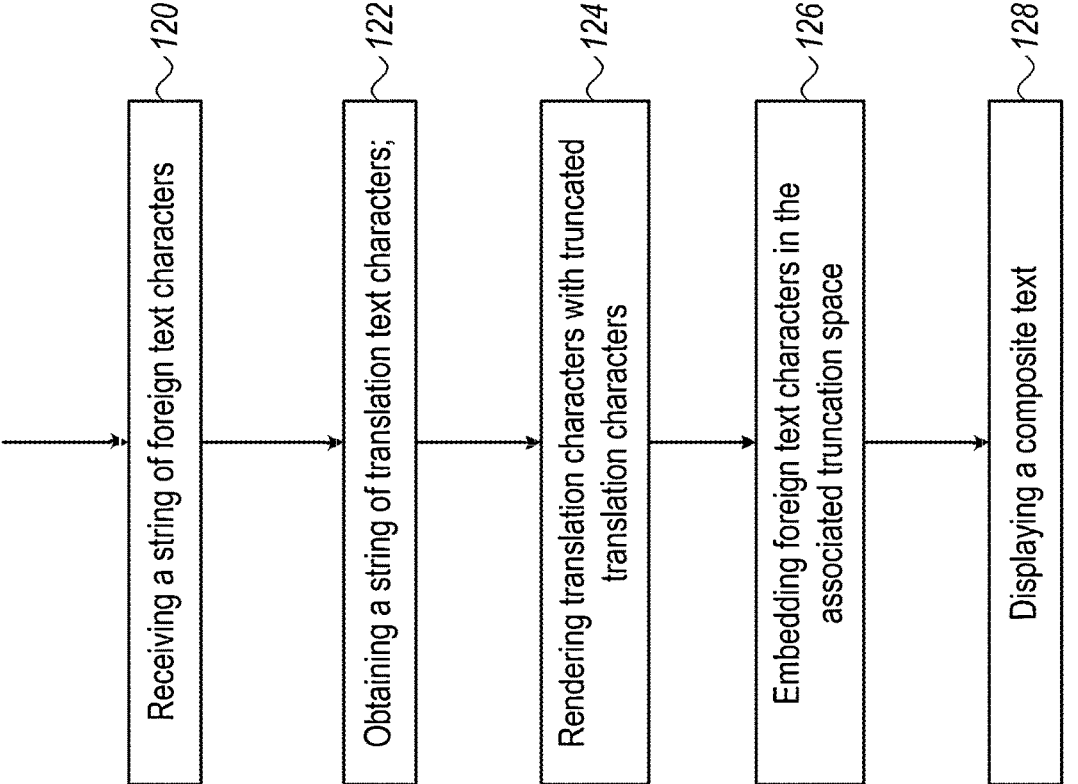

FIG. 25 is a flow chart depicting processing steps employed in the implementation of display schemes embedding foreign language text within a truncation area of a translation text, according to an embodiment.

Figure 26A:
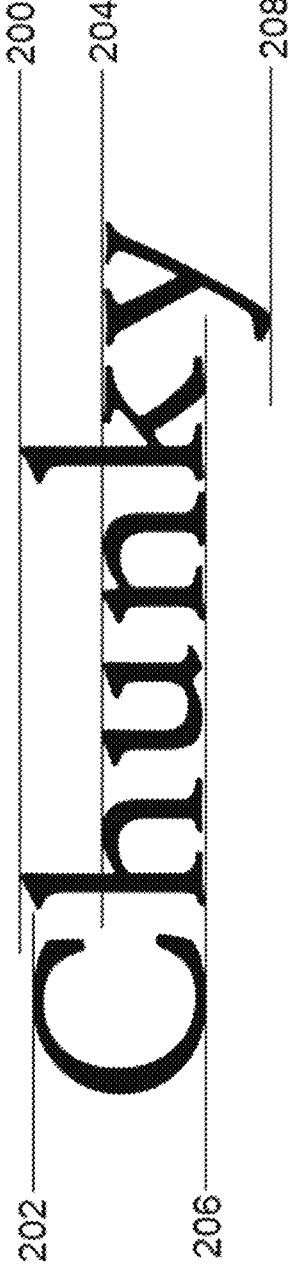
Figure 26B:
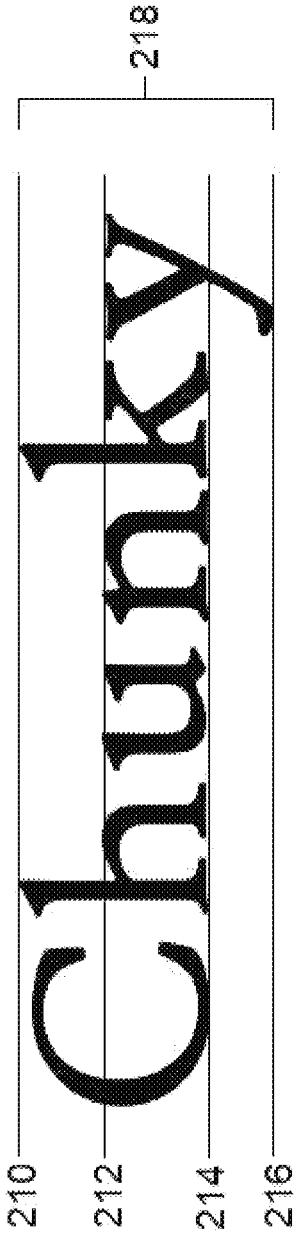
Figure 26C:
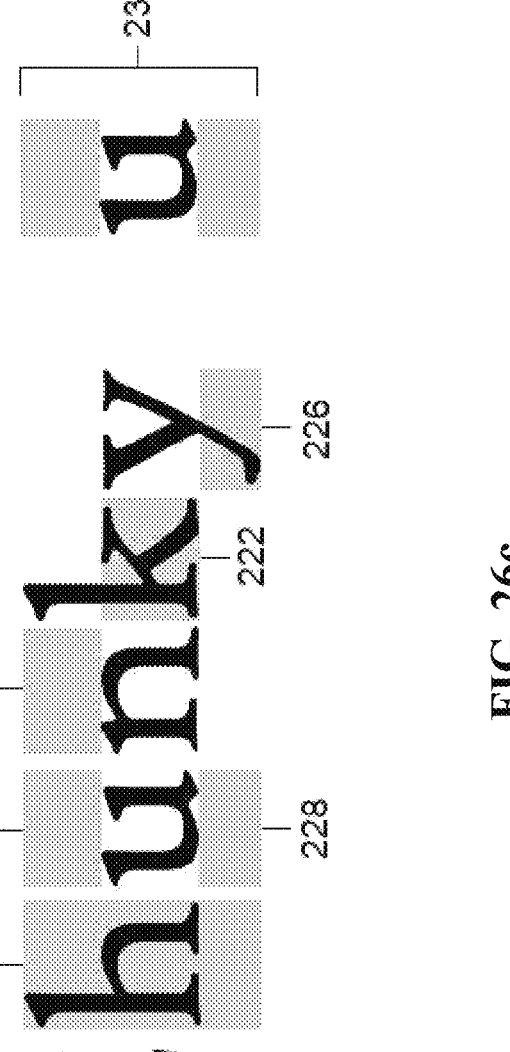

FIGS. 26a-26c show some terms as used throughout this disclosure.

FIGS. 27a-27d show some terms as used throughout this disclosure.

Figure 28:
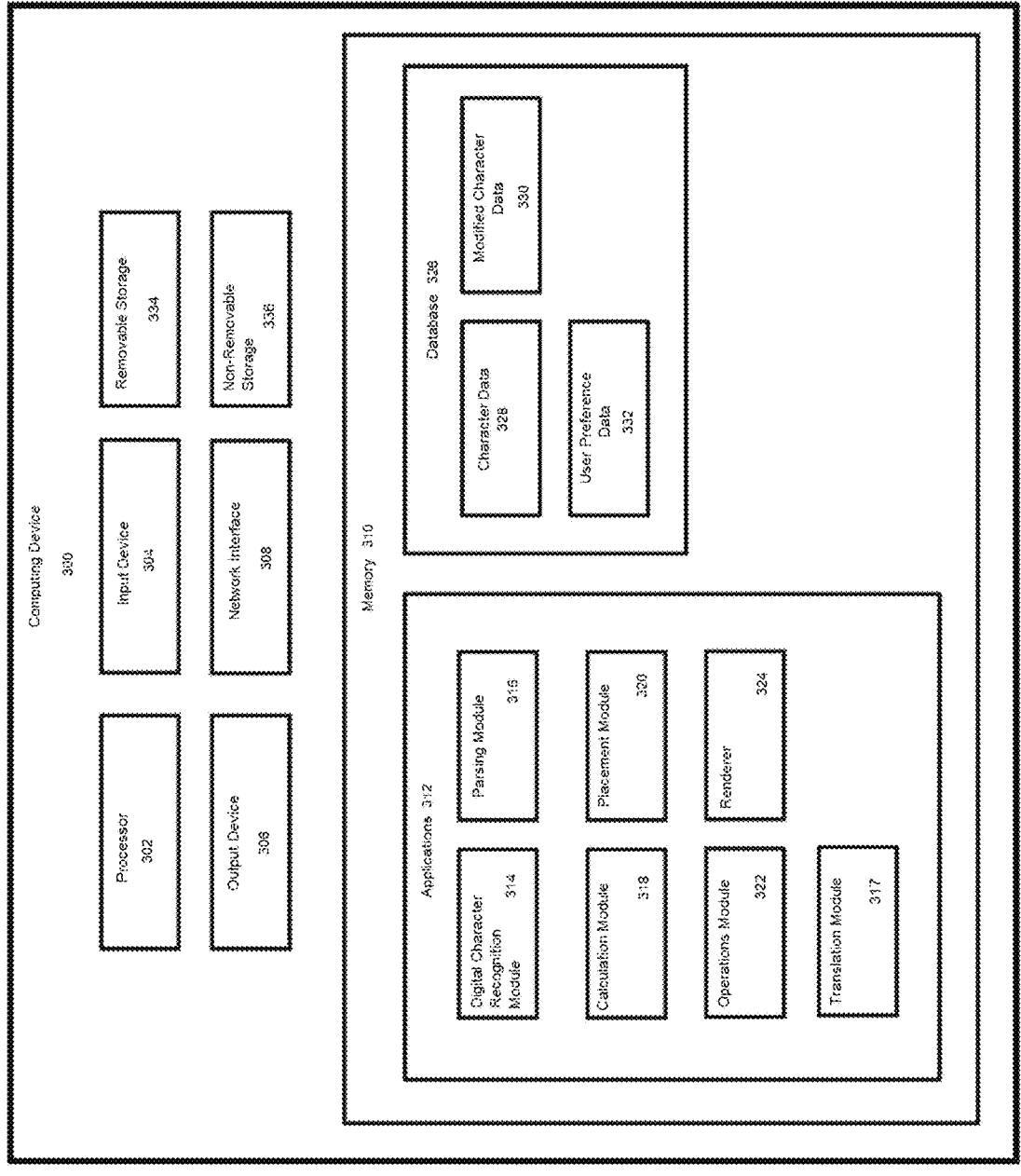

FIG. 28 shows a block diagram illustrating example physical components (e.g., hardware) of a computing device 300 with which aspects of the disclosure may be practiced.

Figure 29:
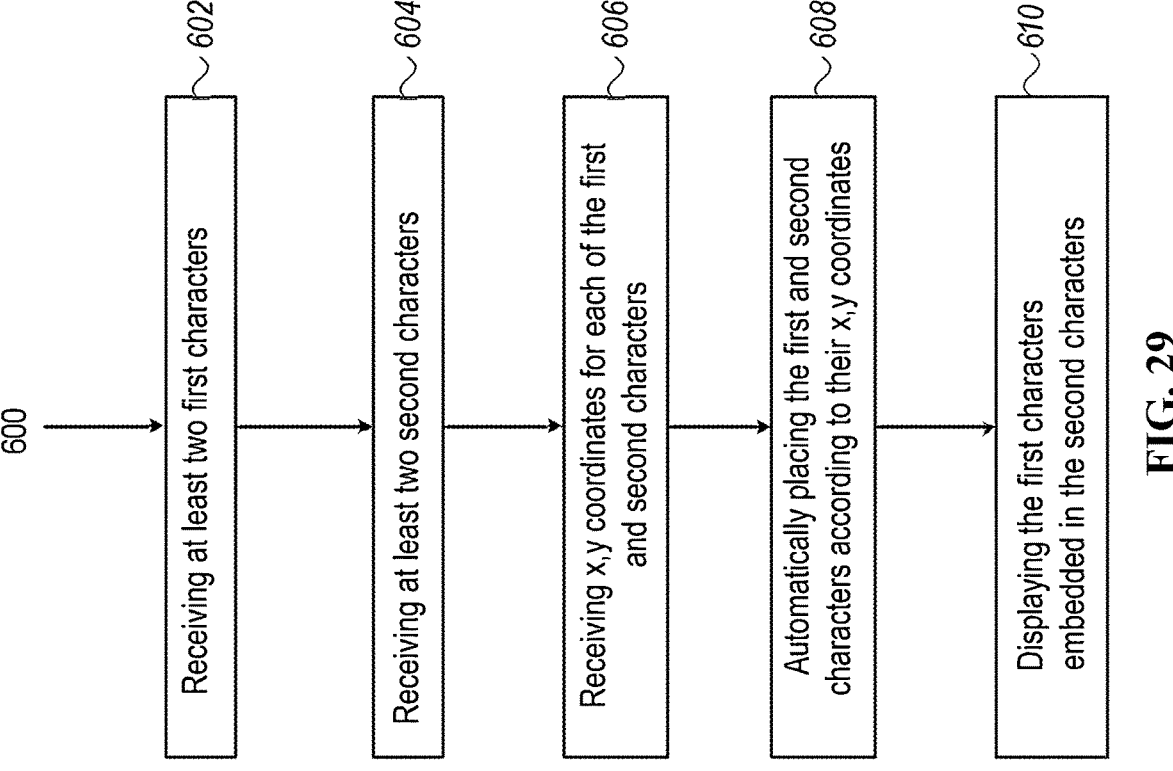

FIG. 29 illustrates an exemplary method for displaying, on an electronic display, two sets of characters in an interference reducing manner, according to an embodiment.

Figure 30:
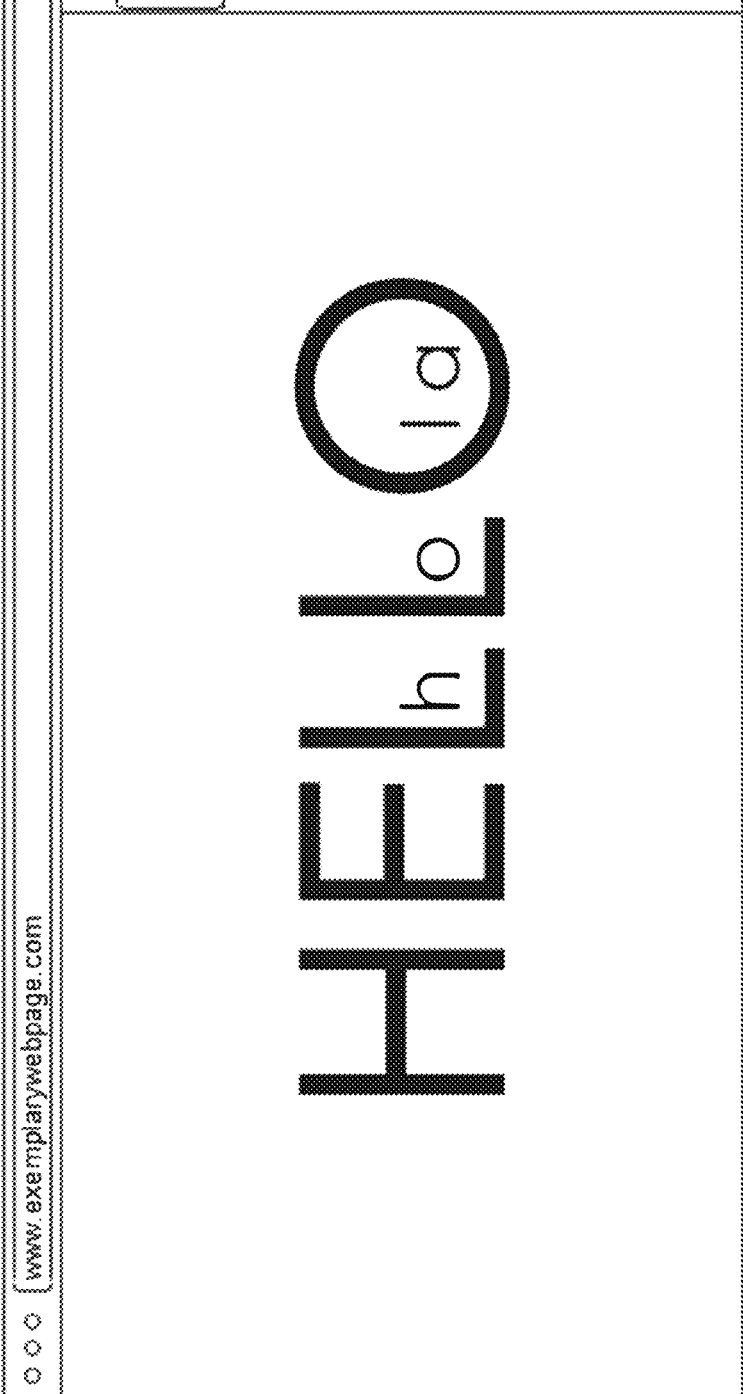

FIG. 30 is an exemplary display created using the method of FIG. 29, according to an embodiment.

Figure 31:
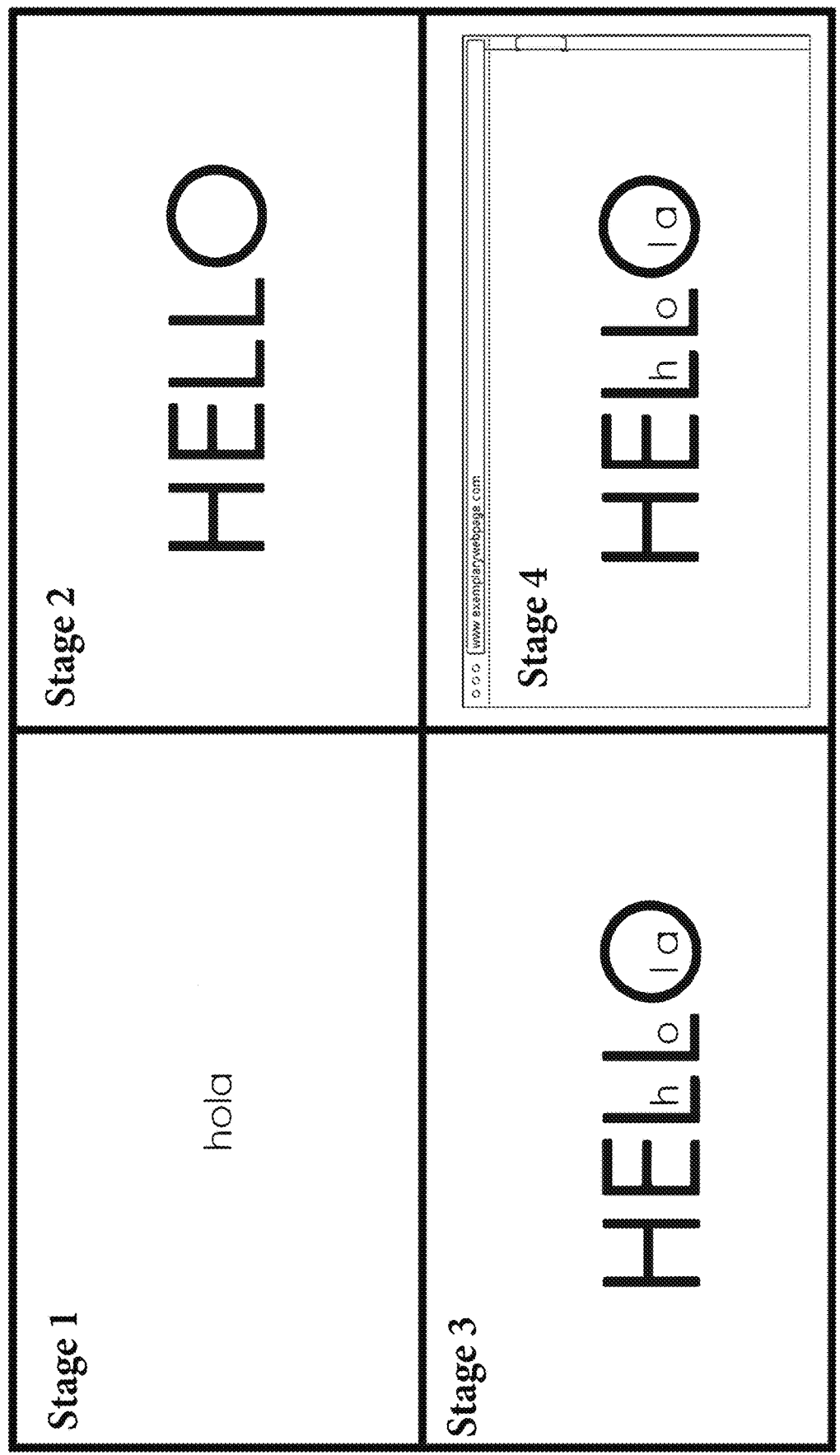

FIG. 31 shows steps of the method of FIG. 29, according to an embodiment.

Figure 32:
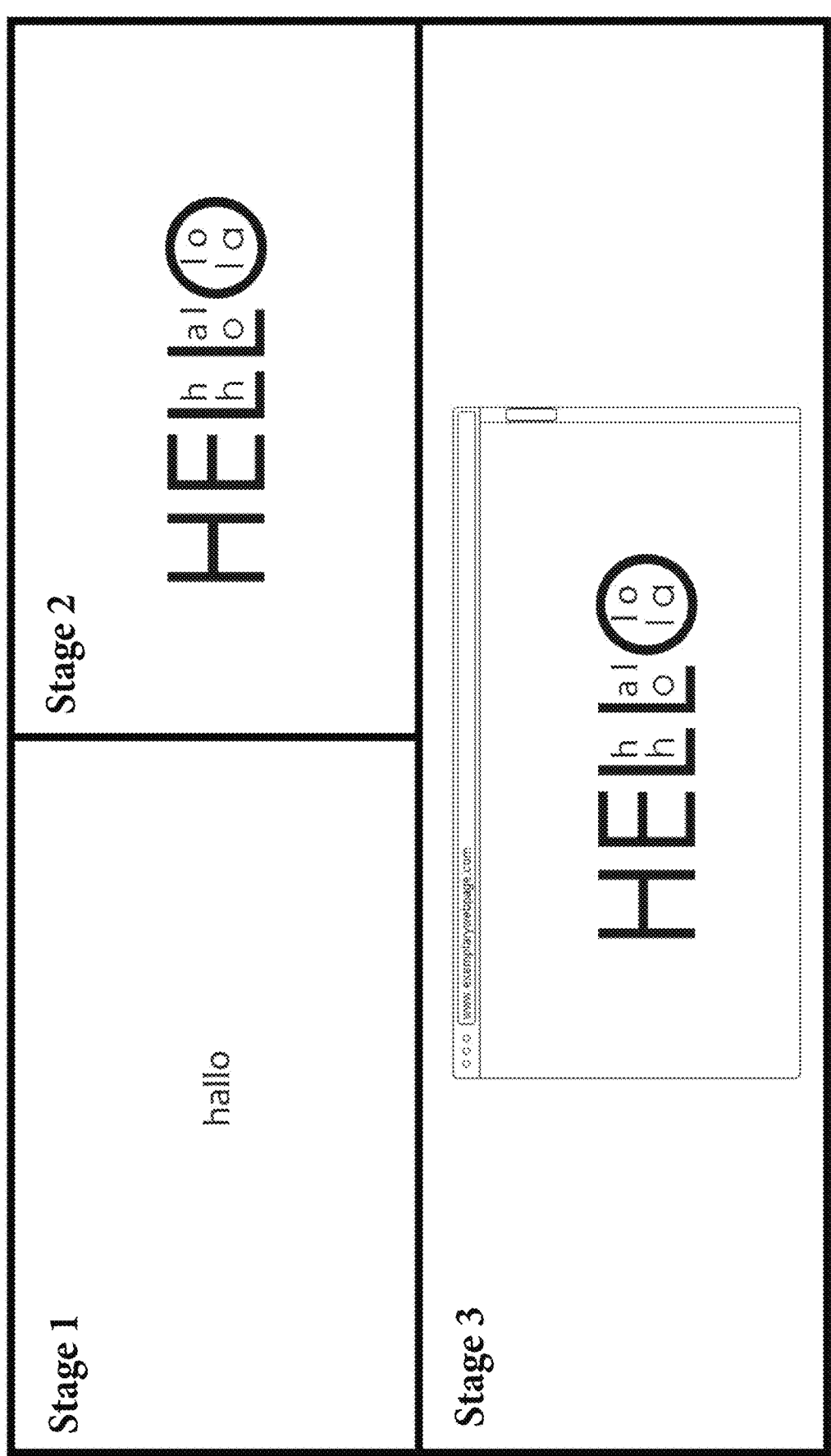

FIG. 32 shows additional steps to the method of FIG. 29, according to an embodiment.

Figure 33:
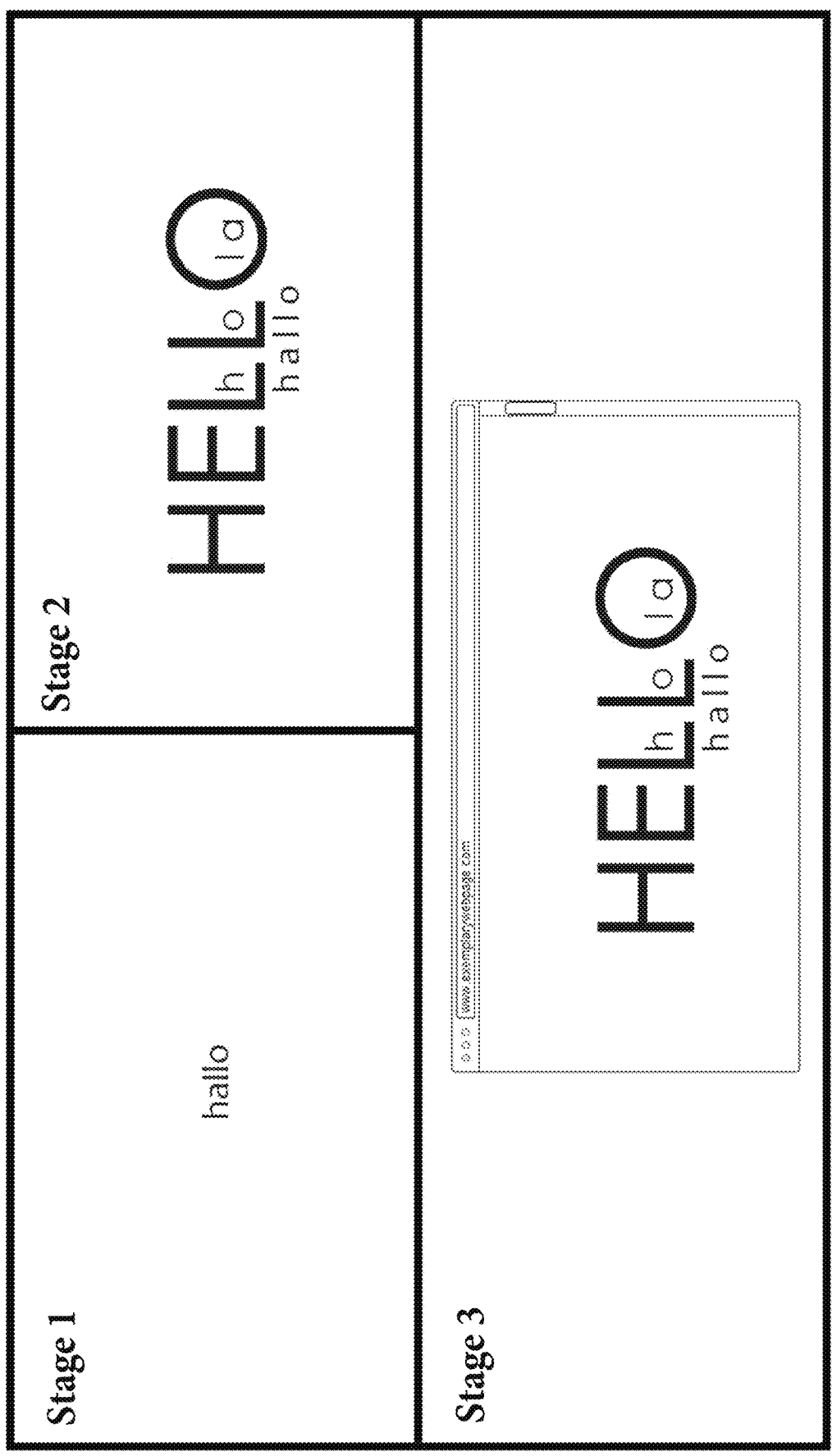

FIG. 33 shows additional steps to the method of FIG. 29, according to an embodiment.

Figure 34:
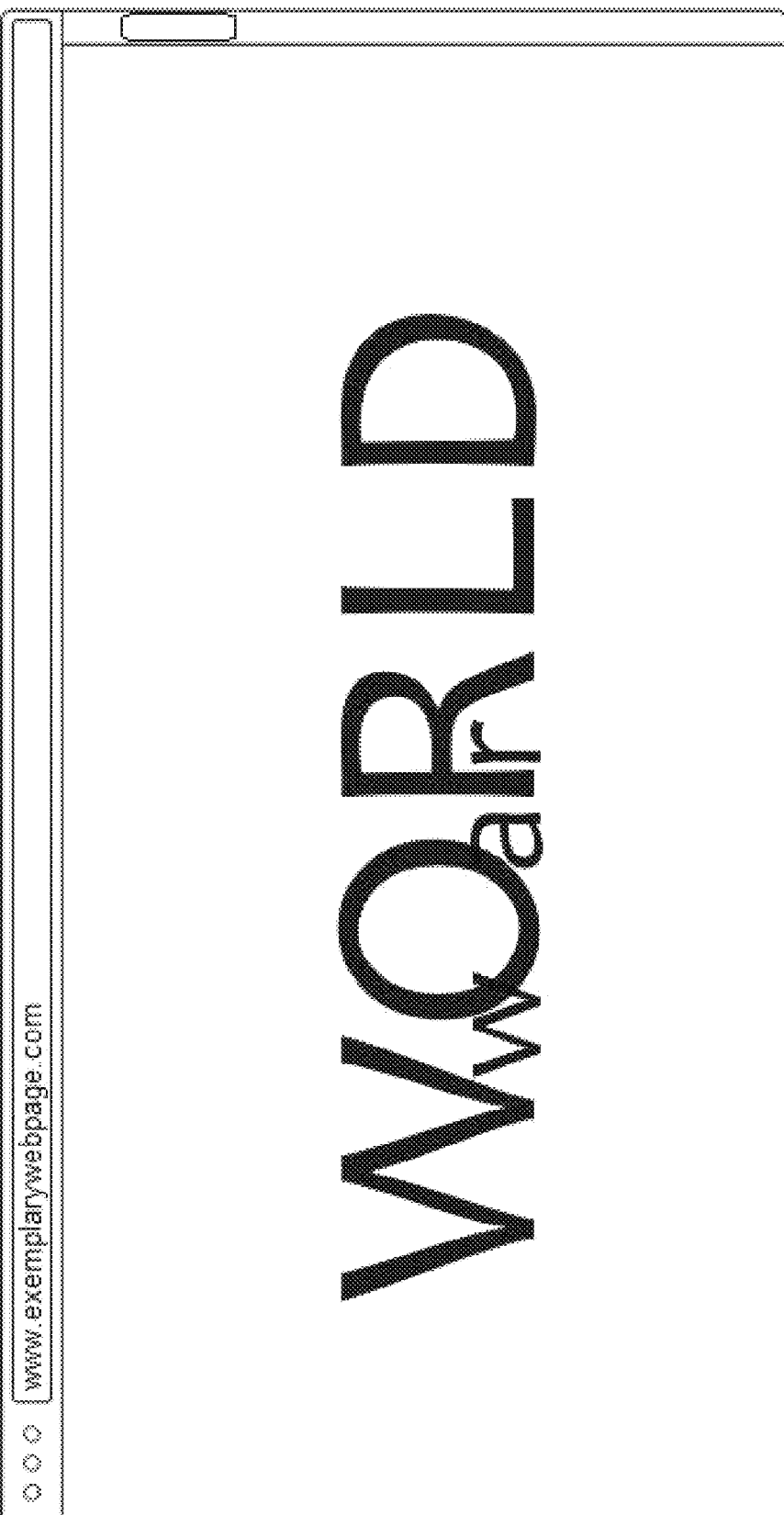

FIG. 34 shows an optional limitation, according to an embodiment.

Figure 35:
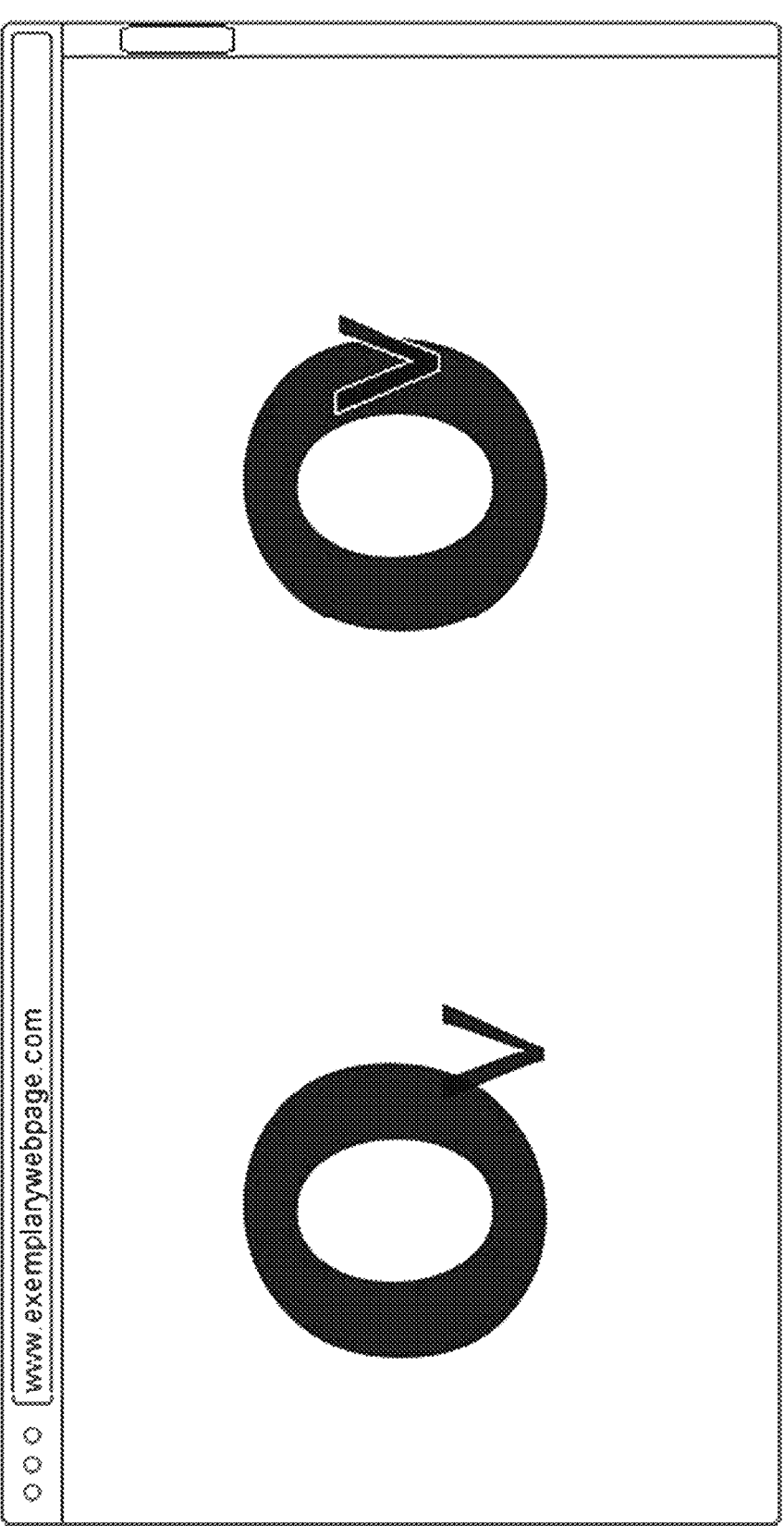

FIG. 35 shows an optional limitation, according to an embodiment.

Figure 36:

FIG. 36 shows additional steps to the method of FIG. 29, according to an embodiment.

Figure 37:
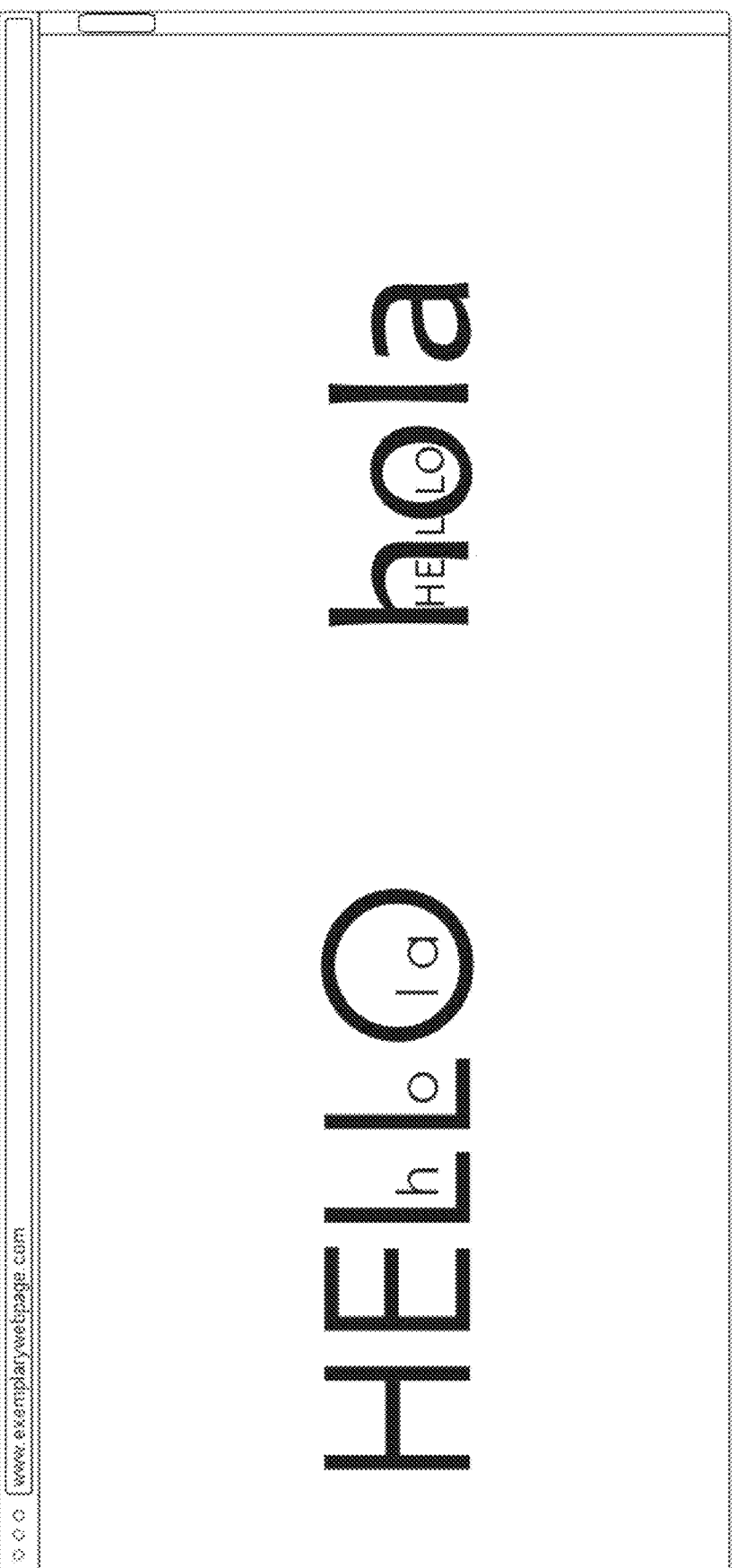

FIG. 37 shows additional steps to the method of FIG. 29, according to an embodiment.

FIG. 38 shows an optional limitation, according to an embodiment.

FIG. 39 shows an optional limitation, according to an embodiment.

Figure 40:

FIG. 40 shows demarcated texts.

6

It will be appreciated that for the sake of clarity, elements shown in the figures are not necessarily drawn to scale and reference numerals may be repeated among figures to indicate corresponding or analogous elements.

DETAILED DESCRIPTION

Implementations of the present technology will now be described in detail with reference to the The following description sets forth various details to provide a thorough understanding of the invention and it should be appreciated, by those skilled in the art, that the present invention may be practiced without these specific details. Furthermore, well-known methods, procedures, and components have been omitted to highlight the present invention.

As noted, the current invention is a rendering engine directed to displaying a two separate content strings in a single text line in a manner complying with readability and legibility requirements.

For the sake of convenience, the terms used to describe the prior art and various embodiments of the present invention are defined below. Some terms are illustrated in FIGS. 26a-27d for further clarification. It should be noted that these definitions are provided to merely aid in understanding the descriptions, and they do not, in any way, limit the scope of the present invention. Following are terms to be used throughout this document:

"Input text" or "input language" refers to a text string input to the system. Text includes numbers, letters, symbols, and acronyms in accordance with language conventions.

"English" is considered the translation language for the purposes of this document. It should be appreciated that a language is deemed to be a foreign-text entirely on the basis of user preference and the present rendering engine provides user configurability to enable users to define the language to be treated as a foreign language and the language to be treated as a translation language.

"Typeface" and "character" refer to the actual letter body. For clarity reasons, a "body" of a character refers to the actual letter body in some instances.

A "font" is a typeface rendered in a treatment, weight, and size. For example, a "Times New Roman typeface rendered with italic treatment, bold weight, and 12 pt size is a Times New Roman, italic bold 12 pt" font. In addition to these font parameters, the font also includes a side bearing around the typeface set by the font designer. Font data includes this data for these parameters and spacing parameters.

"Framing character" refers to a character enclosing region of sufficient area to contain one or more receiving regions. Enclosing two or more complete sides is deemed to be enclosing.

"Counter" refers to an area enclosed on at least two sides by a framing character with an area of sufficient size to enclose one or more receiving regions.

In a certain embodiment, the counter of each framing character is implemented with the same width. In another embodiment, the counter width of framing characters is word specific and can vary on a word by word basis.

"Center text" or "center characters" refers to characters disposed within receiving regions; either inside framing-character counters, in-between framing characters, or both inside and in-between framing characters simultaneously. Center characters shifted vertically or horizontally from the center of a receiving region are still deemed to be a center character if minimally enclosed by a framing character.

"Framing character spacing" refers to intra-word spacing between framing characters, in a certain embodiment. It is defined by one or more widths of the receiving regions in accordance with configuration preferences. For example, the spacing between framing letters is configurable as one, two, or three receiving regions. In another embodiment, intra-word spacing is defined by unfilled receiving regions within counters of framing characters contacting each other.

Inter-word spacing of framing characters between words may be greater than the intra-word spacing of framing characters, in accordance with configuration preferences. It should be noted that these are minimum inter-word spacing of framing characters. In certain situations when the number of center characters exceeds the number of receiving regions available within a framing word, the spacing between framing words will be increased by the number of receiving regions necessary to receive the center characters.

"Center character spacing" refers to the spacing between center characters within words and is defined by side bearings built into the font file of the center character by font designers, in a certain embodiment. The juxtaposition of side bearings of adjacent center characters provides natural spacing by aligning the advance width of the center characters with the points of division defining receiving region boundaries, as will be further discussed. In a certain embodiment, negative side bearings are employed to define spacing between center characters when the center characters are implemented as script.

"Truncation" refers to removing one or more character strokes to reduce character clutter. As noted, traversing characters may add legibility and therefore enable a reader to discern one character from another even if a portion of the character is absent. In certain embodiment, truncation may also refer to removal of ascenders or descenders.

Figure 18:
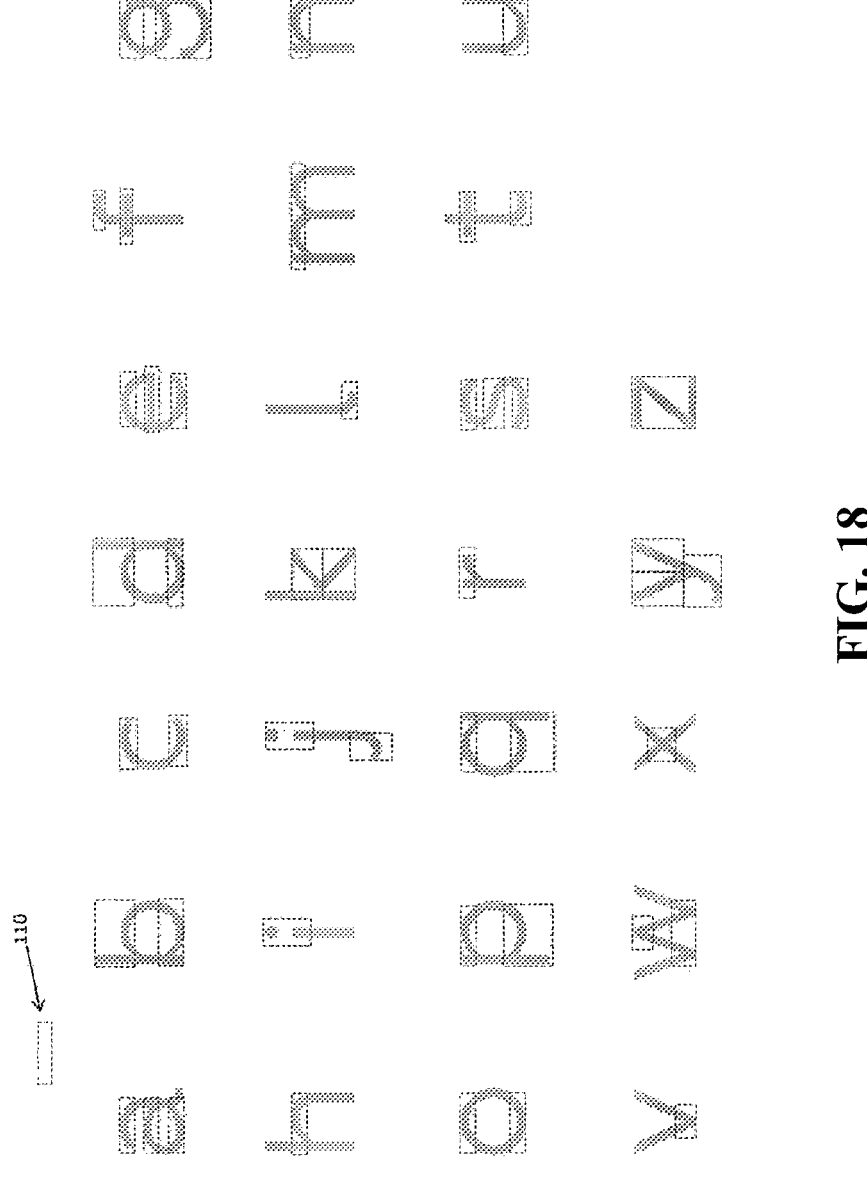
FIG. 18 is a listing of lowercase English letters and sample distinguishing character strokes that can be used to distinguish one character from another; according to an embodiment.

"Discriminatory character strokes" (Also called distinguishing character strokes) refer to character strokes that may distinguish one character from another even in the absence of a portion of the character strokes as will be further discussed in the context of FIG. 18.

In a certain embodiment, the center characters are glyph justified to achieve alignment of the advance width of center characters with demarcation points dividing a display space into receiving regions.

In a certain embodiment, the center characters are implemented as kerning-modified side bearings defining center character spacing within cell boundaries.

It should be noted that although all embodiments depict display schemes employing horizontal counter-filling or counter stroke embedding, in a certain embodiment vertical counter filling or counter stroke embedding are employed.

"Display" (verb): The verb display, unless specified otherwise, refers to the act of presenting texts and/or content strings in any format that may be perceived by a reader of the texts and/or content strings, for example, but not limited to, presenting the texts and/or content strings on digital screens, printed medium, as holographs, and the like.

"Display" (noun): The noun display, unless specified otherwise, refers to any sort of presentation of texts and/or content strings that may be perceived by a reader of the texts and/or content strings, for example, but not limited to, a presentation of the texts and/or content strings on digital screens, printed medium, as holographs, and the like.

"Ascender height" 200: The height of the ascenders, considered characteristic of a given typeface, font, or script. As illustrated in FIG. 26*a*, the ascender height of "Chunky" would be the height of the topmost points of the "h" and "k." The ascender height is sometimes referred to throughout the detailed description as the topmost point of a text in cases where the ascender height of a text is greater than or equal to the cap height of a text.

"Ascender line": A horizontal line at the ascender height of a given typeface, font, or script.

"Cap height" 202: The height of capital letters, considered characteristic of a given typeface, font, or script. As illustrated in FIG. 26*a*, the cap height of "Chunky" would be the height of the topmost point of the "C." The cap height is sometimes referred to throughout the detailed description as the topmost point of a text in cases where the cap height of a text is greater than or equal to the ascender height of a text.

"Cap line": A horizontal line at the cap height of a given typeface, font, or script.

"X-height" 204: The height of a lower-case x, considered characteristic of a given typeface, font, or script. As illustrated in FIG. 26*a*, the x-height of "Chunky" would be the height of the topmost points of the "u," "n," and "y." It shall be appreciated that for typefaces that do not employ Latin characters, such as Hebrew, an equivalent mean-height concept is applicable.

"X-height line": A horizontal line at the x-height of a given typeface, font, or script. It shall be appreciated that for typefaces that do not employ Latin characters, such as Hebrew, an equivalent mean-line concept is applicable.

"Base height" 206: The height of the base of most letters of a given typeface, font, or script, typically set to 0. As illustrated in FIG. 26*a*, the base height of "Chunky" would be the height of the bottommost points of the "C," "h," "u," "n," and "k."

"Base line": A horizontal line at the base height of a given typeface, font, or script.

"Descender height" 208: The height of the descenders, considered characteristic of a given typeface, font, or script. As illustrated in FIG. 26*a*, the descender height of "Chunky" would be the height of the bottommost point of the "y." The descender height is sometimes referred to throughout the description as the bottommost point of a text. "Descender line": A horizontal line at the descender height of a given typeface, font, or script.

"Text ceiling" 210: The typical position of the topmost points of a text, considered characteristic of a given typeface, font, or script. As illustrated in FIG. 26*b*, the text ceiling of the characters in "Chunky" is the position of topmost points of the "h," and "k."

"Text x-height" 212: The typical position of the x-height line of a text, considered characteristic of a given typeface, font, or script. As illustrated in FIG. 26*b*, the text x-height of the characters in "Chunky" is near the topmost points of the "u," "n," and "y." It shall be appreciated that for typefaces that do not employ Latin characters, such as Hebrew, an equivalent text mean-height concept is applicable.

"Text base line" 214: The typical position of the base line of a text, considered characteristic of a given typeface, font, or script. As illustrated in FIG. 26*b*, the text base line the characters in "Chunky" is near the bottommost points of the "C," "h," "u," "n," "k", and "y."

"Text floor" 216: The typical position of the bottommost points of a text, considered characteristic of a given typeface, font, or script. As illustrated in FIG. 26*b*, the text floor of the characters in "Chunky" is the position of the bottommost point of the "y."

"Text height" 218: The typical distance from the text floor to the text ceiling, considered characteristic of a given typeface, font, or script. As illustrated in FIG. 26*b*, the text height of the characters in "Chunky" is the distance from the bottommost point of "y" to the topmost points of "h" and "k."

"Footprint" 220: A rectangular area for each character, the bottom edge of the footprint bounded by a horizontal line at the text floor, the top edge of the footprint bounded by a horizontal line at the text ceiling, the left edge of the footprint bounded by a vertical line at the leftmost point of the character, and the right edge of the footprint bounded by a vertical line at the rightmost point of the character. As illustrated in FIG. 26*c*, the footprint of the "h" in "Chunky" is highlighted with a grey reference box behind the "h." The bottom edge of the footprint is bounded by a horizontal line at the text floor, the top edge of the footprint is bounded by a horizontal line at the text ceiling, the left edge of the footprint is bounded by a vertical line at the leftmost point of "k", and the right edge of the footprint is bounded by a vertical line at the rightmost point of "k".

"Inner airspace" 222: A rectangular area for each character, the bottom edge of the airspace bounded by the text base line, the top edge of the airspace bounded by the text x-height line, the left edge of the airspace bounded by a vertical line at the leftmost point of the character, and the right edge of the airspace bounded by a vertical line at the rightmost point of the character. As illustrated in FIG. 26*c*, the inner airspace of the "k" in "Chunky" is highlighted with a grey reference box behind the "k." The bottom edge of the airspace is bounded by the text base line of "k", the top edge of the airspace is bounded by the text x-height line of "k", the left edge of the airspace is bounded by a vertical line at the leftmost point of "k", and the right edge of the airspace is bounded by a vertical line at the rightmost point of "k".

"Upper airspace" 224: A rectangular area for each character, the bottom edge of the airspace bounded by the text x-height line, the top edge of the airspace bounded by a horizontal line at the text ceiling, the left edge of the airspace bounded by a vertical line at the leftmost point of the character, and the right edge of the airspace bounded by a vertical line at the rightmost point of the character. As illustrated in FIG. 26*c*, the upper airspace of the of the "n" in "Chunky" is highlighted with a grey reference box. The bottom edge of the airspace bounded by the text x-height line of "n", the top edge of the airspace is bounded by a horizontal line at the text ceiling, the left edge of the airspace is bounded by a vertical line at the leftmost point of "n", and the right edge of the airspace bounded by a vertical line at the rightmost point of "n".

"Lower airspace" 226: A rectangular area for each character, the bottom edge of the airspace bounded by a horizontal line at the text floor, the top edge of the airspace bounded by a horizontal line at the text base line, the left edge of the airspace bounded by a vertical line at the leftmost point of the character, and the right edge of the airspace bounded by a vertical line at the rightmost point of the character. As illustrated in FIG. 26*c*, the lower airspace of the of the "y" in "Chunky" is highlighted with a grey reference box. The bottom edge of the airspace is bounded by a horizontal line at the text floor, the top edge of the airspace is bounded by the text base line of "n", the left edge of the airspace is bounded by a vertical line at the leftmost point of "n", and the right edge of the airspace bounded by a vertical line at the rightmost point of "n".

"Outer airspace" 228: The combination of the upper airspace and the lower airspace of each character. As illustrated in FIG. 26*c*, the outer airspace of the "u" in "Chunky" is highlighted with grey reference boxes.

"Character height" 230: The distance from the bottommost point of the outer airspace to the topmost point of the outer airspace of a character. As illustrated in FIG. 26*c*, the character height of the "u" in "Chunky" would be the distance from the bottommost point of the outer airspace to the topmost point of the outer airspace of the "u."

Figures 27A, 27B:
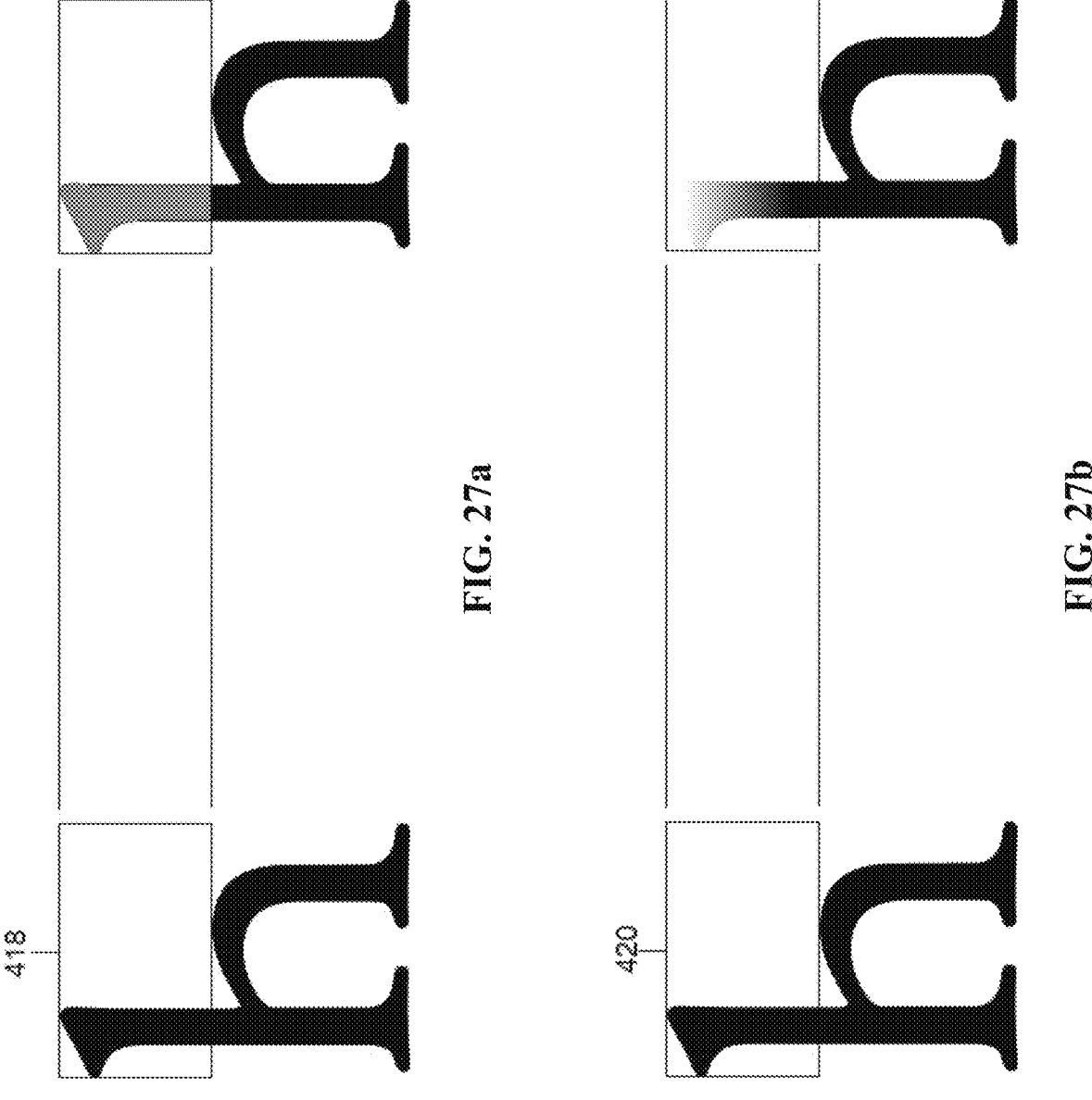
Figures 27C, 27D:
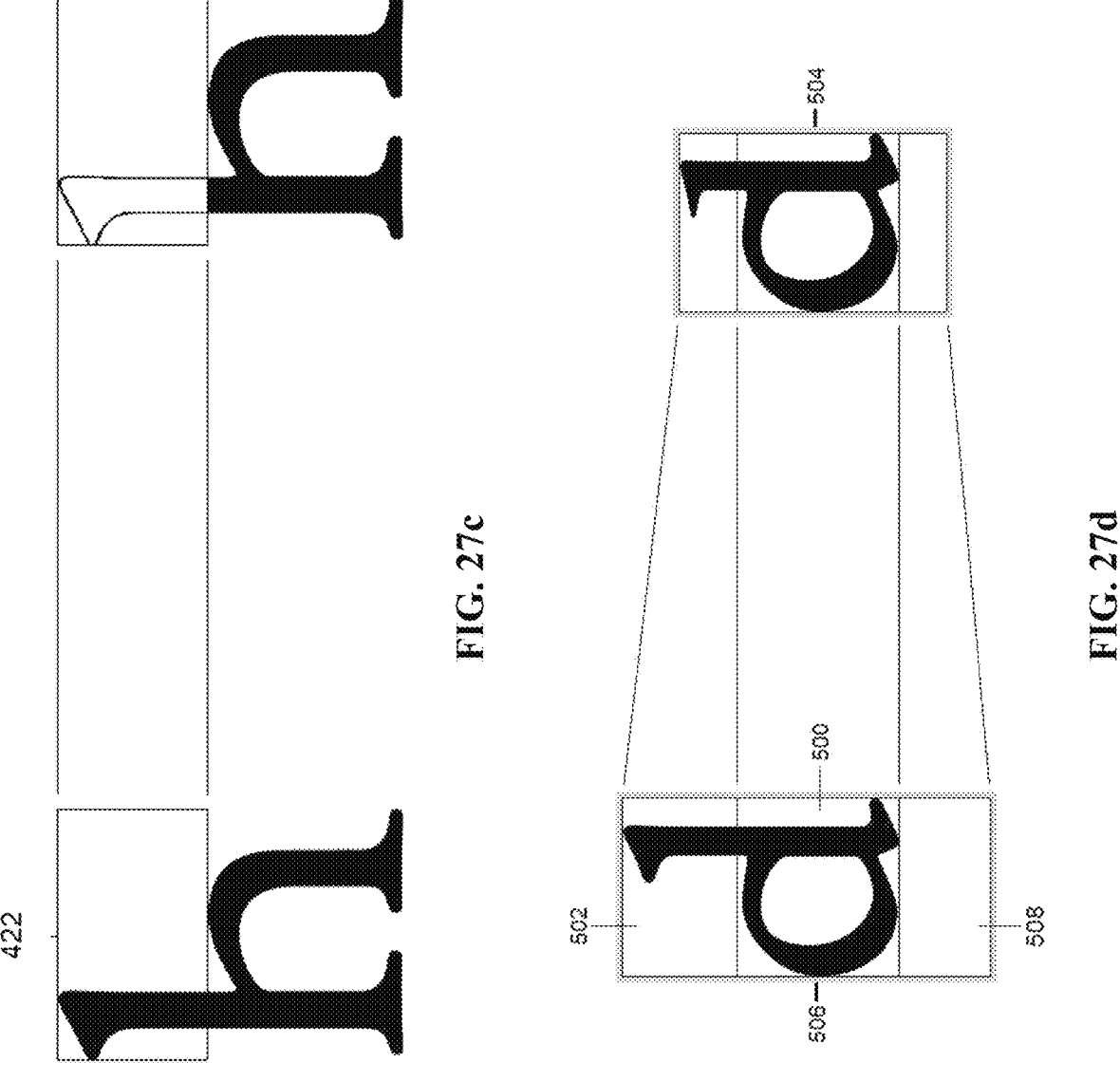

"Deemphasis" is any modification to the entire character that makes the deemphasized character less prominent than the original character or a nearby character. In the case of partial deemphasis, deemphasis is any modification to a portion of a character that makes the deemphasized portion of the character less prominent than a remainder of the character. Deemphasis may include, but is not limited to, scaling down, shading, gradual shading, hollowing-out, truncation, etc. For example, FIG. 27*a* shows an upper airspace portion of the character "h" deemphasized via shading, FIG. 27*b* shows an upper airspace portion of the character "h" deemphasized via gradually shading, and FIG. 27*c* shows an upper airspace portion of the character "h" deemphasized via being hollowed-out, and FIG. 27*d* shows the upper 502 and lower 508 airspace portions of the "d" deemphasized via being scaled down (Scaling down is any modification that changes a height of a portion of a character without changing its width). In some embodiments, deemphasizing a character may include moving that character away nearby text. Deemphasizing an entire character draws attention away from the deemphasized character while deemphasizing a portion of a character relative to a remainder of the character draws attention away from the deemphasized portion.

A "Meaningful unit" is a text string comprised of at least three characters that conveys a meaning. In an embodiment, meaningful units include words having at least three characters. For example, "dog." In another embodiment, meaningful units include acronyms having at least three characters. For example, "CIA". Meaningful units can be words, phrases, sentences, and longer structures such as paragraphs.

The "Character composition" of a meaningful unit is the specific identity and order of characters that comprise that meaningful unit. For example, the character composition of the first word of this sentence is "For". The character composition of the second word of this sentence is "character".

The "Style" of a character includes its font, size, and other typographic parameters that dictate the appearance of the character. Style does not include character identity.

Turning now to the figures, FIGS. 1A-1C depict various types of prior art directed at providing a translation to a foreign-language text. As shown, in FIG. 1A the translation is presented as a separate text line disposed to the side of the foreign-language text whereas in FIG. 1B the translation is disposed underneath the foreign text, and in FIG. 1C the translation is presented both to the side and underneath of the foreign-language text. As previously noted, all of these display configurations whether displayed as virtual text on a display screen or as printed text all fatigue the reader because of required eye shift.

Figure 2:
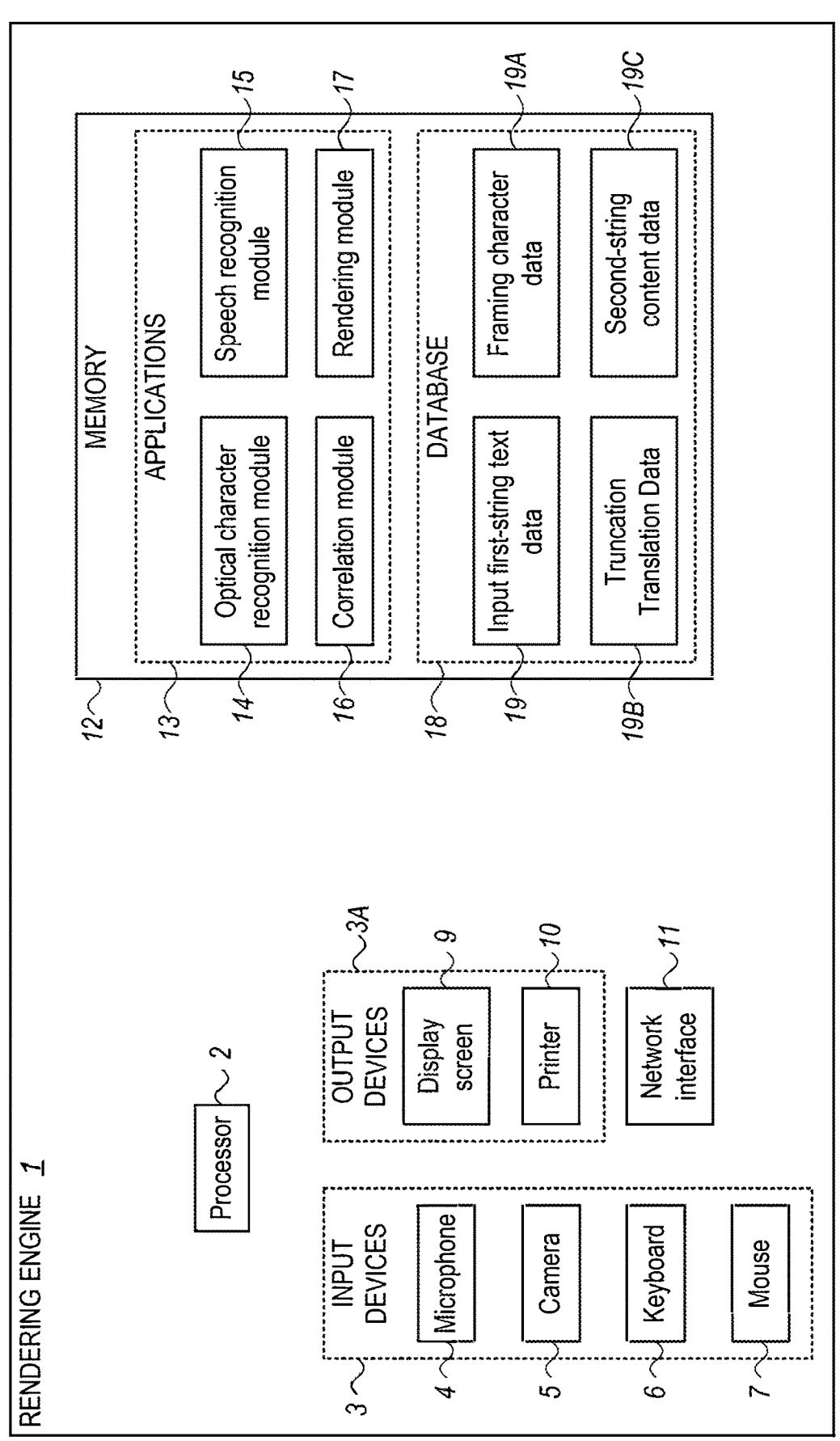
FIG. 2 is a schematic block diagram of a rendering engine, according to an embodiment.

FIG. 2 is a schematic block diagram of rendering engine 1 configured to display two or more text strings as a composite text in a single line. It should be noted that for the purposes of this document a series of pictures is deemed to be a content string.

In a certain embodiment, the rendering engine 1 includes at least one processor 2 and input devices 3 including a microphone 4 for speech capture, a camera 5 for visual text capture, a keyboard 6, and a mouse 7. Output devices 3A include a display screen 9 in any of the various forms associated with computing devices, and a printer 10. Engine 1 also includes a network interface 11 for network enablement. It should be appreciated that processing may be implemented either locally or remotely via various forms of wireless or wired networking technologies or a combination of both.

Memory 12 includes various types of short and long-term memory as is known in the art. Memory 12 is loaded with various applications or algorithms including optical character recognition module 14 for rendering captured text images into text, a speech recognition module 15 for rendering recorded speech into foreign-language text, a correlation module 16 for accessing various types of content strings in accordance with the particular application, and a text rendering module 17 for displaying a composite text in a single text string as will be further discussed. Memory 12 also includes a database 18 of input first-string text data 19 and second-string content data 19C. Second-string content may be linked to input data as a semantic linkage, currency equivalence, pricing, advertising material, writing style, telephone numbers, dates, time, and pictorial content, for example. Framing character data 19A of adapted framing characters having required counter geometries enabling composite-text display. Data file 19B is loaded with predefined truncated translation characters in which various character fonts are removed but possess discriminatory character strokes enabling a reader to identify the truncated characters from other characters and understand the translation text, as will be further discussed.

Engine 1 is operative to employ various font technologies like raster, vector, TrueType, and Microsoft OpenType and database 18 also includes associated font-resource files.

It should be appreciated that in a certain embodiment, translation module 16 is configurable to translate various foreign languages into either English or other chosen languages. Accordingly, database 18 includes all necessary content and in a certain embodiment is implemented locally whereas in another embodiment it is implemented remotely. It should be appreciated that pre-translated content is also stored with translation data and is employed when processing text in which pre-translated content is available, according to an embodiment.

FIGS. 3A-3D depict various, sample framing characters having a standardized typeface geometry forming a counter width equal to an integer multiple of receiving region widths, with an area within the counter devoid of a traversing stroke so as to enable and having height sufficient to receive receipt of ascenders or descenders of center characters within the receiving regions without contacting the framing characters, in a certain embodiment. It should be noted that the reference grid highlights a series of monospace demarcations in a display space defining placement of receiving regions and is shown as a grid to highlight the basis of a spacing scheme; the grid is absent when the composite-text is displayed.

Figure 3A:
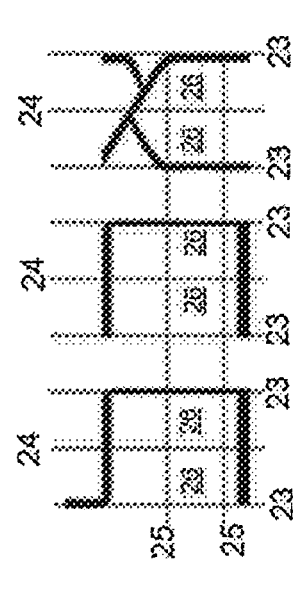
FIGS. 3A-3D are various samples of framing characters depicted in reference grids highlighting receiving regions disposed within counters of the framing characters, according to an embodiment.

Specifically, FIG. 3A depicts sample English framing characters in a reference grid highlighting two receiving regions 22 within the counter of each of the English framing characters. As shown, each of the two receiving regions 22 between reference lines 20 and counter median 21 have widths that are fractions of the counter width highlighted by reference lines 20. It should be appreciated that, generally, the cumulative width of receiving regions is substantially equal to the width of the counters of the framing characters.

Figure 3B:
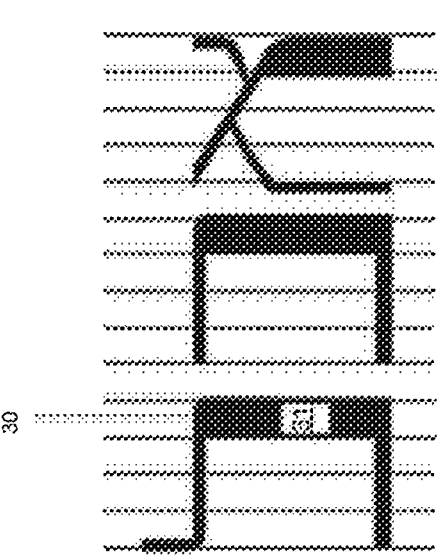

FIG. 3B depicts sample Hebrew framing characters in a reference grid highlighting two receiving regions 26 within each of the Hebrew framing characters. Here too, each of the two receiving regions 26, between reference lines 23 and counter median 24 have a width which is fraction of the counter width. Horizontal reference lines 25 depict a necessary geometry requirement of the framing character to provide sufficient height in the receiving region to receive a center character in the absence of contact between an ascender or descender with the framing letter.

Figure 3C:
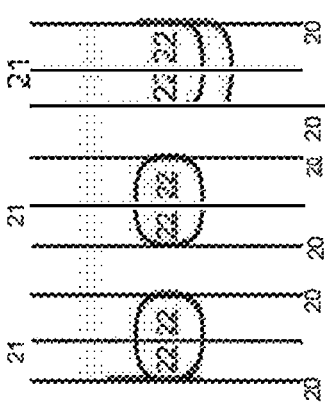

FIG. 3C depicts sample Hebrew framing characters in a reference grid analogous to the sample depicted in FIG. 3B. As shown, four receiving regions 26 collectively span the counter width highlighted by reference lines 27. Two of the four receiving regions 27 are disposed on each side of counter median 28. In this manner center characters populating receiving regions 27 are offset from the middle of the framing counter. Here too, horizontal reference lines 29 depict a necessary geometry requirement of the framing character to provide sufficient height in the receiving region to receive a center character in the absence of contact between an ascender or descender with the framing letter.

Figure 3D:
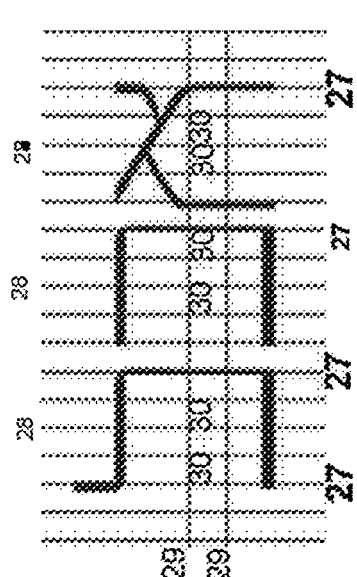

FIG. 3D depicts Hebrew framing characters in a reference grid analogous to the sample depicted in FIG. 3C in which a vertical stroke 30 of the framing has a width substantially equal to the width of any of the three receiving regions whose collective widths span the counter. Vertical stroke 30 includes a window 31 for receipt of a center character to be read together with center characters disposed in other receiving regions. As shown, a portion of the framing letter overlaps side bearings of the center character as will be further discussed.

It should be appreciated that the width of the receiving region also defines the spacing between the framing characters, in a certain embodiment. Alignment between framing and center characters is achieved through the depicted virtual grid highlighting demarcations defining positioning of the receiving regions and framing characters, according to an embodiment. Furthermore, in a certain embodiment, the width of the receiving regions is set by a user or font designer. In another embodiment, the width of the receiving regions is configurable as a fraction of the width of a given framing-character counter. Additionally, it should be appreciated that in a certain embodiment the framing characters are implemented with broken or dashed lines.

Figures 4A, 4B, 4C:
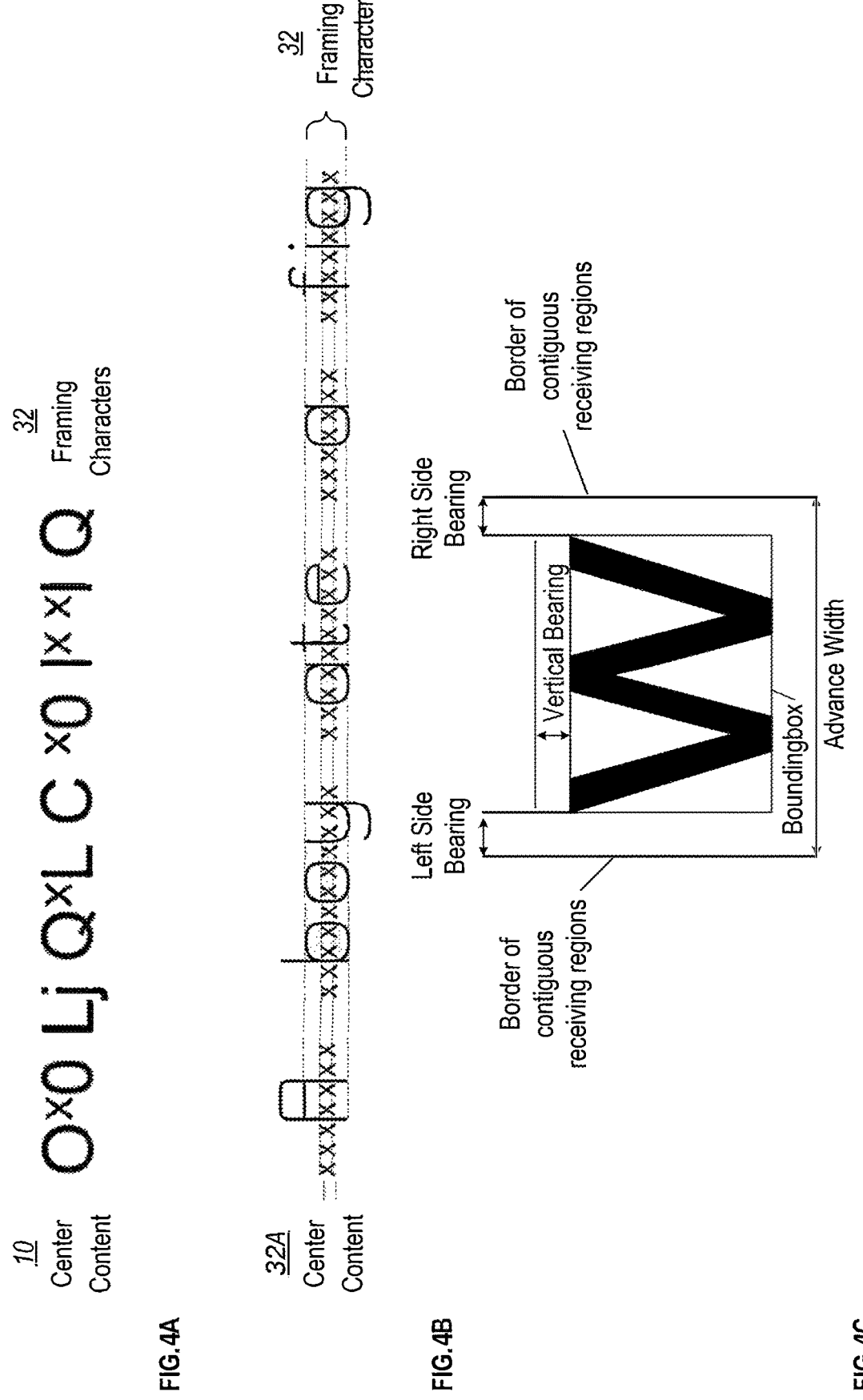
FIGS. 4A-4B depict various, horizontal placement options of center content within English translation-framing characters, according to an embodiment.
FIG. 4C depicts a center character and its side bearings between the character and the boundaries of the receiving region within which the character is disposed; according to an embodiment. Accordingly, adjacent side bearings of contiguous receiving regions define spacing between center characters. It should be appreciated that the cumulative space of the two side bearings is reduced by overlay of a framing character disposed in between the two receiving regions as will be further discussed.

FIGS. 4A-4B depict a framing text of English language, Latin framing characters 32 in which a few of the available receiving regions have been populated with center content 32A. Center content 32A is depicted in general terms to highlight the fact that it can be implemented in various foreign languages to the word or the phrase within which it is framed, in accordance with the embodiment. In a certain embodiment, center content 32A is implemented as a translation of the word or phrase associated with the framing characters 32. In another embodiment, center content 32A is implemented as an ideograph or pictogram. In another embodiment, center content 32A is implemented as a picture, whereas in another embodiment it is implemented as an instruction or commentary. In another embodiment, a combination of these content types is employed as a content type mix. This document is directed to the translation of a foreign language text.

As shown in FIG. 4A, some of the receiving regions bound by an element of the framing character are filled and other receiving regions are unfilled. This illustrates a certain configuration employing a fill order in which the receiving regions bound by a framing character are filled prior to other receiving regions.

Figure 6:
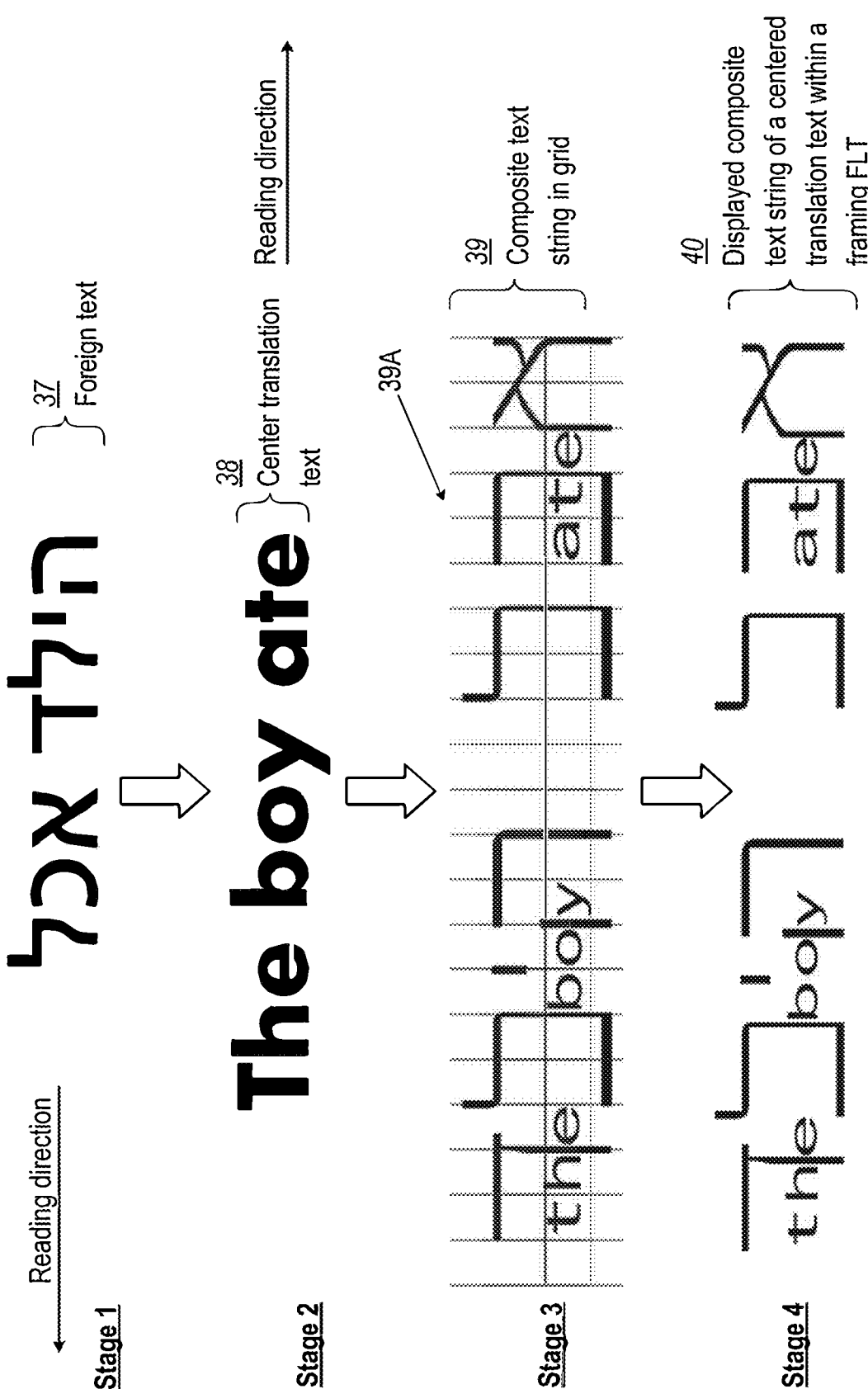
FIG. 6 depicts rendering stages of a sample English translation characters disposed in associated Hebrew framing characters into a composite text string, according to an embodiment.

Accordingly, when the framing character is English, read from left to right, the fill order first populates the receiving regions bound by the left element of the framing character as shown in charters "A", "o" and "a". When the framing characters are Hebrew, read from right to left, the receiving regions bound by the right side of the Hebrew framing letter are filled first, as shown in FIG. 6, stage 3, in the word furthermost to the right.

In terms of word placement of the center text within the framing characters, in a default configuration the fill order is operative to center the embedded text in the middle of the framing word as shown in the word "boy", in a certain embodiment. It should be noted, that the horizontal centering of words formed from centering characters within the associated framing words is a configurable feature, in a certain embodiment.

FIG. 4B depicts a composite-text display in which the center content exceeds the length of the associated word expressed in the framing characters. In such instances, rendering engine 1 is configured to provide as many additional, empty receiving regions between framing words to ensure that translation content is placed within the appropriate framing word or phrase, according to an embodiment.

In another embodiment, engine 1 is configured to reduce the width of the receiving regions responsively to threshold deviation between the number of receiving regions required to contain all center characters associated with the framing characters. This configuration advantageously reduces the number of center characters between words formed by framing characters.

FIG. 4C depicts a typeface and its associated side bearings and cumulative advance width of the side bearings and typeface. As shown, the side bearings are measured from the outer extremities of the typeface as highlighted with the boundingbox. The side bearings embody the ideal spacing between characters providing legibility in which the characters are minimally spaced to facilitate discerning of each separate character and readability in which the characters don't exceed a maximum spacing to facilitate mental association between characters. These minimum and maximum spacing thresholds between center characters are set by the font designer. The instant rendering engine advantageously leverages the side bearing by filling the entire width of a receiving region with the advance width of a center character so that adjacent side bearings set center-character spacing for a legible and readable center text within the framing text, according to an embodiment.

It should be noted that in certain fonts, like scripts for example, the character spacing is set by a negative side bearing as is known to those skilled in the art. That means that the spacing between center characters is not measured from the outermost extremity of the center character, but rather, from the inner boundary of the negative side bearing.

It should be appreciated that in certain an embodiment a portion of a side bearing bordering a framing character can be partially overlaid by a portion of a framing character.

Figure 5:
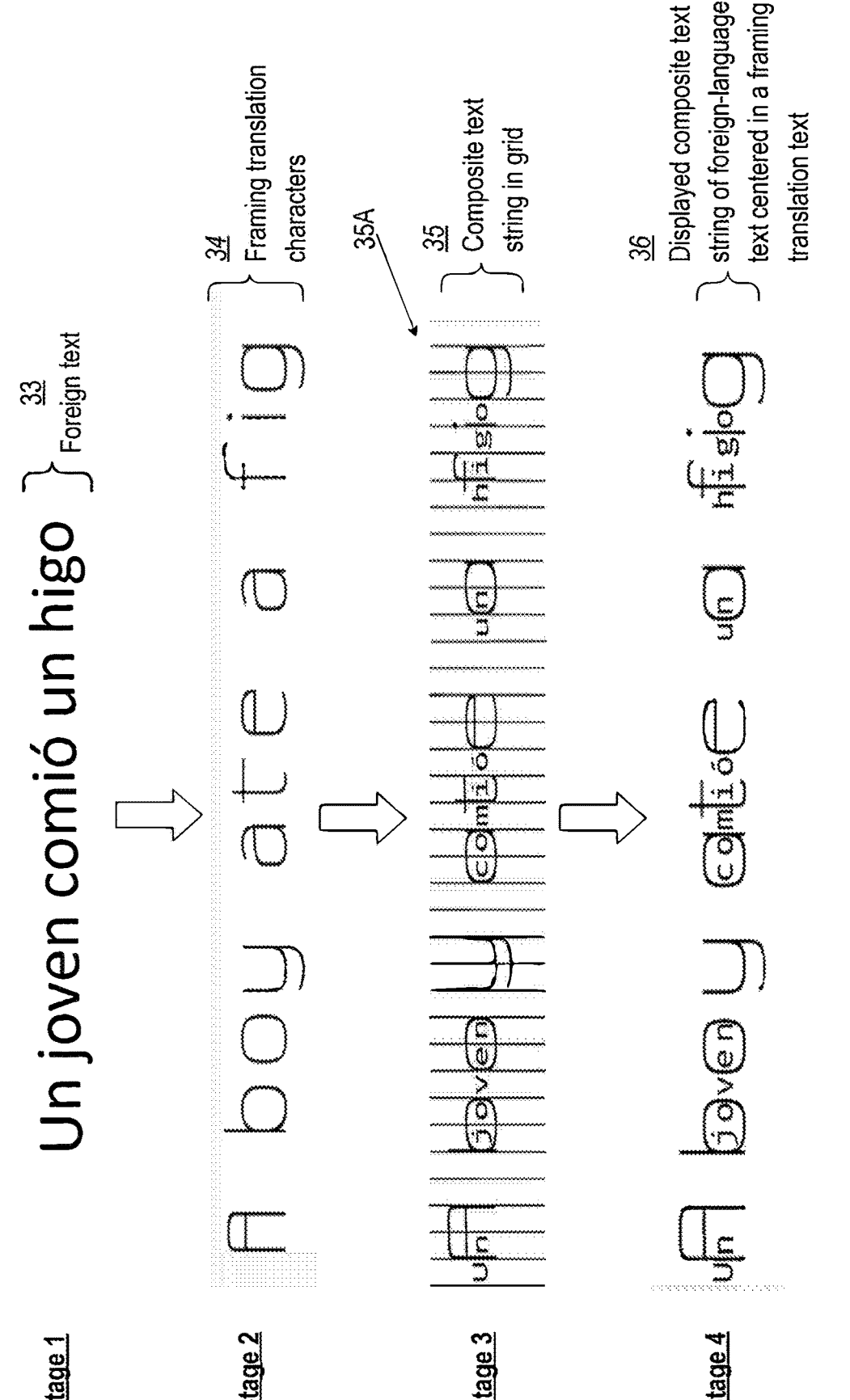
FIG. 5 depicts various rendering stages of a sample Spanish foreign-language text and English framing characters into a composite text string, according to an embodiment.

FIG. 5 is a depiction of rendering stages involved in the display of a foreign-language text and its translation into a single composite text, according to an embodiment.

Specifically, in this example, Stage 1 depicts Spanish text 33 received by rendering engine 1 (Shown in FIG. 2) and stage 2 depicts English translation 34 is identified. In this configuration, Spanish characters 33 are treated as center characters and English characters as framing characters. Stage 3 depicts Spanish characters 34 populating the appropriate translation framing letters 34 associated with the English translation in accordance with demarcated receiving regions highlighted here with reference grid 35A. Stage 4 depicts the display of a grid-free, composite text string of the Spanish text enclosed by its English translation as a readable foreign text and translation that can be read in the absence of tiring eye shift associated with typical translations offset from their foreign-language text.

FIG. 6 is also a depiction of rendering stages involved in the display of a foreign-language text and its translation into a single composite text. In the depicted example, Hebrew foreign-language text 37 is treated as the framing text and English translation text is treated as the center text. It should be noted that engine 1 is operative to handle languages read in opposite directions as depicted in this example.

Specifically, in this example, stage 1 depicts a sample Hebrew text 37 received by rendering engine 1 (Shown in FIG. 2) and stage 2 depicts an English translation 38 identified. Stage 3 depicts Hebrew characters 37 populated with the appropriate English translation characters 38 in accordance with demarcated receiving regions highlighted here with the reference grid 39A. Stage 4 depicts a grid-free composite text string 40 of Hebrew text enclosing English translation characters 38 at a character spacing in approximation with readability standards for both the framing and center text strings to greatly reduce, if not to entirely eliminate, tiring eye shift associated with typical translations offset from the foreign text.

The noted standardized geometry of the framing characters together with the standardized receiving regions advantageously enable an interchangeability of characters of various writing systems while preserving legibility and readability requirements.

It should be appreciated that in any alphabet there are framing characters like "t", "f", and "i" may not be conducive to sufficiently enclosing a region to form a counter, in accordance with typographer design. Such letters are deemed to be counter-free framing characters and adjacent, receiving regions are populated in accordance with translation needs. Framing characters possessing a typeface geometry enclosing two or more complete sides of a receiving region are deemed to have a counter, according to an embodiment. Broken or dashed strokes are treated as solid strokes for the purposes of this document.

Figures 7A, 7B:
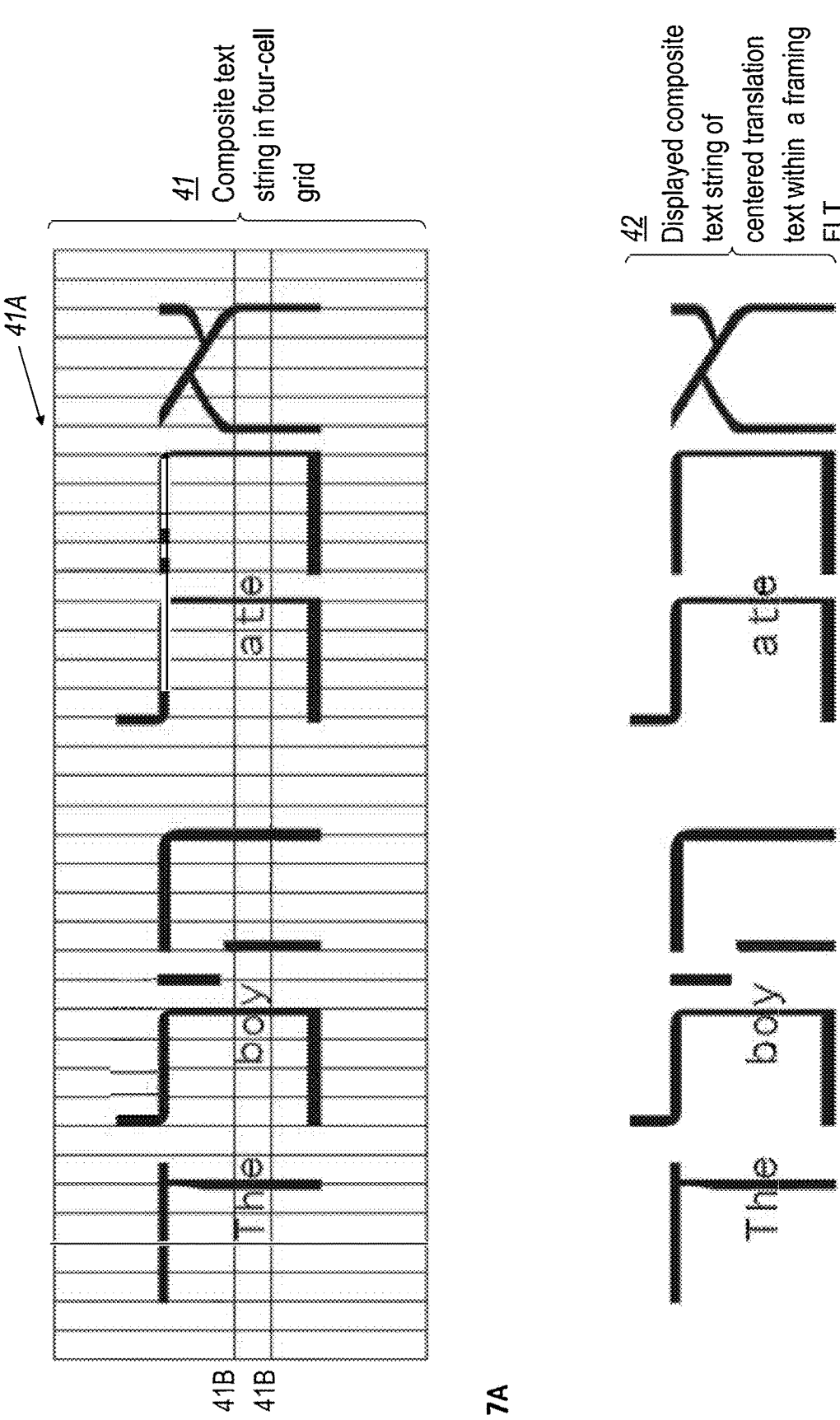
FIGS. 7A-7B depict an alternative, configuration option of FIG. 5 in which counters of the Hebrew framing characters are partitioned into four receiving regions, shown within a reference grid and in the absence of the reference grid, respectively, according to an embodiment.

FIGS. 7A-7B depict an alternative configuration of that depicted in FIG. 6 with the reference grid and the final display form without the grid, respectively.

Specifically, the counter width of the Hebrew framing characters has been divided into four receiving regions as depicted by reference grid 41A. As noted above, the number of receiving regions for a counter of a framing character is an integral multiple equal to or greater than, one. Horizontal markers 41B depict the required height of the receiving regions that must be accommodated by the framing characters to avoid intersect between ascenders and descenders of center characters with the framing characters, according to an embodiment. In another embodiment, center and framing characters contact each other without overlapping.

Figures 8A, 8B, 8C:
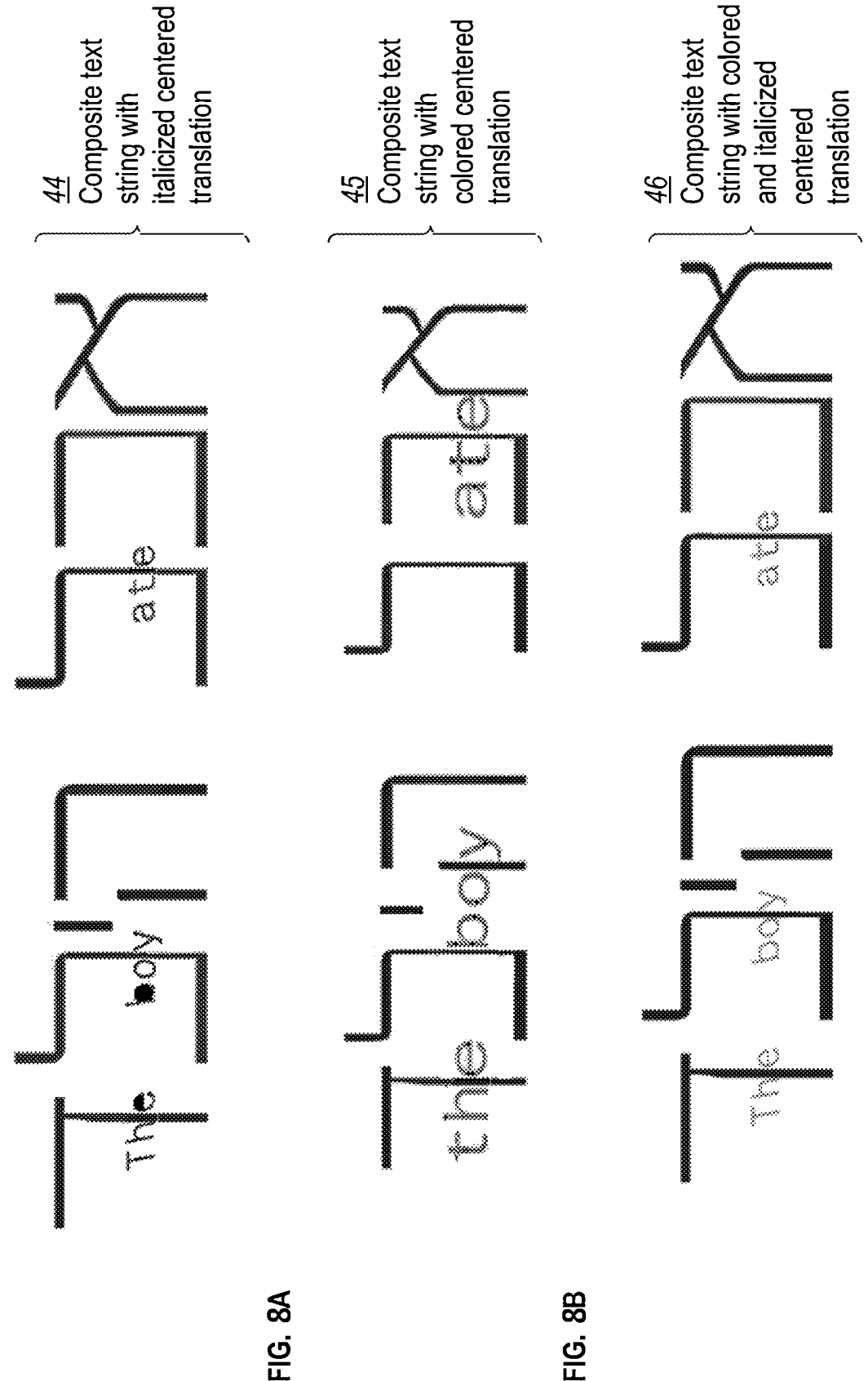
FIGS. 8A-8C depict composite text renderings of FIG. 7B in which the center characters are displayed with color and treatment variations, according to an embodiment.

FIGS. 8A-8C depict variant configurations of that depicted in FIG. 6 in which the center characters are implemented with various, user-selected font parameters.

Specifically, FIG. 8A depicts center characters implemented with an italicized treatment, FIG. 8B depicts center characters implemented with a color differing from that of the framing characters, and FIG. 8C depicts center characters implemented with both italicized treatment and a variant color. It should be appreciated that a wide variety of color, weights, treatments, sizes, and their combination are user-configurable. Analogously, user configuration capabilities also exist for framing characters, according to an embodiment.

It should be appreciated that in a certain embodiment center and framing characters are slanted in their reading direction when they have opposite reading directions. In another variant embodiment, both center and framing characters are slanted in the same direction.

Figures 9A, 9B:
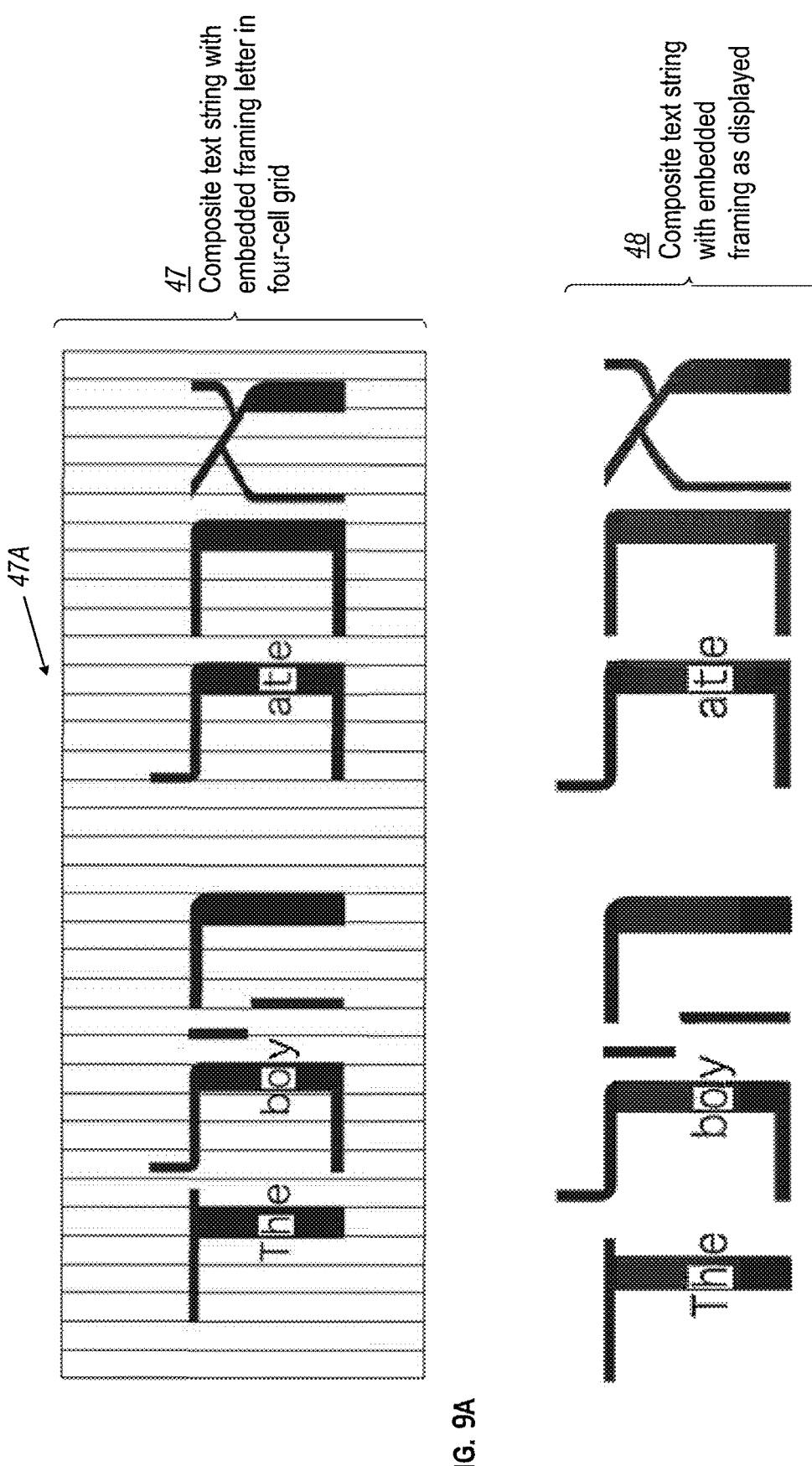
FIGS. 9A-9B depict gridded and non-gridded stages, respectively, of an alternative embodiment of the composite text of FIG. 8B in which center characters are disposed in the body of framing characters, according to an embodiment.

FIGS. 9A-9B depict a variant configuration of that depicted in FIGS. 8A-8B. As shown in FIG. 9A, the framing counter contains three receiving regions, as highlighted with reference grid 47A, within framing characters having a widened vertical stroke equal in width to a receiving region width. A receiving window is disposed within each of the widened vertical strokes for receipt of a center character while all other framing-character geometry requirements are preserved. A portion of the framing character overlays the side bearings of the center characters whose advance width, spanning the stroke width, is effectively diminished by the partial overlay of the framing character. In another configuration, the advance width spans the entirety of the vertical stroke with no framing character overlap of the side bearings and it should be appreciated that the degree of overlay of the side bearings defines the degree of empty space visible within the vertical stroke.

FIG. 9B depicts the final, grid-free display version of FIG. 9A.

Figures 9C, 9D, 9E, 9F, 9G, 9H, 9I:
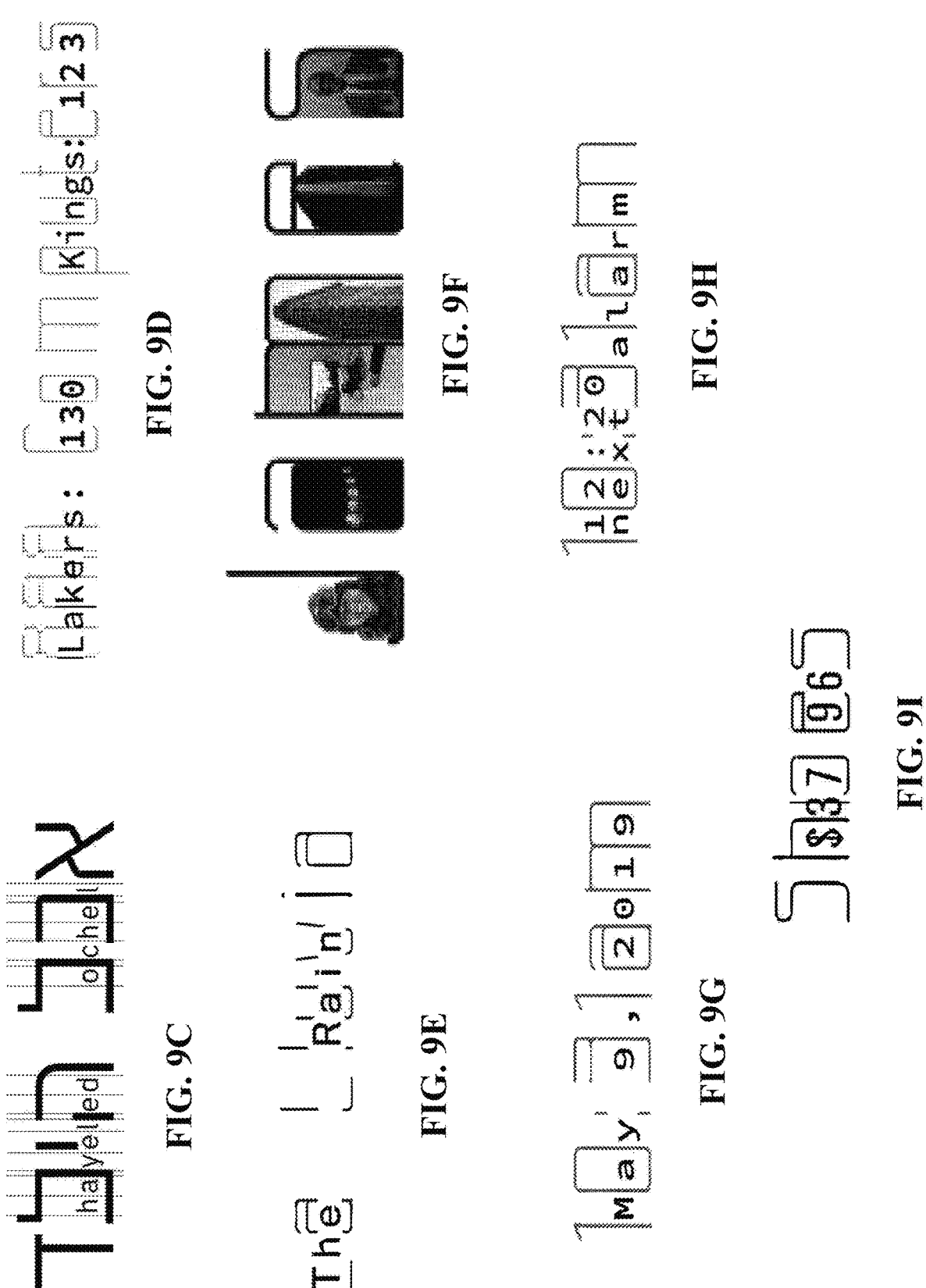
FIG. 9C depicts a composite-text, display scheme employing proportional font embedded within Hebrew framing characters, according to a variant embodiment.
FIG. 9D depicts a composite-text, display scheme employing broken-lined framing characters, according to a variant embodiment.
FIG. 9E depicts a composite-text, display scheme for an advertisement and scoreboard, according to an embodiment.
FIG. 9F depicts a display scheme employing pictorial content embedded within framing letters, according to an embodiment.
FIG. 9G depicts a composite-text, display schemes for date, and time.
FIG. 9H depicts a composite-text, display scheme for time and alarm, according to variant embodiments.
FIG. 9I depicts a composite-text, display scheme for an advertisement of article for purchase and its price, according to an embodiment.

FIG. 9C depicts a composite-text display scheme in which the center characters are implemented as proportional fonts. For the sake of highlighting the variable spacing between characters associated with proportion fonts, a reference grid is depicted. It should be appreciated that all embodiments depicted employing a counter filling scheme are implemented with either monofont or proportional font characters in accordance with the embodiment.

FIG. 9D depicts a variant embodiment in which the adapted framing characters are implemented with line breaks. As noted above the space is treated as a single stroke. It should be appreciated that all embodiments depicted may be implemented with either broken, dashed or solid strokes in accordance with the embodiment.

FIG. 9E depicts a composite-text, display scheme in which the scoring of a sporting event is disposed in the counter of framing characters spelling the name of a sponsor, according to an embodiment. As shown, the framing letters may be implemented one color, such as, for example light gray, while the center characters may be implemented in another color, such as, for example, black. Such color schemes generate one level of contrast between the center character and the background and lesser level of contrast between lighter framing colors and the background. This reduced contrast advantageously minimizes mental distraction while viewing the scoring while still providing sufficient visibility when the viewer refocuses attention to the framing content. It should be appreciated that this color scheme is applied to other applications set forth in this document in accordance with application requirements. It should be appreciated by those skilled in the art that other color schemes may be used.

FIG. 9F depicts a display scheme in which the second-string content centered within framing characters is set forth as pictorial content, according to an embodiment. It should be appreciated that in certain embodiment the number of pictures centered within a word formed by framing characters is set in accordance with user configuration. Furthermore, in a certain embodiment the pictorial content is linked to the content set forth by the framing characters.

FIG. 9G, depicts a composite-text, display scheme for date and time in which a date is embedded inside counters of adapted framing characters to advantageously enable one to observe both the time and date and/or alarm in a single glance. It should be appreciated that the composite-text is deemed to be single line as long as all content is disposed within the framing characters. FIG. 9H depicts an analogous composite-text, display scheme in which an alarm time is embedded inside a time.

FIG. 9I depicts a composite-text, display scheme for an advertisement of article for purchase and its price, according to an embodiment.

Figure 10A:
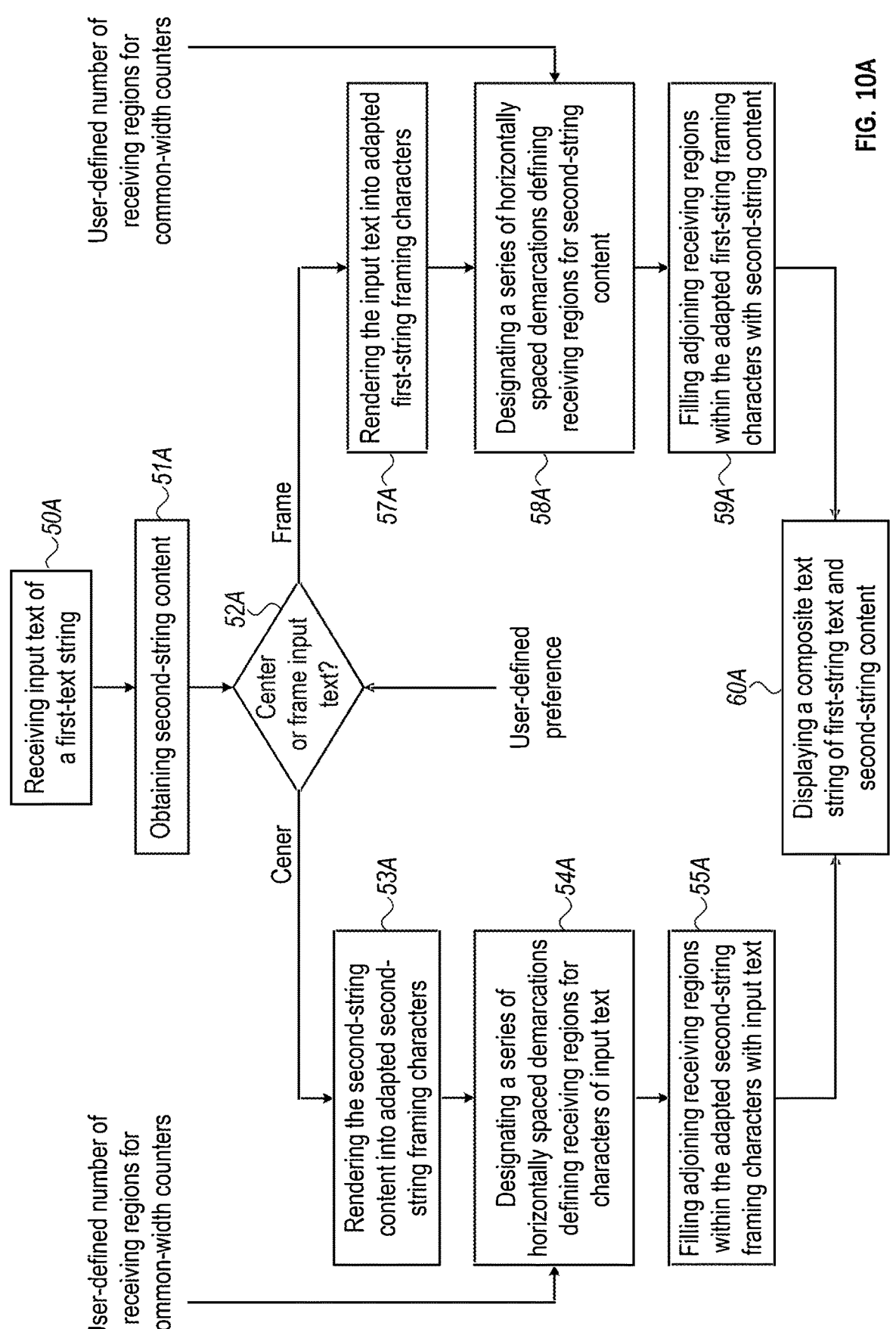
FIG. 10A is a flowchart depicting process steps of the rendering engine of FIG. 2 implementing a counter-filling display scheme for a composite-text in which monofont characters fill framing character counters, according to an embodiment.

FIG. 10A depicts a flowchart of steps employed to generate a composite-text, display scheme based on counter-filling of monofont receiving regions in view of rendering engine 1 of FIG. 2.

As shown in step 50A, an input text of a first string of text (also referred to as a first-string text) is received either directly through keyboard 6 from speech recognition module 15 after conversion of speech captured through microphone 4, or from optical character recognition module 14 after conversion from an image captured by camera 5, in accordance with embodiment. In a certain embodiment a user-configured combination of text input methods is employed.

In step 51A, a second-string of content (also referred to as second-string content) that may be related to the first-string text is obtained through correlation module 16. As noted above, correlation module 16 is configurable to generate a correlated or related content to the input text in real time or utilize an existing correlation in second-string content data 19C.

In step 52A, a configuration option is implemented on the basis of user preference setting forth the input text of the first-string text as either a center text or as a framing text.

When the input text is implemented as center characters, processing continues to step 53A where the obtained second-string text is rendered into adapted second-string framing characters and stored as framing character data 19A of database 18. As noted above, framing characters have standardized geometries defining counters with sufficient width and height to accommodate center characters without obscuring framing characters. In a certain embodiment the noted rendering is a matter of replacing the obtained second-string text characters with pre-designed adapted characters.

It should be appreciated that in a variant embodiment, framing character adaptation is achieved through a variable font operative to change the horizontal width of the counter in accordance with counter filling requirements of display schemes employing counter filling.

In step 54A, a series of horizontally spaced demarcations of a display space are designated. These demarcations define placement of receiving regions that can potentially receive input text.

In a certain embodiment, the width of the center characters is pre-defined by a user and the framing characters are designed to enclose a desired number of center characters such that the counter width of the framing character is substantially equal to the cumulative width of the receiving regions.

In an alternative embodiment, the framing characters are pre-designed and the number of receiving regions to be enclosed by framing character counters is selected by a user in accordance with the actual or maximum number of center characters desirable to be displayed within a counter.

In a certain embodiment the width of the receiving region also defines spacing between framing characters and also spacing between framing words as multiples of the receiving region widths. In another embodiment, unfilled receiving regions enclosed by framing character counters provide spacing between center characters. It should be appreciated that in a certain embodiment, counter widths may vary for different words formed by framing characters whereas in another embodiment, the width of framing counters is substantially identical across all words formed by framing characters.

In step 55A, the identified receiving regions are filled with input text characters. In a certain configuration, character justification is employed. In a certain configuration kerning is applied in accordance with spacing restrictions set by the receiving region boundaries. It should be appreciated that upon filling the designated receiving regions, the input text character is disposed either within an adapted framing character, or in-between a framing character, or both inside and in-between framing characters. In this regard, the terms "within" refers to both enclosed, sandwiched, or both enclosed and sandwiched.

In step 60A, a composite-text string of the input text framed inside correlated or related framing characters is output either on display screen 9, printer 10, or both.

When the input text is implemented as framing characters, processing continues to step 57A where the input text is rendered into adapted first-string framing characters stored in framing character data 19A of database 18. As noted above, framing characters have geometries defining common-width counters with sufficient width and height to receive center characters without being obscured by them. In a certain embodiment the noted rendering is a matter of replacing input text characters with pre-designed adapted characters, as noted above.

Processing steps 57A-60A directed to centering second-string content within adapted first-string framing characters text are analogous to steps 53A-60A directed to centering first-string content input text within adapted second-string framing characters and should be understood accordingly.

It is noted that in step 59A, the identified receiving regions are filled with second-string framing characters in accordance with a fill order priority such that the centered content is both enclosed and sandwiched between framing characters. In certain embodiments, both enclosure and sandwiching is achieved on the same center characters. Furthermore, it should be appreciated that the term filling, in all instances of this document, refers to placing a character into a receiving region regardless of the extent of the width of the center content.

Figure 10B:
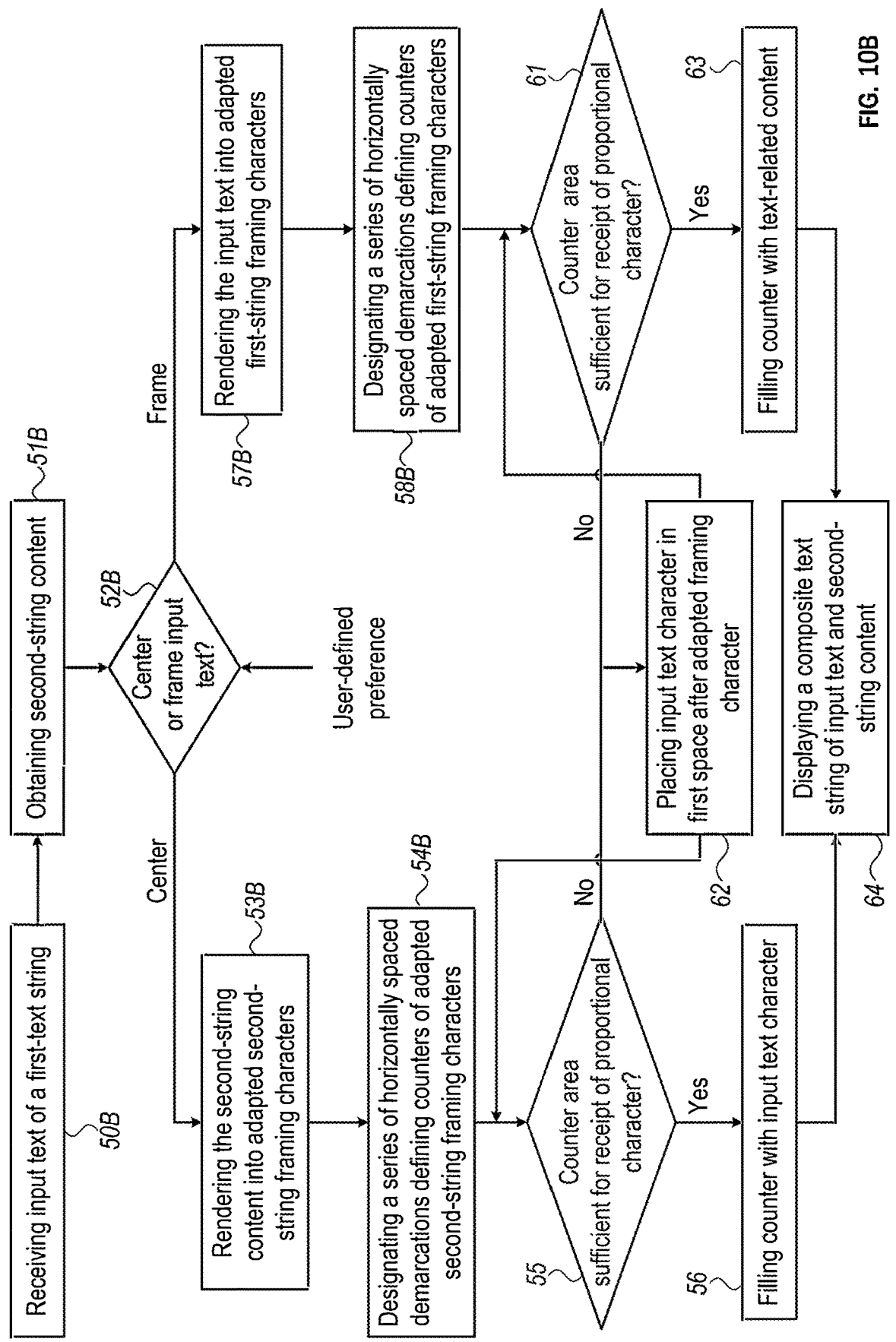
FIG. 10B is a flowchart depicting process steps of the rendering engine of FIG. 2 implementing a counter-filling display scheme for a composite-text in which proportional characters fill framing character counters, according to a variant embodiment.

FIG. 10B is a flow chart depicting process steps of the rending engine of FIG. 2 implementing a counter-filling, display scheme for a composite-text in which proportional characters are disposed within adapted framing character counters, according to a variant embodiment.

Specifically, in step 50B an input text of a first-text string (also referred to as a first-string text) is received and in step 51B second-text string content is obtained from database 19C or other sources. In step 52B a decision is made on the basis of user preferences whether the input text is to be displayed in the form of adapted framing characters or as proportional font centered within adapted framing characters.

In analogous steps 53B and 57B the relevant content (either first- or second-string content) is rendered into either adapted first-string framing characters or adapted second-string characters by replacing the characters with adapted framing characters found in database 19A.

In analogous steps 54B and 58B, a series of horizontally spaced demarcations defining counter boundaries of the adapted framing characters is designated.

In analogous steps 55 and 61 a check is performed to evaluate if there exists sufficient space within the designated counter width to receive a proportional character without intersecting the framing counter boundaries.

If found that there exists sufficient space, then processing proceeds to either of analogous steps 55 and 61 in which the proportional center character is disposed within the appropriate adapted framing character.

If the answer to the query of analogous steps 55 and 61 is negative, then the proportional character is not placed within the adapted framing character and in step 62 the character is placed in the next available space following the skipped framing character.

In step 64, the resulting composite-text is displayed as either centered proportional content within either adapted first-string adapted characters or adapted second-string adapted characters according to a variant embodiment.

Figures 11A, 11B:
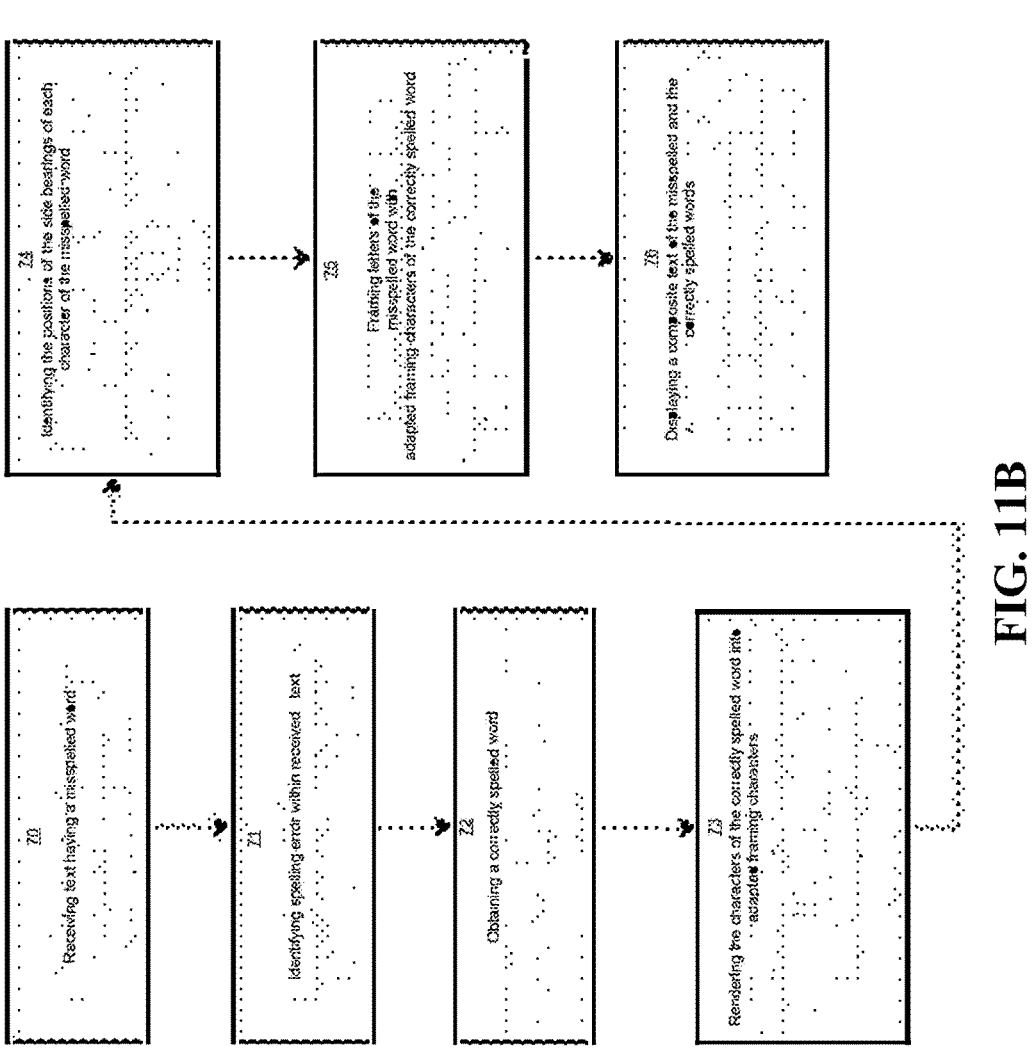
FIG. 11A depicts a composite-text, display scheme for spell checker in which characters of a misspelled word are framed by characters of the correctly spelled version, according to an embodiment.
FIG. 11B depicts a flow chart of processing steps implementing the display scheme of the spell checker of FIG. 11A, according to an embodiment.

FIG. 11A depicts a composite-text, display scheme for a spell checker in which adapted characters of a correctly spelled word frame characters of a misspelled word to adventurously provide a reader with local single line comparison of the erroneous spelling together with the corrected version to advantageously facilitate memorization of the proper spelling. As shown, the erroneous letter or letters may also be displayed in a different color, like red for example, to highlight the error. The framing is operative to frame one or more erroneous characters together with proper characters in a certain embodiment whereas in another variant embodiment only the erroneous characters are framed. In a certain embodiment, the correct letter is colored to highlight the proper spelling to facilitate memorization of the correct spelling in either the same color the erroneous letter is highlighted or in another color in accordance with configuration guidelines.

FIG. 11B is a schematic flow chart depicting process steps for implementing the spell-checker display scheme of FIG. 11A.

Specifically, in step 70 text having a spelling error is received and in step 71 the error is identified by way of known spelling checking technologies. In step 72 a correctly spelled word or various possibilities are obtained from a database. In step 73 characters of the various options or chosen option are rendered into adapted framing characters. In step 74 one or more letters erroneous letters are framed by the adapted framing characters of the correctly spelled word. In a certain configuration, correctly spelled letters also frame correctly spelled letters of the misspelled word as depicted in FIG. 11A, in step 75, a composite text of the misspelled word together with the corrective framing text is displayed in a single line.

FIG. 12A depicts a composite-text, display scheme for a vanity telephone number and the associated telephone numbers to advantageously provide a reader with a single line display of a phoneword and the telephone numbers forming it.

FIG. 12B is a schematic flow chart depicting process steps implementing the composite-text, display scheme of FIG. 12A.

Specifically, in step 80 a vanity telephone number is received and in step 81 the associated telephone number is obtained from a database containing the alphanumeric associations found on a telephone keypad. In step 82, the letters of the phoneword component of the vanity number are rendered into adapted framing characters. In step 83 the adapted framing characters are filled with the respective number. In step 84 adapted framing characters having a counter enclosed on only two sides is identified. In step 85, the respective number associated with the adapted framing characters having a counter enclosed on only two sides is processed into an embeddable form as will be described. In step 86, the embeddable number is embedded in the vertical stroke of the adapted framing characters having a counter enclosed on only two sides. In step 87, a composite text of the phoneword and the associated telephone numbers is displayed in a single line.

It should be appreciated that the described processing is directed to situations in which the vanity number is configured to be the input text. However, it should be noted that analogous processing is executed when the associated telephone numbers are rendered into adapted framing characters and the phoneword component is centered or embedded into the framing characters.

Figures 13A, 13B, 14:
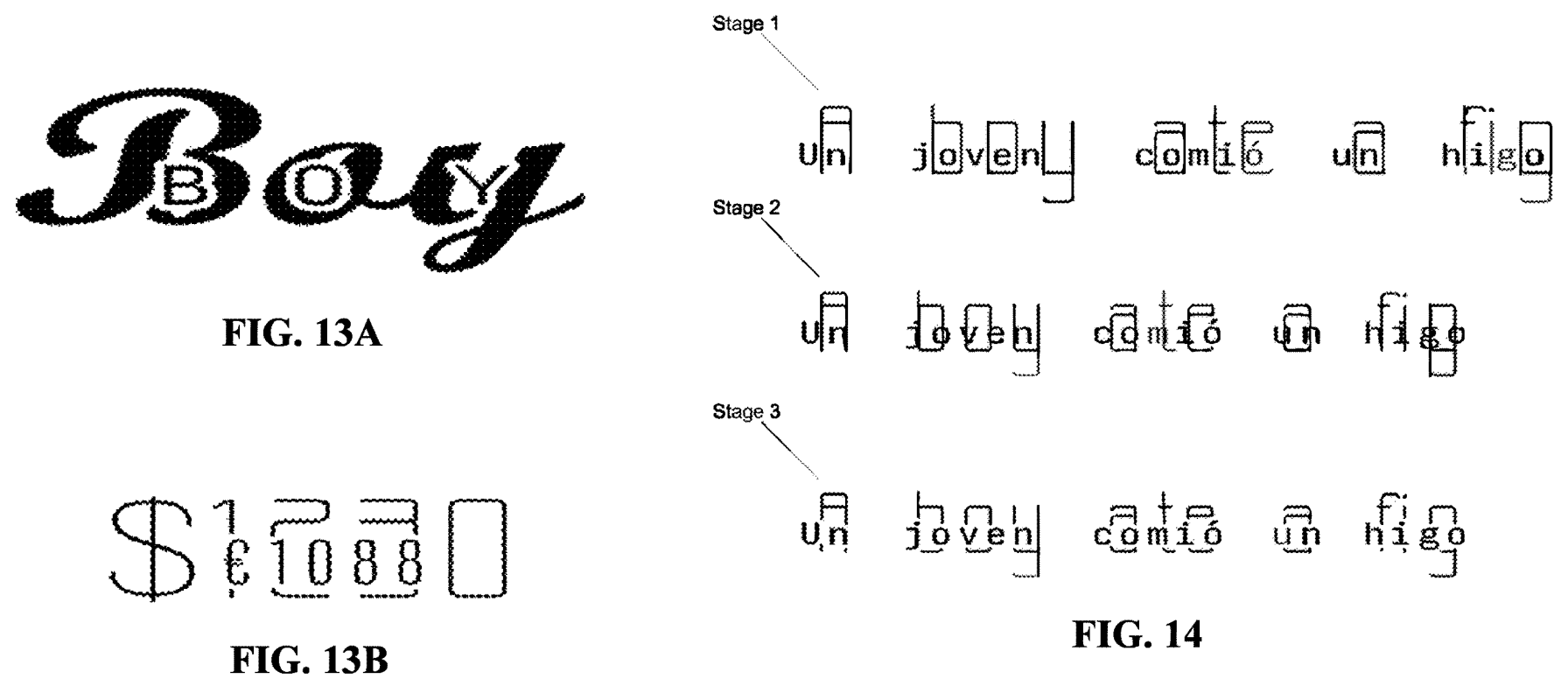

FIG. 13A depicts a composite-text, display scheme for cursive and printing styles in which the printing style characters are embedded within the cursive style characters to advantageously facilitate learning of cursive, according to an embodiment. In a variant embodiment the cursive style is embedded inside the printing style.

FIG. 13B depicts a composite-text, display scheme for currency exchange rates that advantageously enable one to perceive in a single glance the relevant rates without visually tracing relevant rates as is common when disposed at a distance from each other. This is one sample of many possibilities in which two numbers in any financial analysis can be more easily read since one can view both numbers at one time instead of comparing figures commonly present in separate columns or rows.

In addition to reducing eye movement and fatigue associated with intensive financial analysis, this financial display scheme facilitates mistake reduction emanating from incorrect comparison of financial data by presenting relevant data in a single field of vision.

FIG. 14 depicts steps of an automatic display scheme in which a counter-filling display scheme is automatically replaced with a stroke-embedding scheme responsively to excessive overlap between center and framing characters, according to an embodiment.

As shown, in stage 1, related text is center characters are disposed inside counters of adapted framing characters. In stage 2, the framing characters are reduced in size while the center characters remain the same size by a user providing such configuration parameters. This size reduction creates an untenable situation in which both the center and framing characters are obscured thereby degrading legibility of the composite text.

Rendering engine 1 is configured to change the display scheme from the counter-filling scheme of stage 1 to the stroke-embedding scheme of stage 3 responsively to achieve a threshold degree of interference. A sample threshold is contact between the center and framing letters in four locations within a single word, for example. Such thresholds are configurable.

Figure 15:
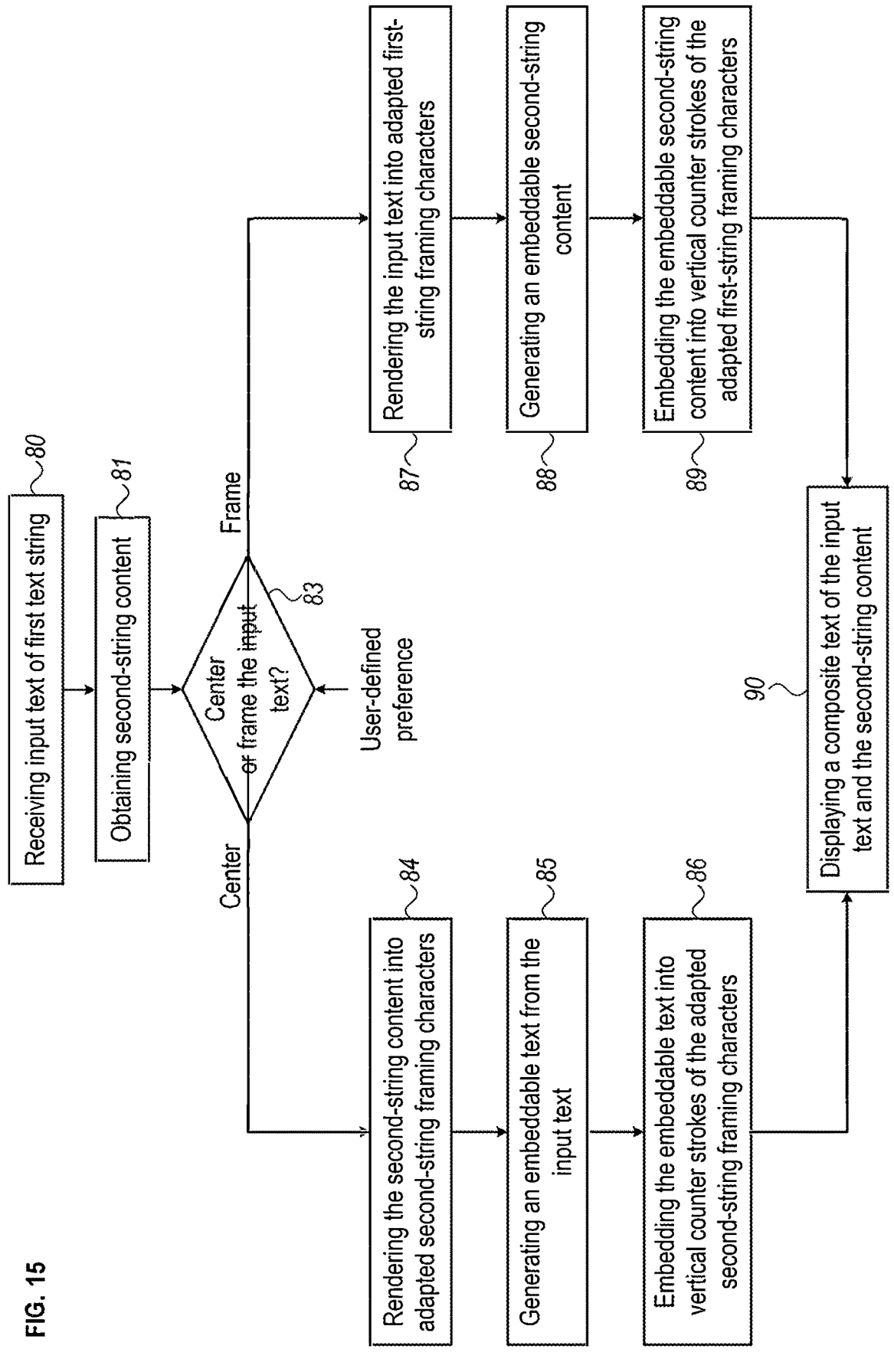
FIG. 15 is a flow chart depicting process steps of the rendering engine of FIG. 2 implementing a stroke embedding display-scheme for a composite text in which characters are embedded within vertical strokes of framing character, according to an embodiment.

FIG. 15 is a schematic flow chart depicting process steps for a stroke embedding display scheme to generate a single-line composite text.

In step 80, an input text of a first text string (also referred to as a first-sting text) is received. In step 81, a second-string content is received that may be related to the first string. If related, a user may define the nature of the relationship or correlation. In a certain embodiment the engine identifies the type of correlation between the two strings. In step 83, a processing decision is made whether to process the first string as a content to be centered with framing characters or whether it should be treated as framing characters themselves.

Both options involve analogous steps as described in the context of FIGS. 10A and 10B. Specifically, analogous steps 84 and 87 text characters are rendered into either adapted first-string or second-string framing characters characterized by counters of sufficient height to receive embedded characters within the vertical strokes without obscuring horizontally traversing strokes. As shown, the adapted framing characters have counters of sufficient height to ensure character legibility by providing sufficient height to avoid obscuring substantially horizontally traversing strokes when the related text characters are embedded into the framing character strokes, as noted above.

In analogous steps 85 and 88, the appropriate characters are rendered into embeddable characters by overlaying each character onto an enlarged copy functioning as a background matching the color of the general background. The collective unit of the character overlaying its enlarged duplicate forms an embeddable character appearing to be embedded when disposed on framing letter strokes. In another variant embodiment, the embeddable characters are formed by populating a background-colored strip overlaying text characters to also create an impression that the characters are embedded within framing letter strokes.

In analogous steps 86 and 89, the embeddable characters overlay non-horizontal counter strokes of the adapted framing characters to create the effect of being embedded into the counter strokes without obscuring horizontally traversing strokes, as noted above. It should be noted that in a certain embodiment the adapted counter receives the overlay.

In step 90, the resulting single-line composite text is displayed in any of a variety of output devices as noted above.

It should be appreciated that the above-noted construction methods of embeddable characters are also employed in other display schemes in which the embedded characters are embedded into character strokes of adapted framing characters.

FIG. 16A depicts a display scheme for a sentence a cluster segment displayed as a single-line composite text.

FIG. 16B depicts the cluster sentence of FIG. 16A with non-adapted framing characters and highlights the loss of character legibility from obscurity of the horizontally-traversing, strokes. Visibility of crossbar strokes contributes significantly to character legibility and compensates for loss of clarity resulting from partial obscurity of non-vertical strokes. It should be appreciated that crossbar strokes having a curvature are also deemed to be horizontally-traversing.

It should be appreciated that this legibility preservation scheme applies to all embodiments employing stroke embedding.

FIG. 16C depicts a flowchart of processing steps employed in the composite-text, display scheme for the cluster sentence of FIG. 16A.

Specifically, in step 91 an input text is received and then in step 92 a cluster segment of the text is obtained from a database.

In step 93, the obtained cluster segment is rendered into embeddable content in accordance with either one of the above-described processes.

In step 94, the portion of the text that is not the cluster segment is rendered into adapted framing characters. In step 95, the embeddable cluster segment is embedded into the vertical counter strokes of the adapted framing characters, and in step 96 a composite text of the input text content and the cluster segment is displayed as described above.

It should be noted that processing steps set forth in processing steps of FIG. 15 in a certain embodiment may be implemented with the analogous steps set forth in counter filling embodiments set forth in FIGS. 10A and 10B.

FIG. 17A depicts a display scheme for a composite-text of a foreign language text disposed within a core translation of the foreign language text and a non-core translation is displayed outside of the composite text, according to an embodiment.

Core translations are translation components that are primary parts of speech like a noun, a verb, or both together; whereas other parts of speech are deemed to be non-core translations. The particular parameter is configurable and may be set by interested parties such as users or manufactures, for example.

FIG. 17B depicts a flow chart of processing steps employed to achieve the display scheme of FIG. 17A, according to an embodiment.

Specifically, in step 100 an input text in the form of a foreign language is received and in step 101 a translation is obtained. In step 102, a core translation is identified in accordance with the configuration guidelines noted above. In step 103, the core translation is rendered into adapted framing characters. In step 104 the translation text is rendered into an embeddable translation text. In step 105, the embeddable foreign language text is overlain non-horizontal counter strokes of the adapted core translation framing characters to create an effect of being embedded into the count relevant counter strokes. In step 106, a comprise text of foreign language content and core translation are displayed in a single line and the non-core translation is displayed either above, below, to the side, or a combination of these positions in accordance with the variant embodiment.

It should be noted that processing steps set forth in processing steps of FIG. 15, in a certain embodiment these steps are implemented with the analogous steps set forth in counter filling embodiments set forth in FIGS. 10A and 10B.

It should be appreciated that the center and framing characters are displayed in accordance with the above-noted user selected font parameters, like color, treatment, font size.

Furthermore, in a certain embodiment employing a display screen, one of the character sets is displayed momentarily for a time-period like 2 seconds, 5 seconds, 10 seconds, 30 seconds, or even 60 seconds, for example; in accordance with configuration guidelines. Analogously, in another embodiment, a character set is displayed automatically until receipt of a user input terminating its display, also in accordance with configuration guidelines set either by a user, a manufacturer, or both.

User input is implemented either though a touch screen or through verbal instruction. In a certain embodiment, the engine tracks user usage and builds a user profile of viewing time, string correlations of interest, for example, and other parameters that can provide user interests and usage that is also leveraged by the engine to automatically provide user-specific functionality.

As noted, the composite text string advantageously reduces eye fatigue, thought interruption by displaying two different types of content strings within a field of vision single defined by single-line display thereby enabling near simultaneous viewing with a minimum amount of eye shift. Single-line display spans the area bound by the vertical extremities of the framing characters, in a certain embodiment.

As noted, the composite text string advantageously reduces eye fatigue, thought interruption by displaying two different types of content strings within a field of vision single defined by single-line display thereby enabling near simultaneous viewing with a minimum amount of eye shift. Single-line display spans the area bound by the vertical extremities of the framing characters, in a certain embodiment.

This rendering engine embodies a significant advance over existing rendering engines that lack the ability to display single-line composite texts in a manner devoid of clutter and character overlap that is also compliant with accepted legibility and readability norms.

FIG. 18 is a listing of lowercase English characters and sample distinguishing or discriminatory character strokes of each character that can be used to differentiate one character from another when a portion of the character stokes are absent, according to an embodiment. Sample distinguishing character strokes are highlighted of each character by box 110. As shown, distinguishing character strokes are a function of character geometry. In certain geometries, a distinguishing traversing the character width are shown in character "r" whereas, a distinguishing traversing character bound at the bottom by character baseline as shown in character "u", for example. Certain characters possess two distinguishing traversing characters; one bound by a baseline and the other bound on the top by an x-height or median (As known by those skilled in the art of typography) as shown in characters "c" and "d", for example.

Other characters possess three distinguishing traversing strokes. For example, the crossbar of "e" and the spine of "s" are distinguishing traversing strokes in addition to traversing distinguishing traversing bound by either a baseline and a or a an x-height. In certain other embodiments, the discriminatory or distinguishing feature does not traverse the width of the character and is implemented in the form of a descender as shown in character "y" or character "g", for example. In certain other embodiments, the discriminatory feature includes an ascender as shown in characters "b" and "d", for example. In a certain other embodiment, the discriminatory feature includes a descender as shown in character "q" for example.

It should be appreciated that uppercase English characters also possess distinguishing traversing strokes as do characters of various languages as will be further discussed.

Combinations of one or more distinguishing character strokes advantageously enable a reader to identify characters when other character strokes have been removed. Furthermore, a combination of distinguishing features of adjacent characters can be used by a reader to identify characters missing significant portions of their character strokes.

FIG. 19 depicts a first embodiment of composite text of a foreign language text and a truncated translation text.

As shown, the composite text is formed from a foreign language and translation text which has been truncated to reduce stroke clutter. Character truncation is a process of removing various character strokes from a character thereby leaving the area vacated by the truncated character strokes and the area previously enclosed by them available for receiving foreign characters. This vacated space is referred to as a truncation area.

As noted above, composite text display schemes are directed to reducing eye shift between semantically related texts, like translations, for example. Linear translations are typically displayed in separate viewing fields that cause eye strain for readers compelled to repeatedly shift eyes from one text to another. The composite text indeed reduces eye shift; however, the abundance of character strokes associated with both texts displayed in a single viewing field can create clutter making it difficult for the reader to discern the foreign text from the translation text. Accordingly, FIG. 19 depicts an embodiment in which a significant portion of the translation text, English in this example, has been removed, or truncated. The remaining character strokes have a discriminatory geometry sufficient for an English language reader to recognize the character in the absence of all character strokes.

As shown, a foreign language text, Spanish in this example, is embedded within the area vacated through truncation of translation character strokes. Discriminatory character strokes of the associated truncated translation text disposed above and below the foreign text provide sufficient insight for an English language reader to identify the truncated characters and understand the truncated translation text.

For example, the Spanish word "chico" is embedded in the truncation area of its English translation. "boy". An English language reader is easily able to recognize the translation "boy" based on the discriminatory strokes disposed above and below the foreign language. Specifically, every English reader can recognize the "b" based on the top stroke, can recognize the "o" based on the two curved strokes, and the "y" based on the bottom stroke. The remaining discriminatory strokes further reinforce identification of these characters. Looking at another example, the Spanish word "aeropuerto" can be easily translated into "airport" by an English langue reader based on the bottom stroke of the "a", the dotted segment of the "i", the top stroke of the "r", the bottom stroke of the "p", and the "crossbar" of the "t", for example. Here too, the remaining strokes further reinforce identification of these characters for the reader.

The translation in certain embodiments is implemented in a font color lighter than the foreign text to reduce translation text visibility to facilitate reader focus on the foreign text only until the reader decides to view the translation.

In a certain embodiment, rendering engine 1 is configurable to set the shade of the translation text. In another embodiment, the shade of the translation text lightens in accordance with tracked reader usage to facilitate to facilitate gradual weaning from the translation text as foreign language competency grows. The tracking is implemented in a certain embodiment by associating a reader login and usage of the composite display feature and the rate of shade lightening is user configurable. In another embodiment, a user is able to disenable display of truncated translation text associated with foreign words or phrases for which he has sufficiently mastered.

Generally, this display scheme embodies an advance in composite display by reducing stroke clutter to enhance readability while still reducing eye shift between the two text strings.

FIG. 20 depicts a second embodiment of composite text of a foreign language text and a truncated translation text in which the foreign language text is embedded within a truncation area above the bottom two discriminatory character strokes of the associated truncated translation text.

As shown, the truncated translation characters are identifiable based on one or two, of the lower discriminatory character strokes. For example, here "b" and "o" of "boy" are identifiable based on the bottom stroke whereas the "s" is identifiable based on two discriminatory character strokes, for example. It should be appreciated that in this and other embodiments, the foreign text is embedded in the truncation area enclosed by the character boundingbox and also area outside of the boundingbox.

FIG. 21 depicts a third embodiment of composite text of a foreign language text and a truncated translation text in which the foreign language text is embedded within a truncation area below discriminatory character strokes of the truncated translation text. Character differentiation depends on either the uppermost or the top two discriminatory character strokes.

As shown, the "a" of "at" is identified by the middle and the top strokes whereas the "t" is identified based on the crossbar disposed at the top of the vertical stroke, for example.

FIG. 22 depicts a variant embodiment of that depicted in FIG. 21 in which a composite text of a foreign language text and a truncated translation text. The foreign language text is embedded within a truncation area also below associated truncated translation text. However, the truncated translation text is displayed in a font size smaller than that of the foreign text. The reduced size of the translation text advantageously reduces stroke clutter while still reducing eye shift between the texts. It should be appreciated, that in other variant embodiments, the upper portion of the translation text is truncated and the foreign text is disposed in the resulting truncation area above the translation text.

FIG. 23 depicts a variant embodiment of a composite text of a foreign language text and a truncated translation text in which the foreign language text is embedded within a bordered truncation area below primary discriminatory character strokes of the truncated translation text. As shown, descenders can add additional character differentiation. In other variant embodiments, the bordered truncation area is disposed above the discriminatory character strokes, whereas in another variant embodiment, the bordered truncation area is disposed in between upper and lower discriminatory strokes.

FIG. 24 depicts a composite text analogous to FIG. 19 except that here English is treated as a foreign language text and Hebrew is treated as a truncated translation text, according to an embodiment. The language to be treated as a foreign language and the translation text is entirely configurable. Rendering engine 1 has a pre-defined data file truncated translation data 19B (Shown in FIG. 2) of truncated translation characters in accordance with the embodiment to be employed. For example, embodiments employing upper and lower discriminatory strokes, bound by x-height and baseline, respectively, the translation characters of the translation text are replaced with pre-defined truncated translation characters having a truncation area in between the upper and lower truncated discriminatory strokes. Analogously, embodiments employing the top two discriminatory strokes in which the upper stroke is bound by the x-height, the translation characters are replaced with predefined, truncated translation characters having a truncation area below the middle discriminatory stroke. Similarly, embodiments employing the bottom two discriminatory strokes in which the bottom stroke is bound by the baseline, the translation characters are replaced with truncated translation characters having a truncation area above the middle discriminatory stroke. This applies in any language configured to be a translation language. In a certain embodiment, the truncation is implemented in real time.

In an embodiment, the truncated translation characters are implemented as other forms of semantically related content like transliteration, for example. In another embodiment, the truncated characters are implemented as currency equivalents of the text, associated pricing, relevant telephone numbers, dates, or times. In another embodiment, the truncated content is implemented as advertising material or pictorial content related to the text.

FIG. 25 is a flow chart depicting processing steps employed in the implementation of display schemes embedding foreign language text within a truncation area of a translation text, according to an embodiment.

At step 120, rendering engine 1 receives a first text string that has been pre-identified as foreign text characters either by the user or another interested party. In step 122, rendering engine 1 obtains a second text string as a translation of the foreign text. In step 124, translation text characters are rendered into predefined truncated translation characters in accordance with the type of truncation to be employed. As noted above, when English is used as the translation text, there are three truncation possibilities; each one having discriminatory character strokes displayed at different character heights. Accordingly, the translation characters are replaced with a truncated translation characters in between the discriminatory character strokes, or below the discriminatory character strokes or above the discriminatory character strokes. In step 128, the resulting composite text is displayed or printed.

FIG. 28 shows a block diagram illustrating example physical components (e.g., hardware) of a computing device 300 with which aspects of the disclosure may be practiced. The computing device may be referred to as the system.

In a preferred embodiment, the computing device 300 includes at least one processor 302, an input device 304 such as a keyboard, mouse, and or touchscreen, and an output device 306 such as a printer or an electronic display in any of the various forms associated with computing devices. The computing device may also include a network interface 308 for network enablement. It should be appreciated that processing may be implemented either locally or remotely via various forms of wireless or wired networking technologies or a combination of both.

The memory 310 may include various types of short and long-term memory as is known in the art. Memory 310 may be loaded with various applications 312 including a digital character recognition module 314 for identifying characters on display screens as will be further discussed, a parsing module 316 for identifying characters and associated character metadata by parsing the tags of HTML content and associated Cascading Style Sheet (CSS) files as will be further discussed, a translation module 317 for translating various foreign languages into either English or other chosen languages, a calculation module 318 for defining the airspaces of characters as will be further discussed, a placement module 320 for placing and/or superimposing characters as will be further discussed, an operations module 322 for performing various modifications to characters as will be further discussed, and a renderer 324 for rendering the characters for display as will be further discussed. Accordingly, memory 310 includes all necessary modules per each embodiment.

Memory 310 may also include a database 326 loaded with character data 328 and modified character data 330.

Character data 328 may include all data and metadata associated with characters.

Data includes, but is not limited to, the character's identity (its literal value or representation), such as: Alphabetic Characters: Any letter from any alphabet (e.g., A-Z in the Latin alphabet, A-я in Cyrillic, α-ω in Greek); Numerical Characters: Any digit (0-9); Special Characters: Symbols and punctuation marks (e.g., @, #, $, %, &, *, (, ), !, ?); and Whitespace Characters: Spaces, tabs, newlines, and other characters that structure the text but are not visible as symbols or letters. In some embodiments, data also includes Emoji characters and other graphical symbols (e.g., small images or pictures approximately the size of a text character).

These elements are considered the core data because they are the primary content with which users interact or that systems process. Each character's value or type directly impacts the meaning or structure of the text. For example, changing a letter in a word can alter its meaning, adding a punctuation mark can change the tone or clarity of a sentence, and including a number can provide specific information or data.

Metadata includes, but is not limited to, various attributes and contextual details that describe or provide additional information about how the character is presented or should be interpreted such as: Font Type: The specific style of the textual design used to display the character, such as Arial, Times New Roman, or Comic Sans; Font Size: The size of the character in points (pt), pixels (px), ems, or other units of measurement, determining how large the character appears on the screen; Color: The color of the character, which can be defined in various formats such as hexadecimal (e.g., #FFFFFF for white), RGB (e.g., rgb(255, 255, 255) for white), or color names (e.g., "white"); Font Weight: The thickness of the character's strokes, which can range from thin to bold, affecting the emphasis or readability of the text; Font Style: Additional styling applied to the character, such as italic or underline, which can convey emphasis or distinguish certain text from its surrounding content; Position: The location of the character on the screen, often defined in terms of x,y coordinates relative to a container or page layout, affecting how text flows and is aligned.

These metadata attributes contribute to the presentation and visual interpretation of text on digital platforms, influencing both aesthetics and functionality. They play a critical role in web design, document formatting, and user interface development, ensuring that text is not only readable and accessible but also visually aligned with the intended message or brand identity.

Modified character data 330 may include all data and metadata associated with modified characters. In some embodiments, additional modified character data 300 may include a list of characters that have been previously modified, a list of modifications performed on those characters, the appearance of modified characters, etc. If the computing device has previously performed specific modifications on a specific character, it may retrieve the appropriate modified character to be rendered for display from modified character data 330 rather than performing modifications on the character. In certain embodiments, the database 326 may be implemented locally, whereas in other embodiments, the database 326 may be implemented remotely.

Text specific values for characters and modified characters, including, but not limited to, text ceiling, text floor, text x-height, and text base line, may be stored as part of character data 328 or modified character data 230. Preferred user settings and character modifications may be saved as user preference data 332. Accordingly, the database 326 includes all necessary content per each embodiment.

The term computer readable media as used herein may include computer storage media. Computer storage media may include volatile and nonvolatile, removable and non-removable media implemented in any method or technology for storage of information, such as computer readable instructions, data structures, or program modules. The memory 310, the removable storage device 334, and the non-removable storage device 336 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The computing device 300 is operative to employ various font technologies like variable fonts, raster, vector, TrueType, and Microsoft OpenType and the database 326 also includes associated font-resource files.

The computing device 300 may further comprise a trained AI model where the trained AI model is configured to automatically, after receiving the character composition of the first meaningful unit as an input, provide the second meaningful unit as an output. For example, the trained AI model can be configured to provide synonyms, translations, and the like.

FIG. 29 illustrates an exemplary method 600 for displaying, on an electronic display, two sets of characters in an interference reducing manner.

In step one 602, two or more first characters are received, where the first characters are associated with a first meaningful unit. For example, in stage 1 on FIG. 31, the first characters of "h", "o", "l", and "a" are received.

According to an embodiment, the first characters are automatically received when the digital character recognition module scans the electronic display to identify characters. The entirety of the content may be scanned. Alternatively, a user may select a portion of the content to be scanned. Data and metadata of each first character may be saved to character data 328.

According to another embodiment, the first characters are automatically received when the parsing module parses HTML content and associated CSS files. The entirety of the HTML content and associated CSS files may be parsed. Alternatively, a user may select a portion of the HTML content and associated CSS files to be parsed. The parsing module parses the tags of the HTML content to identify characters as well as associated Cascading Style Sheet (CSS) files to identify associated character metadata. Data and metadata of each first character may be saved to character data 328.

According to another embodiment, the first characters are received when a user inputs the first characters via the input device 304. For example, a user inputs the first characters by typing on a keyboard.

In step two 604, two or more second characters are received, where the second characters are associated with a second meaningful unit. For example, in stage 2 on FIG. 31, the second characters of "H", "E", "L", "L", and "O" are received.

According to an embodiment, the second characters are received when they are retrieved from character data 328. The second meaningful unit comprised of the second characters may be a translation of the first meaningful unit comprised of the first characters.

According to another embodiment, the second characters are received when a user inputs the second characters via the input device 304. For example, a user inputs the second characters by typing on a keyboard.

According to another embodiment, the second characters are received as an automatic output from a natural language processing service (e.g., an automatic translator).

In step three 606, x,y coordinates are received for each of the first and second characters.

According to an embodiment, the x,y coordinates are received when they are retrieved from character data 328.

If the received x,y coordinates for each of the second characters are predetermined (e.g., each of the second characters has a known, fixed placement on the electronic display), the received x coordinate for a given first character is predetermined (e.g. the given first character has a known, fixed horizontal placement on the electronic display), and the y coordinate for the given first character is not predetermined (e.g., the given first character has an unknown, unfixed vertical placement on the electronic display), the y coordinate for the given first character is received when the computing device determines, in real time, the y coordinate for the given first character.

According to an embodiment, the computing device determines, in real time, the y coordinate for the given first character by testing a set of y coordinates for the given first character until it finds a suitable y coordinate that results in an electronic display where the topmost point of the given first character is above the base line of the immediately adjacent second character, the bottommost point of the given first character is below the x-height line of the immediately adjacent second character, and, when the given first character is a same color as the immediately adjacent second character, the majority of the bar or shoulder of the given first character does not overlap the bar or shoulder of the immediately adjacent second character. Alternatively, the bar or shoulder of the given first character does not have any overlap with the bar or shoulder of the immediately adjacent second character when the given first character is displayed at its suitable y coordinate.

If the received x,y coordinates for each of the first characters are predetermined (e.g., each of the first characters has a known, fixed placement on the electronic display), the received x coordinate for a given second character is predetermined (e.g. the given second character has a known, fixed horizontal placement on the electronic display), and the y coordinate for the given second character is not predetermined (e.g., the given second character has an unknown, unfixed vertical placement on the electronic display), then the y coordinate for the given second character is received when the computing device determines, in real time, the y coordinate for the given second character.

According to an embodiment, the computing device determines, in real time, the y coordinate for the given second character by testing a set of y coordinates for the given second character until it finds a suitable y coordinate that results in an electronic display where the baseline of the given second character is below the topmost point of an immediately adjacent first character, the x-height line of the given second character is above the bottommost point of the immediately adjacent first character, and, when the given second character is a same color as the immediately adjacent first character, the bar or shoulder of the given second character does not overlap a majority of the bar or shoulder of the immediately adjacent first character. Alternatively, the bar or shoulder of the given second character does not have any overlap with the bar or shoulder of the immediately adjacent first character when the given second character is displayed at its suitable y coordinate.

If the received x,y coordinates for each of the second characters are predetermined (e.g., each of the second characters has a known, fixed placement on the electronic display) and the x,y coordinates for a given first character are not predetermined (e.g., the given first character has an unknown, unfixed placement on the electronic display), then the x,y coordinates for the given first character is received when the computing device determines, in real time, the x,y coordinates for the given first character.

According to an embodiment, the computing device determines, in real time, the x,y coordinates for the given first character by testing sets of x,y coordinates for the given first character until it finds a suitable x,y coordinate that results in an electronic display where the topmost point of the given first character is above the base line of the immediately adjacent second character, the bottommost point of the given first character is below the x-height line of the immediately adjacent second character, and, when the given first character is a same color as the immediately adjacent second character, the majority of the bar or shoulder of the given first character does not overlap the bar or shoulder of the immediately adjacent second character. Alternatively, the bar or shoulder of the given first character does not have any overlap with the bar or shoulder of the immediately adjacent second character when the given first character is displayed at its suitable y coordinate.

If the received x,y coordinates for each of the first characters are predetermined (e.g., each of the first characters has a known, fixed placement on the electronic display) and the x,y coordinates for a given second character are not predetermined (e.g., the given second character has an unknown, unfixed placement on the electronic display), then the x,y coordinates for the given second character is received when the computing device determines, in real time, the x,y coordinates for the second first character.

According to an embodiment, the computing device determines, in real time, the x,y coordinates for the given second character by testing sets of x,y coordinates for the given second character until it finds a suitable x,y coordinate that results in an electronic display where the baseline of the given second character is below the topmost point of an immediately adjacent first character, the x-height line of the given second character is above the bottommost point of the immediately adjacent first character, and, when the given second character is a same color as the immediately adjacent first character, the bar or shoulder of the given second character does not overlap a majority of the bar or shoulder of the immediately adjacent first character. Alternatively, the bar or shoulder of the given second character does not have any overlap with the bar or shoulder of the immediately adjacent first character when the given second character is displayed at its suitable y coordinate.

Testing y or x-y coordinates to find suitable y or x-y coordinates may include performing a pixel-by-pixel comparison of the tested first and second characters to determine whether or not the bar or shoulder of the tested second character does not overlap a majority of the bar or shoulder of the tested first character.

Testing to see if a bar or shoulder of a first character overlaps a bar or shoulder of a second character may include performing a pixel-by-pixel comparison of the bars and shoulders of the first and second character to determine if the bars or shoulders of the first and second characters share any pixels.

In step four 608, the renderer 324, in conjunction with the placement module 326, automatically places the first and second characters according to their x,y coordinates such that at least two of the first characters are embedded within at least two of the second characters where a topmost point of a given embedded first character is above a base line of an immediately adjacent second character (e.g., In FIG. 30, the topmost point of "o" is above the baseline of "L"), a bottommost point of the given embedded first character is below an x-height line of the immediately adjacent second character (e.g., In FIG. 30, the bottommost point of the "o" is below the x-height line of the "L"), the given embedded first character is entirely in between leftmost points or rightmost points of two immediately adjacent second characters (e.g., In FIG. 30, the "o" is in between the rightmost points of each "L") and, when a color of the given embedded first characters is the same as a color of the second characters, a majority of the embedded first characters do not have a bar or shoulder that overlaps a bar or shoulder of one of the second characters. Alternatively, when a color of the embedded first characters is the same as a color of the second characters, a majority of the embedded first characters do not have a majority of a bar or shoulder that overlaps a bar or shoulder of one of the second characters. For example, in stage 3 of FIG. 31, the first characters of "h", "o", "l", and "a" are embedded into the second characters of "L", "L", and "A", according to the aforementioned placement limitations.

When the first character is the same color as the second character, having a bar or shoulder of the first character overlap a bar or shoulder of the second character creates unnecessary clutter and is aesthetically unappealing. Thus, a majority of the embedded first characters should not have a bar or shoulder that overlaps a bar or shoulder of one of the second characters.

In an embodiment, a second character is considered to have a first character embedded within it when a portion of the first character is inside of an airspace of a second character.

In step five 610, the first and second characters are displayed on an electronic display where at least two of the first characters are embedded within the at least two of the second characters. For example, in stage 4 of FIG. 31, the first characters of "h", "o", "l", and "a", embedded into the second characters of "L", "L", and "A", are displayed on a webpage.

In a preferred embodiment, the electronic display is updated in real time when an update condition is met.

Update conditions include, but are not limited to, a change in the appearance of one of the first characters (e.g., someone deemphasized one of the first characters), a change in the appearance of one of the second characters (e.g., someone changed a font of one of the second characters), a change in the placement of one of the first characters (e.g., someone spaces apart the first characters), and a change in the placement of one of the second characters (e.g., someone moves the first second characters down by half an inch). Alternatively, update conditions include any conditions that would require the computing device to determine new x,y, coordinates for at least one of the characters such that, when the first and second characters according to their x,y coordinates, at least two of the first characters are embedded within at least two of the second characters wherein a topmost point of a given embedded first character is above a base line of an immediately adjacent second character, a bottommost point of the given embedded first character is below an x-height line of the immediately adjacent second character, the given embedded first character is entirely in between leftmost points or rightmost points of two immediately adjacent second characters and, when a color of the embedded first characters is the same as a color of the second characters, a majority of the embedded first characters do not have a bar or shoulder that overlaps a bar or shoulder of one of the second characters.

In another embodiment, the electronic display is updated when an update condition is met and the user has approved the update. For example, a user increases the font size of the first characters (e.g., selects a larger size for the first meaningful unit). The computing device prompts the user if he wants the electronic display to be updated to reflect the increased font size (e.g., a new window opens asking the user if he or she wants to continue). The user responds affirmatively and the electronic display is updated (e.g., the user clicks continue on the new window).

In a preferred embodiment, each of the second characters has a different style than each of the first characters. For example, in FIG. 30, each of the first characters in "Hola" have a different size and font than each of the second characters in "HELLO". Advantages of using different styles include enhanced readability (Different styles can help distinguish between the two sets of characters, making it easier for readers to identify and understand both words. This is particularly useful in complex designs where the words might otherwise blend together), visual appeal (Varying the style of characters can add visual interest and depth to a design. This technique can transform plain text into a more dynamic and engaging visual element, contributing to the overall aesthetic of a piece), and emphasis (Using different styles can highlight one set of characters over another, allowing for subtle emphasis without the need for additional explanatory text. This can be useful in branding or in designs where space is limited).

In a preferred embodiment, the first meaningful unit does not have the same character composition as the second meaningful unit. For example, in FIG. 30, the character composition of the first characters is "Hola" while the character composition of the second characters is "HELLO".

In an embodiment, the average width of the first characters of the first meaningful unit is preferably at least 70% of the average width of the second characters comprising the second meaningful unit, more preferably at least 60% of the average width of the second characters comprising the second meaningful unit, even more preferably at least 50% of the average width of the second characters comprising the second meaningful unit, even more preferably at least 40% of the average width of the second characters comprising the second meaningful unit, and most preferably at least 30% of the average width of the second characters comprising the second meaningful unit. The width of a given character is measured as the horizontal distance from the leftmost point of the given character to the rightmost point of the given character.

In an embodiment, the average height of the first characters of the first meaningful unit is preferably at least 70% of the average height of the second characters comprising the second meaningful unit, more preferably at least 60% of the average height of the second characters comprising the second meaningful unit, even more preferably at least 50% of the average height of the second characters comprising the second meaningful unit, even more preferably at least 40% of the average height of the second characters comprising the second meaningful unit, and most preferably at least 30% of the average height of the second characters comprising the second meaningful unit. The height of a given character is measured as the vertical distance from the bottommost point of the given character to the topmost point of the given character.

In an embodiment, the average height and width of the first characters of the first meaningful unit is preferably at least 70% of the average height and width of the second characters comprising the second meaningful unit, more preferably at least 60% of the average height and width of the second characters comprising the second meaningful unit, even more preferably at least 50% of the average height and width of the second characters comprising the second meaningful unit, even more preferably at least 40% of the average height and width of the second characters comprising the second meaningful unit, and most preferably at least 30% of the average height and width of the second characters comprising the second meaningful unit. The height of a given character is measured as the vertical distance from the bottommost point of the given character to the topmost point of the given character. The width of a given character is measured as the horizontal distance from the leftmost point of the given character to the rightmost point of the given character.

In an embodiment, for each second character having the same character identity, a placement of embedded first characters, relative to the placement of the given second character having the same character identity, is consistent. For example, in FIG. 30, two of the second characters have the character identity "L". The positions of the embedded first characters, "h" and "o", are consistent relative to the position of each "L". Such consistency increases the readability of the first and second texts.

In an embodiment, each of the first characters has the same style. For example, in FIG. 30, the "h", "o", "l" and "a" are in 28 point Candara font.

In an embodiment, each of the second characters has the same style. For example, in FIG. 30, the "H", "E", "L", "L", and "O" in 72 point Candara font.

Having a uniform style among characters within a set of characters offers several advantages, particularly in terms of readability, aesthetics, and user experience. Key benefits include consistency (Using the same style for all characters creates a consistent visual experience, which is crucial for branding and professional presentations. Consistency helps in reinforcing brand identity and makes documents or interfaces appear more organized and polished) and readability (A uniform text style can significantly improve readability. When all characters share the same font, size, and color, it's easier for readers to process the information without getting distracted by varying styles. This uniformity can reduce cognitive load, making it simpler for users to focus on the content).

In an embodiment, the at least two of the second characters have a counter characterized by a horizontal stroke disposed at a height not overlapped by the at least two first characters when the at least two first characters are embedded into the at least two of the second characters. Having a higher horizontal stroke results in a character having a higher x-height. For example, in FIG. 9G, the first characters of "2", "0", "1", and "0" are embedded in the second characters of "a" and "m". The horizontal strokes of "a" and "m" are above the topmost points of the "2", "0", "1", and "0", preventing overlap. Alternatively, each of the second characters has a counter characterized by a horizontal stroke disposed at a height not overlapped by the at least two first characters when the at least two first characters are embedded into the at least two of the second characters.

In an embodiment, the at least two of the second characters have a truncated non-discriminatory character stroke. For example, in FIG. 13B, center strokes of the second characters of "1", "2", and "3" are truncated such that, when the first characters of "€", "1", "0", "8", "8" are embedded into the truncated second characters according to the method 600 of FIG. 29, the first characters advantageously do not overlap the second characters. Alternatively, only a portion of a non-discriminatory character stroke is truncated.

The method 600 of FIG. 29 can further comprise a step of modifying the second characters to have a truncated non-discriminatory character stroke. For example, in FIG. 14, the received English characters of stage 1 are modified into the English characters of stage 3 having a portions of non-discriminatory character strokes removed.

The method 600 of FIG. 29 can further comprise a step of modifying the second characters to have a counter characterized by a horizontal stroke disposed at a height not overlapped by the at least two first characters when the at least two first characters are embedded into the at least two of the second characters. For example, in FIG. 6, the received Hebrew characters of stage 1 are modified into the Hebrew characters of stage 3 having a counter characterized by a horizontal stroke disposed at a height not overlapped by the at least two first characters when the at least two first characters are embedded into the at least two of the second characters. Modifying the second characters to have a counter characterized by a horizontal stroke disposed at a height not overlapped by the at least two first characters when the at least two first characters are embedded into the at least two of the second characters includes receiving pre-modified second characters having a counter characterized by a horizontal stroke disposed at a height not overlapped by the at least two first characters when the at least two first characters are embedded into the at least two of the second characters, where the second characters have the same character identity as the pre-modified second characters.

In an embodiment, each of the second characters has a geometry defining a common counter width. For example, in FIG. 7a and FIG. 7b, each of the Hebrew characters has a geometry defining a common counter width.

The method 600 of FIG. 29 can further comprise a step of modifying the second characters to have a geometry defining a common counter width. For example, in FIG. 6, the received Hebrew characters of stage 1 are modified into the Hebrew characters of stage 3 having a geometry defining a common counter width. Modifying the second characters to have a geometry defining a common counter width includes receiving pre-modified second characters having a geometry defining a common counter width, where the second characters have the same character identity as the pre-modified second characters.

In an embodiment, a horizontal series of points on the electronic display define a placement of a series of receiving regions, the receiving regions having a width substantially equal to the counter width or a fractional multiple thereof. For example, in FIG. 7a, the display screen is divided into a plurality of vertical receiving regions where each receiving region has a width that is 25% of the common counter width.

The first characters of "t", "h", "e", "b", "o", "y", "a", "t", and "e" are each placed within a receiving region.

In an embodiment, the majority of the height of a given first character is in between the base line and the x-height line of the immediately adjacent second character when the given first character is embedded into the second characters. For example, in FIG. 30, a majority of the height of each of the first characters of "h", "o", "l" and "a" is in between the base line and the x-height line of the immediately adjacent second characters of "L", "L", and "O". The height of a given first character is measured as the vertical distance between the bottommost point and the topmost point of the given first character.

The method 600 of FIG. 29 can further comprise steps of: Receiving, by the computing device, two or more third characters associated with a third meaningful unit. For example, in stage 1 of FIG. 32, the third characters of "h", "a", "l", "l", and "o" are received. Receiving, by the computing device, x,y coordinates for the third characters (not shown). Automatically placing, by the rendering engine of the computing device, the third characters according to their x,y coordinates such that at least two of the third characters are embedded within at least two of the second characters wherein, a majority of a height of a given third character is in between the x-height line and the ascender line of the immediately adjacent second character; the third characters are embedded into the at least one of the second characters. For example, in stage 2 of FIG. 32, the third characters of "h", "a", "l", "l", and "o" are embedded into the second characters of "L", "L", and "A", according to the aforementioned placement limitations. Displaying, on the electronic display, the at least two of the first characters embedded within the at least two of the second characters. For example, in stage 4 of FIG. 32, the third characters of "h", "a", "l", "l" and "o", embedded into the second characters of "L", "L", and "A", are displayed on a webpage.

The method 600 of FIG. 29 can further comprise steps of: Receiving, by the computing device, two or more third characters associated with a third meaningful unit. For example, in stage 1 of FIG. 32, the third characters of "h", "a", "l", "l", and "o" are received. Receiving, by the computing device, x,y coordinates for the third characters (not shown). Automatically placing, by the rendering engine of the computing device, the third characters according to their x,y coordinates such that at least two of the third characters are embedded within at least two of the second characters wherein, a majority of a height of a given third character is in between the descender line and the base line of the immediately adjacent second character; the third characters are embedded into the at least one of the second characters. For example, in stage 2 of FIG. 32, the third characters of "h", "a", "l", "l", and "o" are embedded into the second characters of "L", "L", and "A", according to the aforementioned placement limitations. Displaying, on the electronic display, the at least two of the first characters embedded within the at least two of the second characters. For example, in stage 4 of FIG. 32, the third characters of "h", "a", "l", "l" and "o", embedded into the second characters of "L", "L", and "A", are displayed on a webpage.

In an embodiment, the computing device is configured to display, on the electronic display, additional information about the first or second meaningful unit when a user interacts with the first or second meaningful unit. For example, when the user hovers over a word with his or her mouse, its definition is displayed.

In an embodiment, when each of the first and second characters are placed according to their x,y coordinates, the body of a given second character is not intersected by a stroke of a character not associated with the second meaningful unit, where the path of the stroke crosses from a first vacated area into a second vacated area and the second vacated area located on an opposite side of the body from the first vacated area. For example, in FIG. 34, the body of the second character "o" is intersected by the rightmost stroke of the first character "w". The path of the rightmost stroke crosses from the first vacated area (outside of the "o") to the second vacated area (inside of the "o") where the second vacated area located on an opposite side of the body from the first vacated area. Thus, this display does not meet the aforementioned limitation.

In an embodiment, when the first characters have a same color as the second characters, the body of a given second character is separated, via a spacing, from the body of the character not associated with the second meaningful unit when a majority of the body of the character not associated with the second meaningful unit intersects into the body of the given second character. For example, in FIG. 35, the first characters of "v" and "v" have the same color as the second characters of "O" and "O". The majority of the body of the left "v" does not intersect into the body of the left "O" so a spacing is not required to meet the aforementioned limitation. In contrast, the majority of the body of the right "y" intersects into the body of the right "O" so a spacing is required to meet the aforementioned limitation.

In an embodiment, the first characters that form a portion of the first meaningful unit have a different appearance than the first characters that do not form the portion of the first meaningful unit, the second characters that form a portion of the second meaningful unit have a different appearance than the second characters that do not form the portion of the second meaningful unit, and the first characters that form the portion of the first meaningful unit correspond to the second characters that form the portion of the second meaningful unit. For example, in FIG. 36, the first characters of "pre" are a lighter shade than the remaining first characters of "requisite". The second characters of "previo" are a lighter shade than the remaining second characters of "requisite". The first characters of "pre" correspond to the second characters of "previo" because they are both prefixes. Such limitations advantageously highlight the correspondence between a portion of a first meaningful unit and a portion of a second meaningful unit.

In an embodiment, the second characters have a lighter shade than the first characters. Alternatively, the first characters have a lighter shade than the second characters.

The method 600 of FIG. 29 can further comprise steps of deemphasizing at least one of the first characters or deemphasizing at least one of the second characters when a deemphasis condition is met. Deemphasis conditions can include, but are not limited to, coming across a word more than once. For example, a user is trying to learn Spanish. A language learning program displays Spanish words with smaller English translations embedded inside of the Spanish words. A user can glance at the English translation when they forget the meaning of the Spanish word. However, each time a user comes across the Spanish word, the English translation becomes lighter and lighter, and, eventually, disappears entirely. Such gradual deemphasis prevents the user from over reliance on the English translation.

The method 600 of FIG. 29 can further comprise steps of displaying, on an electronic display, at least two of the second characters embedded into the first characters, where the at least two of the second characters embedded into the first characters are displayed next to the at least two of the first characters embedded into the at least two second characters. For example, in FIG. 37, the second characters of "H", "E", "L", "L", "O" are embedded into the first characters of "h", "o", "l", and "a", which is displayed next to the first characters of "h", "o", "l", and "a" embedded into the second characters of "H", "E", "L", "L", "O".

In an embodiment, the character composition of the first meaningful unit and the character composition of the second meaningful unit alternate, either periodically or when prompted to. For example, in FIG. 38, on the left webpage, the character composition of the first meaningful unit is "hola" and the character composition of the second meaningful unit is "HELLO". In contrast, on the right webpage, the character composition of the first meaningful unit is "HELLO" and the character composition of the second meaningful unit is "hola". The webpage alternates between these two displays. Preferably, this alternating occurs when a user interacts with either the first or second meaningful unit (e.g., by hovering over it with a mouse).

In an embodiment, the first characters and the second characters are not displayed simultaneously. For example, in FIG. 39, on the left webpage, only the first characters of "h", "o", "l", and "a" are displayed. In contrast, on the right webpage, only the second characters of "H", "E", "L", "L", and "O" are displayed. Preferably, the webpage periodically alternates between displaying the first characters and the second characters.

In an embodiment, the character composition of the first meaningful unit and the character composition of the second meaningful unit are part of a set of character compositions, the set of character compositions including at least three character compositions. The character composition of the first meaningful unit is a given character composition and the character composition of the second meaningful unit is the next character composition in the set of character compositions. Periodically, or when prompted to, the character composition of the first meaningful unit is changed to the character composition is changed to the next character composition. For example, the set of character compositions includes three character compositions of "hello", "hola", and "hallo". The electronic display displays the characters of "hola" embedded into the characters of "hello". Next, the electronic display displays the characters of "hello" embedded into the characters of "hallo". Next, the electronic display displays the characters of "hallo" embedded into the characters of "hola", and so on.

In an embodiment, for the method 600 of FIG. 29, at least five first characters are received and when each of the first and second characters are placed according to their x,y coordinates, at least four of the first characters are embedded within at least two of the second characters.

In an embodiment, for the method 600 of FIG. 29, at least five first characters are received and when each of the first and second characters are placed according to their x,y coordinates, at least four of the first characters are embedded within at least four of the second characters.

In an embodiment, the first characters or the second characters are quickly deemphasized when there is an alert. For example, the second characters show a driver's speed, represented by a two-digit value. The first characters, embedded in the second characters, read "STOP". When there is an emergency, the first characters are emphasized and the second characters are deemphasized.

In an embodiment, the native language text only appears after an increasingly longer period of time. A language learning game may include having to determine a meaning of the translation text before the native language text appears.

In an embodiment, a spacing in between second characters belonging to the same word is less than 20% of the average width of the second characters, more preferably less than 15% of the average width of the second characters, and most preferably less than 10% of the average width of the second characters. Placing the second characters closer together allows embedded first characters to be placed closer together, further reducing the required size of the electronic display.

In an embodiment, a spacing in between second characters is less than 20% of the average width of the second characters, more preferably less than 15% of the average width of the second characters, and most preferably less than 10% of the average width of the second characters.

In an embodiment, the first and second meaningful units are the name of a food and its calorie count or other nutritional information. Alternatively, the first and second meaningful units are the name of a location and its temperature or other weather condition. Alternatively, the first and second meaningful units are a location and a departure or arrival time.

FIG. 40 shows demarcated English and Hebrew text string, where English substrings are placed above their corresponding Hebrew substrings. The demarcations are the grey quadrilaterals at the bottom of the Hebrew substrings. Here, the phrases of "In his goodness" and "with favor with kindness and with mercy" are placed above their corresponding Hebrew phrases. The demarcations for these phrases are separated by a first distance "a". The phrase of "with favor with kindness and with mercy" is separated into words of "with favor", "with kindness", and "with mercy". The directions for these words are separated by a second distance "b". In an embodiment distance "a" and distance "b" are two different non-zero values. Alternatively, distance "a" is greater than distance "b". Alternatively, distance "b" is zero. Terminal ends of a demarcation can be highlighted with a terminal edge (e.g., with a triangle 700) to demarcate the end of a sentence or another structural unit. The demarcations, with or without terminal edges, can provide a 3-D effect to the first and/or second text strings.

Individual blocks may be deleted from the methods without departing from the spirit and scope of the subject matter described herein. All method steps described within this document may be performed in real-time and automatically by a processer or processors of the system.

We claim:

1. A method of displaying two sets of characters in an interference reducing manner, the method implemented by a computing device, the method comprising:

receiving, by the computing device, two or more first characters associated with a first meaningful unit, two or more second characters associated with a second meaningful unit where each of the second characters has a different style than each of the first characters, x,y coordinates for each of the first characters, and x,y coordinates for each of the second characters;

calculating, by the computing device, updated x,y coordinates such that placement of the first and second characters according to the updated x,y coordinates causes at least two of the first characters to be embedded within at least two of the second characters;

causing a rendering engine of the computing device to automatically place the first and second characters according to their updated x,y coordinates such that the at least two of the first characters are embedded within the at least two of the second characters;

wherein a given first character is embedded within the at least two of the secondary characters if a topmost point of the given first character is above a base line of an immediately adjacent second character, a bottommost point of the given first character is below an x-height line of the immediately adjacent second character, and the given first character is entirely in between leftmost points of the two immediately adjacent second characters or in between rightmost points of the two immediately adjacent second characters;

a character identity of at least one of the second characters is different from a character identity of an other one of the second characters; and a character composition of the first meaningful unit is different from a character composition of the second meaningful unit.

2. The method of claim 1, wherein when the received x,y coordinates for each of the second characters are predetermined, and the received x coordinate and/or the received y coordinate for the given first character is not predetermined:

the computing device calculates the updated x,y coordinates for the given first character by:

testing a set of x coordinates and/or testing a set of y coordinates for the given first character and identifying the updated x,y coordinates for the given first character that result in the topmost point of the given first character being above the base line of an immediately adjacent second character, the bottommost point of the given first character being below the x-height line of the immediately adjacent second character, and the given first character being entirely in between the leftmost points of the two immediately adjacent second characters or in between the rightmost points of the two immediately adjacent second characters.

3. The method of claim 1, wherein an average width of the first characters comprising the first meaningful unit is at least 40% of an average width of the second characters comprising the second meaningful unit; and/or an average height of the first characters comprising the first meaningful unit is at least 40% of an average height of the second characters comprising the second meaningful unit.

4. The method of claim 1, wherein for each second character having a same character identity, a placement of embedded first characters, relative to the placement of a given second character having the same character identity, is consistent.

5. The method of claim 1, wherein each of the first characters has a same style.

6. The method of claim 1, wherein the at least two of the second characters have a counter characterized by a horizontal stroke disposed at a height not overlapped by the at least two first characters when the at least two first characters are embedded into the at least two of the second characters.

7. The method of claim 1, wherein each of the second characters has a geometry defining a common counter width.

8. The method of claim 7, wherein a horizontal series of points on an electronic display define a placement of a series of receiving regions, the receiving regions having a width equal to the counter width or a fractional multiple thereof; and a majority of the embedded first characters are placed into one of the receiving regions.

9. The method of claim 1, further comprising steps of:

modifying the at least two of the second characters to have a counter characterized by a horizontal stroke disposed at a height not overlapped by the at least two first characters when the at least two first characters are embedded into the at least two of the second characters.

10. The method of claim 1, further comprising steps of:

modifying each of the second characters to have a geometry defining a common counter width.

11. The method of claim 1, wherein a majority of a height of the given first character is in between the base line and the x-height line of the immediately adjacent second character.

12. The method of claim 11, further comprising steps of:

receiving, by the computing device, two or more third characters associated with a third meaningful unit;

receiving, by the computing device, x,y coordinates for the third characters;

causing a rendering engine of the computing device to automatically place the third characters according to their x,y coordinates such that at least two of the third characters are embedded within at least one of the second characters;

wherein a given third character is embedded within the second characters if:

a majority of a height of a given third character is in between the x-height line and the ascender line of the immediately adjacent second character.

13. The method of claim 1, further comprising steps of:

when a user interacts with one of the first or second meaningful units:

displaying, on the electronic display, additional information about the first or second meaningful unit.

14. The method of claim 1, wherein when each of the first and second characters are placed according to their updated x,y coordinates:

a body of a given second character is not intersected by a stroke of a character not associated with the second meaningful unit, wherein the stroke crosses from a first vacated area into a second vacated area;

the second vacated area is located on an opposite side of the body from the first vacated area; and when the first characters have a same color as the second characters, the body of the given second character is separated, via a spacing, from a body of the character not associated with the second meaningful unit when a majority of the body of the character not associated with the second meaningful unit intersects into the body of the given second character.

15. The method of claim 1, wherein the first characters that form a portion of the first meaningful unit have a different appearance than the first characters that do not form the portion of the first meaningful unit;

the second characters that form a portion of the second meaningful unit have a different appearance than the second characters that do not form the portion of the second meaningful unit; and the first characters that form the portion of the first meaningful unit correspond to the second characters that form the portion of the second meaningful unit.

16. The method of claim 1, wherein the second characters are deemphasized relative to the first characters; or the first characters are deemphasized relative to the second characters.

17. The method of claim 1, further comprising steps of:

deemphasizing at least one of the first characters or deemphasizing at least one of the second characters.

18. The method of claim 1, wherein the character composition of the second meaningful unit is automatically provided as an output from a trained AI model, wherein an input to the trained AI model is the character composition of the first meaningful unit; or the character composition of the first meaningful unit is automatically provided as an output from the trained AI model, wherein an input to the trained AI model is the character composition of the second meaningful unit.

19. The method of claim 1, wherein the second meaningful unit is a translation of the first meaningful unit;

the first meaningful unit is a translation of the second meaningful unit;

the second meaningful unit is a transliteration of the first meaningful unit; or the first meaningful unit is a transliteration of the second meaningful unit.

20. The method of claim 1, wherein at least five first characters are received; and when each of the first and second characters are placed according to their updated x,y coordinates, at least four of the first characters are embedded within at least two of the second characters.

21. The method of claim 1, wherein at least five first characters are received;

at least five second characters are received; and when each of the first and second characters are placed according to their updated x,y coordinates, at least four of the first characters are embedded within at least four of the second characters;

wherein a given first character is embedded within the at least four of the secondary characters if a topmost point of the given first character is above the base line of an immediately adjacent second character, the bottommost point of the given first character is below the x-height line of the immediately adjacent second character, and the given first character is entirely in between leftmost points of the two immediately adjacent second characters or in between rightmost points of the two immediately adjacent second characters.

22. The method of claim 1, wherein the at least two of the second characters have a truncated non-discriminatory character stroke.

23. The method of claim 1, wherein when an appearance of a bar or shoulder of the embedded first characters is the same as an appearance of a bar or shoulder of the second characters, a majority of the embedded first characters do not have a bar or shoulder that overlaps a bar or shoulder of one of the second characters.

24. The method of claim 1, wherein an appearance of at least one of the second characters includes a truncated portion such that, when the first characters are embedded into the at least two of the second characters, a majority of a height of one of the first characters is in between a topmost point of the truncated portion and a bottommost point of the truncated portion.

25. The method of claim 1, wherein an appearance of at least one of the second characters includes a truncated portion and an untruncated portion below the truncated portion, such that, when the first characters are embedded into the at least two of the second characters, a majority of a height of one of the first characters is in between a topmost point of the truncated portion and a bottommost point of the truncated portion.

26. The method of claim 1, wherein an appearance of at least one of the second characters includes a deemphasized portion such that, when the first characters are embedded into the at least two of the second characters, a majority of a height of one of the first characters is in between a topmost point of the deemphasized portion and a bottommost point of the deemphasized portion; and the deemphasis is one of shading, gradual shading, and hollowing-out.

27. The method of claim 1, wherein an appearance of at least one of the second characters includes a deemphasized portion and an undeemphasized portion below the deemphasized portion, such that, when the first characters are embedded into the at least two of the second characters, a majority of a height of one of the first characters is in between a topmost point of the deemphasized portion and a bottommost point of the deemphasized portion; and the deemphasis is one of shading, gradual shading, and hollowing-out.

28. A system configured to display two sets of characters in an interference reducing manner, the system comprising: memory storing executable instructions; and a processing device executing the executable instructions, wherein the executable instructions, when executed by the processing device, configure the system to:

receive, by the processing device, two or more first characters associated with a first meaningful unit, two or more second characters associated with a second meaningful unit where each of the second characters has a different style than each of the first characters, x,y coordinates for each of the first characters, and x,y coordinates for each of the second characters;

set, by the processing device, target x,y coordinates for the first and second characters to either: (i) x,y coordinates received for each of the first and second characters when placement of the first and second characters according to the received x,y coordinates causes at least two of the first characters to be embedded within at least two of the second characters, or (ii) updated x,y coordinates when placement of the first and second characters according to the received x,y coordinates does not cause at least two of the first characters to be embedded within at least two of the second characters and placement of the first and second characters according to the updated x,y coordinates causes at least two of the first characters to be embedded within at least two of the second characters, wherein the updated x,y coordinates are computed by the processing device;

cause a rendering engine of the system to automatically place the first and second characters according to their target x,y coordinates such that the at least two of the first characters are embedded within the at least two of the second characters;

wherein a given first character is embedded within the at least two of the second characters if a topmost point of the given first character is above a base line of an immediately adjacent second character, a bottommost point of the given first character is below an x-height line of the immediately adjacent second character, and the given first character is entirely in between leftmost points of the two immediately adjacent second characters or in between rightmost points of the two immediately adjacent second characters;

a character identity of at least one of the second characters is different from a character identity of an other one of the second characters; and a character composition of the first meaningful unit is different from a character composition of the second meaningful unit.

29. A non-transitory computer-readable storage medium storing instructions that, when executed by one or more processors, cause the one or more processors to perform operations comprising:

receiving, by the one or more processirs, two or more first characters associated with a first meaningful unit, two or more second characters associated with a second meaningful unit where each of the second characters has a different style than each of the first characters, x,y coordinates for each of the first characters, and x,y coordinates for each of the second characters;

setting, by the one or more processors, target x,y coordinates for the first and second characters to either: (i) x,y coordinates received for each of the first and second characters when placement of the first and second characters according to the received x,y coordinates causes at least two of the first characters to be embedded within at least two of the second characters, or (ii) updated x,y coordinates when placement of the first and second characters according to the received x,y coordinates does not cause at least two of the first characters to be embedded within at least two of the second characters and placement of the first and second characters according to the updated x,y coordinates causes at least two of the first characters to be embedded within at least two of the second characters, wherein the updated x,y coordinates are computed by the one or more processors;

causing a rendering engine of the one or more processors to automatically place the first and second characters according to their target x,y coordinates such that the at least two of the first characters are embedded within the at least two of the second characters;

wherein a given first character is embedded within the at least two of the second characters if a topmost point of the given first character is above a base line of an immediately adjacent second character, a bottommost point of the given first character is below an x-height line of the immediately adjacent second character, and the given first character is entirely in between leftmost points of the two immediately adjacent second characters or in between rightmost points of the two immediately adjacent second characters;

a character identity of at least one of the second characters is different from a character identity of an other one of the second characters; and a character composition of the first meaningful unit is different from a character composition of the second meaningful unit.

* * * * *